US012189941B2

(12) United States Patent
Murphy

(10) Patent No.: US 12,189,941 B2
(45) Date of Patent: *Jan. 7, 2025

(54) INTERLEAVED CHARACTER SELECTION INTERFACE

(71) Applicant: Michael William Murphy, Seattle, WA (US)

(72) Inventor: Michael William Murphy, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,291

(22) Filed: Dec. 22, 2023

(65) Prior Publication Data

US 2024/0126430 A1 Apr. 18, 2024

Related U.S. Application Data

(63) Continuation of application No. 17/981,330, filed on Nov. 4, 2022, now Pat. No. 11,853,545, which is a
(Continued)

(51) Int. Cl.
*G06F 3/048* (2013.01)
*G06F 3/0481* (2022.01)
(Continued)

(52) U.S. Cl.
CPC ........ *G06F 3/04886* (2013.01); *G06F 3/0481* (2013.01); *G06F 3/0484* (2013.01)

(58) Field of Classification Search
CPC ... G06F 3/04886; G06F 3/0481; G06F 3/0484
See application file for complete search history.

(56) References Cited

U.S. PATENT DOCUMENTS

| 4,481,508 A | 11/1984 | Kamei et al. |
| 4,912,462 A | 3/1990 | Washizuka et al. |

(Continued)

FOREIGN PATENT DOCUMENTS

| WO | 0149503 A1 | 7/2001 |
| WO | 2014006639 A1 | 1/2014 |
| WO | 2014062525 A1 | 4/2014 |

OTHER PUBLICATIONS

Communication under Rule 71(3) EPC dated Mar. 25, 2022 from International Application No. 18801558.0, 158 pages.
Extended European Search Report, dated Feb. 18, 2015, for corresponding European Application No. 11168711.7-1959/2395415, 7 pages.
International Search Report and Written Opinion, mailed Aug. 10, 2016, for corresponding International Application No. PCT/US2016/029614, 11 pages.
(Continued)

*Primary Examiner* — David E Choi
(74) *Attorney, Agent, or Firm* — Daylight Law, P.C.

(57) ABSTRACT

Apparatus and methods are disclosed for selection of characters from an electronic user interface. In one embodiment, a letter selection interface displays letters in a row, some of which are recordable by an input interpreter and others that are unrecordable. In one embodiment, unrecordable letters visually separate letters that are both (1) recordable, and (2) assigned to different but adjacent selection buttons. In response to received touch-screen activations, an interpreter records recordable letter selections and a display displays both recordable and unrecordable letter selections. The interpreter composes a sequence of the recorded letters. An algorithm identifies alternatives to the recorded sequence by editing one or more letters of the sequence, such that each edit changes a selected letter to an adjacent unrecordable letter. The algorithm outputs words that match the originally composed sequence or one of the identified alternatives.

12 Claims, 65 Drawing Sheets

Related U.S. Application Data continuation of application No. 17/337,057, filed on Jun. 2, 2021, now Pat. No. 11,494,075, which is a continuation of application No. 16/687,225, filed on Nov. 18, 2019, now Pat. No. 11,054,989, which is a continuation of application No. PCT/US2018/033542, filed on May 18, 2018.

(60) Provisional application No. 62/508,910, filed on May 19, 2017.

(51) Int. Cl.
*G06F 3/0484* (2022.01)
*G06F 3/04886* (2022.01)

(56) References Cited

U.S. PATENT DOCUMENTS

| | | | |
|---|---|---|---|
| 5,202,961 | A | 4/1993 | Mills et al. |
| 6,011,542 | A | 1/2000 | Durrani et al. |
| 6,271,835 | B1 | 8/2001 | Hoeksma |
| 6,278,384 | B1 | 8/2001 | Ide |
| 6,292,179 | B1 | 9/2001 | Lee |
| 6,295,052 | B1 | 9/2001 | Kato et al. |
| 6,597,345 | B2 | 7/2003 | Hirshberg |
| 6,799,303 | B2 | 9/2004 | Blumberg |
| 7,088,340 | B2 | 8/2006 | Kato |
| 7,218,249 | B2 | 5/2007 | Chadha |
| 7,256,769 | B2 | 8/2007 | Pun et al. |
| 7,376,938 | B1 | 5/2008 | Hoeven |
| 7,382,358 | B2 | 6/2008 | Kushler et al. |
| 7,424,683 | B2 | 9/2008 | Leeuwen |
| D591,307 | S * | 4/2009 | Kristensson ............... D14/487 |
| 7,555,732 | B2 | 6/2009 | Hoeven |
| D614,644 | S * | 4/2010 | Kristensson ............... D14/487 |
| 7,694,231 | B2 * | 4/2010 | Kocienda ............ G06F 3/04883 345/169 |
| 7,721,968 | B2 | 5/2010 | Wigdor |
| 7,793,228 | B2 | 9/2010 | Mansfield et al. |
| D640,275 | S * | 6/2011 | Davis ............... D14/487 |
| D640,281 | S * | 6/2011 | Davis ............... D14/487 |
| D640,711 | S * | 6/2011 | Ng ............... D14/487 |
| 8,011,542 | B2 | 9/2011 | Gandy et al. |
| D664,975 | S * | 8/2012 | Arnold ............... D14/487 |
| 8,316,319 | B1 | 11/2012 | Patel et al. |
| D673,170 | S * | 12/2012 | Davis ............... D14/487 |
| 8,416,217 | B1 | 4/2013 | Eriksson et al. |
| D684,588 | S * | 6/2013 | Nanda Gilani ............... D14/486 |
| 8,487,877 | B2 | 7/2013 | Murphy |
| 8,576,184 | B2 | 11/2013 | Arrasvuori et al. |
| 8,896,543 | B2 | 11/2014 | Ettinger |
| 9,367,240 | B2 | 6/2016 | Buck |
| D783,036 | S * | 4/2017 | Yang ............... D14/486 |
| D791,783 | S * | 7/2017 | Bratland ............... D14/485 |
| D813,876 | S * | 3/2018 | Bratland ............... D14/490 |
| D818,470 | S * | 5/2018 | Bratland ............... D14/485 |
| D819,041 | S * | 5/2018 | Bratland ............... D14/485 |
| 9,971,416 | B2 | 5/2018 | Gao et al. |
| 10,101,905 | B1 | 10/2018 | Sivertsen et al. |
| 10,528,230 | B2 | 1/2020 | Sirpal et al. |
| D916,735 | S * | 4/2021 | Li ............... D14/485 |
| 11,054,989 | B2 * | 7/2021 | Murphy ............ G06F 3/0481 |
| 2001/0048428 | A1 * | 12/2001 | Ukita ............ G06F 1/1664 345/169 |
| 2002/0168209 | A1 * | 11/2002 | Lee ............ G06F 3/0219 400/489 |
| 2002/0180622 | A1 | 12/2002 | Lui et al. |
| 2002/0181671 | A1 * | 12/2002 | Logan ............ H04M 1/6505 379/67.1 |
| 2003/0023473 | A1 | 1/2003 | Guyan et al. |
| 2003/0095104 | A1 | 5/2003 | Kandogan et al. |
| 2003/0193478 | A1 | 10/2003 | Ng et al. |
| 2004/0120583 | A1 * | 6/2004 | Zhai ............ G06V 30/1423 382/229 |
| 2005/0043949 | A1 | 2/2005 | Roth et al. |
| 2005/0060138 | A1 | 3/2005 | Wang et al. |
| 2005/0190973 | A1 * | 9/2005 | Kristensson ......... G06V 30/1423 382/229 |
| 2005/0244208 | A1 * | 11/2005 | Suess .................. G06F 3/0219 400/486 |
| 2005/0248527 | A1 * | 11/2005 | Scott .................. G06F 3/0481 345/172 |
| 2005/0270270 | A1 | 12/2005 | Chadha |
| 2006/0019717 | A1 | 1/2006 | Gong |
| 2006/0066583 | A1 | 3/2006 | Toutonghi et al. |
| 2006/0095844 | A1 | 5/2006 | Leeuwen |
| 2006/0116135 | A1 | 6/2006 | Ure |
| 2006/0119582 | A1 | 6/2006 | Ng et al. |
| 2006/0202865 | A1 | 9/2006 | Nguyen |
| 2006/0213754 | A1 | 9/2006 | Jarrett et al. |
| 2006/0290536 | A1 | 12/2006 | Tzeng |
| 2007/0040813 | A1 | 2/2007 | Kushler et al. |
| 2008/0270896 | A1 * | 10/2008 | Kristensson ......... G06F 3/04883 715/261 |
| 2008/0291059 | A1 | 11/2008 | Longe |
| 2008/0316065 | A1 | 12/2008 | Maber |
| 2009/0158191 | A1 * | 6/2009 | Varanda ............. G06F 3/04886 715/773 |
| 2009/0187860 | A1 | 7/2009 | Fleck et al. |
| 2009/0193334 | A1 * | 7/2009 | Assadollahi .......... G06F 40/274 707/999.005 |
| 2009/0201252 | A1 | 8/2009 | Lee |
| 2010/0094866 | A1 | 4/2010 | Cuttner et al. |
| 2010/0120469 | A1 | 5/2010 | Mousseau et al. |
| 2010/0251161 | A1 | 9/2010 | Fong et al. |
| 2010/0257478 | A1 | 10/2010 | Longe et al. |
| 2010/0271241 | A1 | 10/2010 | Weller |
| 2010/0295789 | A1 | 11/2010 | Shin et al. |
| 2010/0333011 | A1 | 12/2010 | Kornev et al. |
| 2011/0009813 | A1 | 1/2011 | Rankers |
| 2011/0032200 | A1 | 2/2011 | Park et al. |
| 2011/0050576 | A1 * | 3/2011 | Forutanpour ......... G06F 3/04886 345/173 |
| 2011/0055697 | A1 * | 3/2011 | Davidson ............ G06F 3/04886 715/702 |
| 2011/0063787 | A1 * | 3/2011 | Griffin .................. G06F 1/1664 361/679.08 |
| 2011/0163973 | A1 | 7/2011 | Ording et al. |
| 2011/0167375 | A1 | 7/2011 | Kocienda |
| 2011/0304483 | A1 | 12/2011 | Moon |
| 2011/0304550 | A1 | 12/2011 | Jolliff et al. |
| 2011/0304555 | A1 | 12/2011 | Murphy |
| 2012/0047453 | A1 | 2/2012 | Hale et al. |
| 2012/0062465 | A1 | 3/2012 | Spetalnick |
| 2012/0075192 | A1 | 3/2012 | Marsden et al. |
| 2012/0102401 | A1 | 4/2012 | Ijas et al. |
| 2012/0111173 | A1 * | 5/2012 | Bowen .................. G06F 3/0221 84/170 |
| 2012/0114406 | A1 * | 5/2012 | Cenky .................. G06F 1/1662 400/486 |
| 2012/0176320 | A1 * | 7/2012 | Burrell, IV ......... G06F 3/04886 345/168 |
| 2012/0306747 | A1 | 12/2012 | Davidson et al. |
| 2012/0306754 | A1 | 12/2012 | Jeong |
| 2013/0021252 | A1 | 1/2013 | Lu et al. |
| 2013/0021258 | A1 | 1/2013 | Salman et al. |
| 2013/0046544 | A1 | 2/2013 | Kay et al. |
| 2013/0120274 | A1 | 5/2013 | Ha et al. |
| 2013/0125036 | A1 * | 5/2013 | Griffin .................. G06F 3/0237 715/773 |
| 2013/0187831 | A1 | 7/2013 | Sirpal et al. |
| 2013/0194191 | A1 | 8/2013 | Bradford et al. |
| 2013/0271385 | A1 | 10/2013 | Griffin et al. |
| 2013/0278506 | A1 | 10/2013 | Murphy |
| 2013/0285913 | A1 | 10/2013 | Griffin et al. |
| 2014/0002363 | A1 * | 1/2014 | Griffin .................. G06F 3/0237 345/168 |
| 2014/0049477 | A1 | 2/2014 | Dai et al. |
| 2014/0123051 | A1 | 5/2014 | Ni |

(56) References Cited

U.S. PATENT DOCUMENTS

| | | |
|---|---|---|
| 2014/0173522 A1 | 6/2014 | Murphy |
| 2014/0181721 A1 | 6/2014 | Buck |
| 2015/0022455 A1 | 1/2015 | Murphy |
| 2015/0070281 A1 | 3/2015 | Melmon et al. |
| 2015/0089432 A1 | 3/2015 | Fallah |
| 2015/0234592 A1 | 8/2015 | Murphy |
| 2016/0063036 A1 | 3/2016 | Kawai |
| 2016/0070441 A1 | 3/2016 | Paek et al. |
| 2016/0124535 A1 | 5/2016 | Murphy |
| 2016/0132233 A1 | 5/2016 | Ghassabian |
| 2016/0320929 A1 | 11/2016 | Murphy |
| 2016/0320963 A1 | 11/2016 | Murphy |
| 2016/0321236 A1 | 11/2016 | Murphy |
| 2016/0321237 A1 | 11/2016 | Murphy |
| 2017/0052702 A1 | 2/2017 | Norris, III |
| 2017/0118383 A1 | 4/2017 | Bollman et al. |
| 2017/0199661 A1 | 7/2017 | Murphy |
| 2017/0228152 A1* | 8/2017 | Kim ...................... G06F 3/0482 |
| 2020/0064160 A1 | 2/2020 | Maru et al. |
| 2020/0125255 A1* | 4/2020 | Murphy .............. G06F 3/04842 |
| 2020/0264907 A1* | 8/2020 | Kim ........................ G06N 5/04 |
| 2021/0286514 A1* | 9/2021 | Murphy .............. G06F 3/04886 |

OTHER PUBLICATIONS

International Search Report and Written Opinion, mailed Aug. 8, 2016, for corresponding International Application No. PCT/US2016/029611, 10 pages.

International Search Report and Written Opinion, mailed Jul. 30, 2018, for corresponding International Application No. PCT/US2018/033542, 8 pages.

International Search Report and Written Opinion, mailed May 11, 2016, for corresponding International Application No. PCT/US2015/058654, 11 pages.

Non-Final Office Action dated Jan. 21, 2022 from U.S. Appl. No. 17/337,057, 25 pages.

Non-final Office Action from U.S. Appl. No. 16/687,225, dated Oct. 8, 2020, 12 pages.

Notice of allowance from U.S. Appl. No. 16/687,225 dated Mar. 1, 2021, 8 pages.

Notice of allowance from U.S. Appl. No. 17/337,057 dated Jul. 7, 2022, 7 pages.

Notice of allowance from U.S. Appl. No. 17/981,330 dated Aug. 16, 2023, 7 pages.

* cited by examiner

○ PRESS TARGET FOR CONVENTIONAL BUTTON
● PRESS TARGET FOR INTERVENING BUTTON

········· POSITION OF PERCEIVED BOUNDARY
——— ACTUAL BOUNDARY OF CONVENTIONAL BUTTON
------- ACTUAL BOUNDARY OF INTERVENING BUTTON

*112* a b c d e f g h i j k l m

*290* → 'field'

| Intended character *294* | Gesture to select Intended character *296* |
|---|---|
| f | tap-and-swipe |
| i | tap |
| e | tap |
| l | tap |
| d | tap |

*FIG. 26*

| Button no. (B) ⟵400 | Button half no. (BH) ⟵416 | Unit string (B:BH) ⟵420 | Letter assignment ⟵404 |
|---|---|---|---|
| 1 | 0 | 10 | a |
| 1 | 1 | 11 | a |
| 2 | 0 | 20 | b |
| 3 | 0 | 30 | c |
| 3 | 1 | 31 | c |
| 4 | 0 | 40 | d |
| 5 | 0 | 50 | e |
| 5 | 1 | 51 | e |
| 6 | 0 | 60 | f |
| 7 | 0 | 70 | g |
| 7 | 1 | 71 | g |
| 8 | 0 | 80 | h |
| 9 | 0 | 90 | i |
| 9 | 1 | 91 | i |

*FIG. 35*

Received sequence: 31-50-11-70  /424

| Alternative sequences (426) | Converted sequences (428) | Word candidates (430) |
|---|---|---|
| 31-50-11-70 | ceag | deaf |
| 31-50-11-60 | ceaf | |
| 31-50-20-70 | cebg | |
| 31-50-20-60 | cebf | |
| 31-40-11-70 | cdag | |
| 31-40-11-60 | cdaf | |
| 31-40-20-70 | cdbg | |
| 31-40-20-60 | cdbf | |
| 40-50-11-70 | deag | |
| 40-50-11-60 | deaf | |
| 40-50-20-70 | debg | |
| 40-50-20-60 | debf | |
| 40-40-11-70 | ddag | |
| 40-40-11-60 | ddaf | |
| 40-40-20-70 | ddbg | |
| 40-40-20-60 | ddbf | |

*FIG. 39*

Received sequence: 30-11-50-31 ⟵424

426⟶
Alternative sequences

| | | |
|---|---|---|
| 30-11-50-31 | 30-10-51-31 | 20-11-40-31 |
| 30-11-50-30 | 30-10-51-30 | 20-11-40-30 |
| 30-11-50-40 | 30-10-51-40 | 20-11-40-40 |
| 30-11-40-31 | 30-20-50-31 | 20-11-51-31 |
| 30-11-40-30 | 30-20-50-30 | 20-11-51-30 |
| 30-11-40-40 | 30-20-50-40 | 20-11-51-40 |
| 30-11-51-31 | 30-20-40-31 | 20-10-50-31 |
| 30-11-51-30 | 30-20-40-30 | 20-10-50-30 |
| 30-11-51-40 | 30-20-40-40 | 20-10-50-40 |
| 30-10-50-31 | 30-20-51-31 | 20-10-40-31 |
| 30-10-50-30 | 30-20-51-30 | 20-10-40-30 |
| 30-10-50-40 | 30-20-51-40 | 20-10-40-40 |
| 30-10-40-31 | 20-11-50-31 | 20-10-51-31 |
| 30-10-40-30 | 20-11-50-30 | 20-10-51-30 |
| 30-10-40-40 | 20-11-50-40 | 20-10-51-40 |

*FIG. 44A*

426 ↘
Alternative sequences (con't.)

| | | |
|---|---|---|
| 20-20-50-31 | 31-11-51-31 | 31-20-40-31 |
| 20-20-50-30 | 31-11-51-30 | 31-20-40-30 |
| 20-20-50-40 | 31-11-51-40 | 31-20-40-40 |
| 20-20-40-31 | 31-10-50-31 | 31-20-51-31 |
| 20-20-40-30 | 31-10-50-30 | 31-20-51-30 |
| 20-20-40-40 | 31-10-50-40 | 31-20-51-40 |
| 20-20-51-31 | 31-10-40-31 | |
| 20-20-51-30 | 31-10-40-30 | |
| 20-20-51-40 | 31-10-40-40 | |
| 31-11-50-31 | 31-10-51-31 | |
| 31-11-50-30 | 31-10-51-30 | |
| 31-11-50-40 | 31-10-51-40 | |
| 31-11-40-31 | 31-20-50-31 | |
| 31-11-40-30 | 31-20-50-30 | |
| 31-11-40-40 | 31-20-50-40 | |

Converted sequences

| | | | | |
|---|---|---|---|---|
| dbge | dcge | cage | ebge | ecge |
| dbgd | dcgd | cagd | ebgd | ecgd |
| dbgf | dcgf | cagf | ebgf | ecgf |
| dbfe | dcfe | cafe | ebfe | ecfe |
| dbfd | dcfd | cafd | ebfd | ecfd |
| dbff | dcff | caff | ebff | ecff |
| dbhe | dche | cahe | ebhe | eche |
| dbhd | dchd | cahd | ebhd | echd |
| dbhf | dchf | cahf | ebhf | echf |
| dage | cbge | ccge | eage | |
| dagd | cbgd | ccgd | eagd | |
| dagf | cbgf | ccgf | eagf | |
| dafe | cbfe | ccfe | eafe | |
| dafd | cbfd | ccfd | eafd | |
| daff | cbff | ccff | eaff | |
| dahe | cbhe | cche | eahe | |
| dahd | cbhd | cchd | eahd | |
| dahf | cbhf | cchf | eahf | |

Word candidates
  cage
  cafe

*FIG. 46*

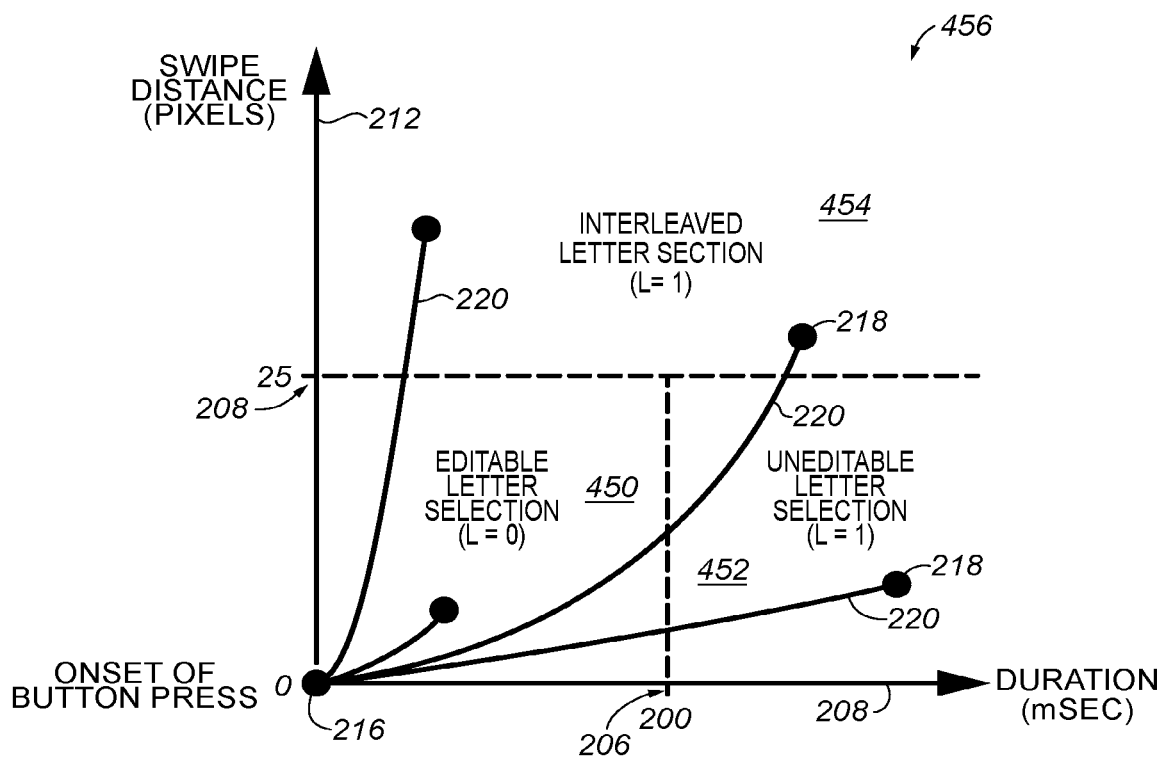
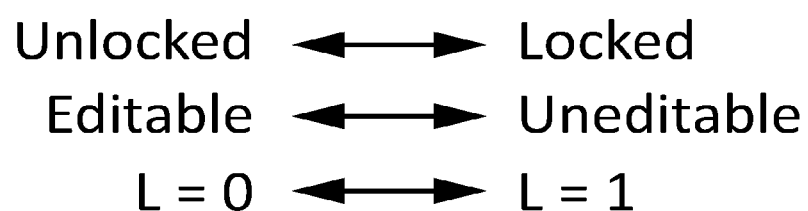
FIG. 51

Unit string format

Button : Button-half : Lock (B:BH:L)

E.g. 510 = editable 'h'

511 = uneditable 'h'

401 = uneditable 'f'

Received sequence: 500-110-300-310 ⟵ 424

| Alternative sequences ⟵ 426 | Converted sequences ⟵ 428 | Word candidates ⟵ 430 |
|---|---|---|
| 40-10-30-31 | fade | fade |
| 40-10-30-30 | fadd | face |
| 40-10-30-40 | fadf | |
| 40-10-20-31 | face | |
| 40-10-20-30 | facd | |
| 40-10-20-40 | facf | |
| 40-10-31-31 | faee | |
| 40-10-31-30 | faed | |
| 40-10-31-40 | faef | |
| 40-20-30-31 | fcde | |
| 40-20-30-30 | fcdd | |
| 40-20-30-40 | fcdf | |
| 40-20-20-31 | fcce | |
| 40-20-20-30 | fccd | |
| 40-20-20-40 | fccf | |
| and 66 others | and 66 others | |

*FIG. 55*

Received sequence: 500-110-201-310 ← 424

| Alternative sequences ← 426 | Converted sequences ← 428 | Word candidates ← 430 |
|---|---|---|
| 50-11-20-31 | gbce | face |
| 50-11-20-30 | gbcd | |
| 50-11-20-40 | gbcf | |
| 50-10-20-31 | gace | |
| 50-10-20-30 | gacd | |
| 50-10-20-40 | gacf | |
| 50-20-20-31 | gcce | |
| 50-20-20-30 | gccd | |
| 50-20-20-40 | gccf | |
| 40-11-20-31 | fbce | |
| 40-11-20-30 | fbcd | |
| 40-11-20-40 | fbcf | |
| 40-10-20-31 | face | |
| 40-10-20-30 | facd | |
| 40-10-20-40 | facf | |
| and 12 others | and 12 others | |

*FIG. 56*

Received sequence: 110-310-310 ⟵ 424

| Alternative sequences ⟵ 426 | Converted sequences ⟵ 428 | Word candidates ⟵ 430 |
|---|---|---|
| 11-31-31 | bee | bee |
| 11-31-30 | bed | bed |
| 11-31-40 | bef | add |
| 11-30-31 | bde | |
| 11-30-30 | bdd | |
| 11-30-40 | bdf | |
| 11-40-31 | bfe | |
| 11-40-30 | bfd | |
| 11-40-40 | bff | |
| 10-31-31 | aee | |
| 10-31-30 | aed | |
| 10-31-40 | aef | |
| 10-30-31 | ade | |
| 10-30-30 | add | |
| 10-30-40 | adf | |
| and 12 others | and 12 others | |

*FIG. 57*

Received sequence: 110-310-311

| Alternative sequences | Converted sequences | Word candidates |
|---|---|---|
| 11-31-31 | bee | bee |
| 11-30-31 | bde | |
| 11-40-31 | bfe | |
| 10-31-31 | aee | |
| 10-30-31 | ade | |
| 10-40-31 | afe | |
| 20-31-31 | cee | |
| 20-30-31 | cde | |
| 20-40-31 | cfe | |

*FIG. 58*

INTERLEAVED CHARACTER SELECTION INTERFACE

TECHNICAL FIELD

This description generally relates to the field of electronic devices and, more particularly, to user interfaces of electronic devices.

DESCRIPTION OF THE RELATED ART

Electronic devices often require input of data in order to perform their designed function. Data may include letters, words, sentences, numbers, characters and symbols. If a device requires input by humans, then the device typically includes a user interface. In many cases, the user interface includes selection buttons which, in some embodiments, are physical buttons (hard buttons), but in other embodiments are virtual buttons (or soft buttons) that appear on an electronic display.

A frequent consideration in the design of electronic devices is size. Designers seek to make devices compact in order to enhance portability, mobility, to maximize the space available for other features, or simply for overall convenience to the user. One example of a device where size is a consideration is a mobile device (a mobile phone or smartphone). Another example is a wearable device such as a wristwatch or other device that attaches to clothing. Another example is a game platform, whether portable or one used with a console game. Another example is a remote controller for a TV system. A further example is augmented or virtual reality (AR/VR) systems. Yet another example is the interface of a vehicle, where available dashboard space is limited. All these are examples of electronic devices that may require user input and where size is a consideration.

A feature often compromised in pursuit of compactness is the size of selection buttons. Ideally selection buttons are sized to approximately match the size of the selector, which for many devices is the human finger. But in many applications, overall compactness outweighs ideal button size in importance. In that case button size becomes compromised for the sake of compactness. A consequence of smaller buttons is inaccurately entered data due to inaccurate button selections. The text input interface of many mobile devices is a classic example of this design compromise and the resulting consequence.

FIG. 1 is one embodiment of an electronic device 100. The embodiment depicts a mobile phone or smartphone, but in other embodiments the electronic device could be a wearable device, game, TV controller, augmented/virtual reality system, portion of an automotive dashboard or any number of other electronic devices that require user input.

The electronic device 100 includes a case 102 and a touch sensitive display screen 104. The case holds and mechanically supports the display screen. The screen displays a user input interface 108, which in the embodiment of FIG. 1 occupies the lower portion of the display screen.

In the embodiment of FIG. 1, the user input interface 108 includes a text input interface 110 and a plurality of function buttons 116. The text input interface and the plurality of function buttons lie adjacent to one another within the user input interface. The text input interface 110 is made up of a plurality of individual selection buttons 120 arranged in rows.

The text input interface 110 enables a user to input language characters, but in alternative embodiments the text input interface could enable input of non-language data, such as numbers or symbols. The embodiment of FIG. 1 enables English-language input, but in alternative embodiments could enable input of other languages. For the embodiment of FIG. 1, selection of one button 120 selects one letter.

FIG. 2 shows two views of an alternative embodiment of the text input interface 110 of FIG. 1. The alternative embodiment is essentially the five left-most buttons 120 from the top row of the text input interface of FIG. 1.

The top view shows the buttons 120 substantially as they are shown in FIG. 1. The bottom view omits the letters so that other details about the buttons can be more easily described.

In the bottom view, each button 120 has a press target 132. The press target is the point on the button that a user sees as the intended target. For a symmetrical button, the press target is typically the center of the button.

Each button has both an actual button boundary 124 and a perceived button boundary. The perceived button boundary is not shown explicitly, because it is just a user perception. Instead, a perceived button boundary indicator 128 marks a position on the button where the perceived boundary lies.

The actual button boundary 124 is the outer limit of the button with respect to the press target 132. In other words, the actual boundary is the furthest a user can press from the press target in any given direction and still record a tap of that button.

The perceived button boundary is where a user expects the actual button boundary 124 to lie based on what they see. The perceived button boundary indicator 128 identifies the perceived boundary by pointing to where the perceived boundary intersects an imaginary axis 130 that transects the buttons of the row. The perceived boundary is assumed to lie parallel with the actual button boundary so, by identifying the boundary's intersection with the imaginary axis, the indicator 128 identifies the perceived boundary for the entire side of the button.

For physical buttons, and for virtual buttons with explicitly drawn boundary lines like those of FIG. 2, the actual and perceived button boundaries are the same.

FIG. 2 also discloses a boundary difference indicator 136. The difference indicator 136 shows the distance between the perceived and actual button boundaries, which becomes an important quality later in the disclosure.

For the embodiments of FIGS. 1 and 2, the perceived and actual button boundaries are the same so the difference indicator 136 shows a distance of nominally zero. In the field of user interfaces for electronic devices, an overwhelming number of interfaces have perceived button boundaries that are the same as the buttons' actual boundaries.

BRIEF SUMMARY

Mobile text input is notoriously slow, inaccurate and inconvenient. The invention disclosed improves the speed, ease and accuracy of text input by making selection buttons bigger. In order to maintain the size of the interface, buttons overlap one another.

The invention is an improved computer-processor implemented interface and method. The interface uses selection buttons of two different kinds. In one embodiment, the two kinds of buttons are distinguished by the input selection gesture that actuates them. In another embodiment, selection buttons of a first kind are actuated by a button tap and selection buttons of a second kind by a selection gesture that is unique from a button tap. In a further embodiment, the unique gesture that actuates the second kind is a tap-andswipe gesture. In a further embodiment, the length of the swipe distinguishes a button tap from a tap-and-swipe. In yet another embodiment of the invention, only one of the two kinds of buttons accepts actuations. For this embodiment, a language algorithm corrects letters of the actuated buttons to the letters of the unactuatable buttons.

In one embodiment, each button is assigned one letter. A mark identifies the letters of one kind of button, so a user can associate those letters with the gesture that selects that kind of button. In one embodiment, a circle surrounds letters of the second kind of button. In still a further embodiment, a tap-and-swipe gesture selects buttons of the second kind.

Buttons of the interface are arranged in rows. In one embodiment, within a row buttons are arranged according to two conditions: (1) adjacent letters are assigned to buttons of a different kind, and (2) buttons of adjacent letters overlap.

Where buttons overlap, the letter of either overlapping button can be selected. In one embodiment, a gesture interpreter identifies the user's intended letter by the particular selection gesture received. In another embodiment, a language disambiguation algorithm identifies the user's intended letter according to allowable edits based on position and comparison of candidate words with a dictionary of known words.

Selection gestures are designed so that every possible input is classifiable as one selection gesture or the other. That guarantees that there is never a case where an input gesture does not select any character.

Furthermore, selection gestures are also designed so that one input gesture can be classified more broadly as the other selection gesture. For example, in one embodiment a tap-and-swipe gesture is classifiable as button tap, depending on where the gesture is received. That guarantees that there is never a case where an input gesture does not select any character. Where buttons do not overlap, either input gesture selects the letter.

In one embodiment, the two kinds of buttons are rectangular, the same size, distributed at the same interval along the row, and distributed such that buttons of adjacent letters overlap one another by 50% of the button width. By overlapping 50%, buttons of the same kind become adjacent to one another because edges of two buttons of the same kind meet at the middle of the intervening button of the opposite kind. In this embodiment, the two kinds of buttons overlap one another entirely, except possibly at the row ends.

Another way to understand the button arrangement is to think of the two kinds of buttons as lying on separate layers. The two kinds of buttons are rectangular and the same size. Each kind is distributed along a row on its own layer and at the same interval as the other. In an embodiment with complete overlap, the buttons lie immediately adjacent to one another in their respective rows. In a further embodiment, the layers entirely overlap one another collinearly. In still a further embodiment, the layers are offset from one another along the collinear axis by 50% of the button width.

Regardless of how one conceptualizes the button arrangement, for the embodiment where the two kinds of buttons overlap one another entirely, a gesture interpreter seeks to resolve two questions: (1) which two buttons received the selection gesture (i.e., where on the interface is the input received), and (2) which gesture occurred (i.e., a button tap or a gesture unique from a button tap).

In embodiments where the two kinds of buttons overlap one another only partially, the input gestures are interpreted more broadly in areas without overlap so that either gesture received makes the selection. In an alternative embodiment, letter pairs are assigned to one or more selection buttons of the first kind, instead of single letters. In a further embodiment, a time-dependent button tap distinguishes the particular letter of the pair that the user intends. In a further embodiment, the particular half of the button tapped distinguishes the particular letter of the pair that the user intends. In an alternative embodiment for the case of a letter pair, the selection is ambiguous and a disambiguation algorithm determines which letter of the pair the user likely intends. In still a further embodiment, the disambiguation algorithm determines the intended word by allowing edits to the letter of an overlapping intervening button.

A useful consequence of the interface is that actual button boundaries extend beyond where a user would typically believe they lie. Button boundaries for a given letter are typically perceived to lie midway between any letter and the adjacent letter. However, interleaving letters of buttons of a second kind between letters of buttons of a first kind (or vice-versa) effectively displaces the button boundary outward by 25% of the button width for the case of 50% overlap. Every letter's button boundary lies beneath the adjacent letter rather between the letter and the adjacent letter. In the case of buttons with assigned letter pairs, the button boundaries for intervening letters lie midway between the letters of the adjacent assigned pairs.

The intervening letters cause a user to guide their selection to the intended letter more accurately than it actually needs to be. In doing so, the user guides their selection away from the conventional button press boundary. The effect reduces the likelihood that a selection error occurs due to an inaccurate button press selection. The effect is particularly valuable for text input interfaces where the selection button size is less than the size of the selector, such as text input interfaces on mobile devices, but the effect is equally applicable to any interface that is crowded and that requires selection of characters, symbols, letters, or numbers. Particularly useful applications are compact user interfaces such as those found on wearable devices, watches, industrial equipment interfaces, mobile devices, games, game controllers, TV remote controllers, augment and virtual reality interfaces, and others.

One computer processor-implemented embodiment of the interface includes a first row of selection buttons distributed at a uniform interval on a touch sensitive display screen and that actuate by a first selection gesture, and a second row of selection buttons distributed on the touch sensitive display screen such that the buttons of the second row: (1) occur at the same interval as the buttons of the first row, (2) interleave with the buttons of the first row, (3) overlap with the buttons of the first row, and (4) actuate by a second selection gesture unique from the first selection gesture.

In a further embodiment, the buttons of the first and second rows are the same size. In a further embodiment, the first and second rows of buttons entirely overlap one another. In yet a further embodiment, a button of the first row overlaps with each of two buttons from the second row by 50% of button width and a button of the second row overlaps with each of two buttons from the first row by 50% of button width.

In yet another embodiment, a character is assigned to each button of the first and second rows. In still a further embodiment, the first selection gesture is a button tap and the second selection gesture a tap-and-swipe. In another embodiment, the characters assigned to the buttons of the first and second row are letters of an alphabet and the letters used least frequently in language are assigned to buttons of the second row. In yet another embodiment, a character pair is assigned to each of at least one button of the first row and a character is assigned to each of the remaining buttons of the first row and each of the buttons of the second row.

One computer processor-implemented embodiment of the method includes a first step that receives and stores a tentative character in response to initiation of a button activation, a second step that monitors positional displacement of the button activation and updates the stored character to a first alternate character when displacement exceeds a previously selected distance threshold, and a third step that interprets the stored character as input in response to completion of the button activation.

In a further embodiment of the method the tentative character and the first alternate character are assigned to separate but overlapping buttons.

Another computer processor-implemented embodiment of the method includes a first step that receives and stores a tentative character in response to initiation of a button activation, a second step that monitors positional displacement of the button activation and updates the stored character to a first alternate character when displacement exceeds a previously selected distance threshold, a third step that monitors the duration of the button activation and updates the stored character to a second alternate character when duration exceeds a previously selected time threshold, and a fourth step that interprets the stored character as input in response to completion of the button activation.

In a further embodiment of the method, the tentative character and the first alternate character are assigned to separate but overlapping buttons. Furthermore the tentative character and the second alternate character are a character pair assigned to the same selection button.

A further embodiment of the method includes a fifth step that acquires a sequence of interpreted characters, and a sixth step that disambiguates the acquired sequence by converting interpreted tentative characters to each tentative character's respective second alternate character, as needed, to determine a word.

An apparatus may be summarized as including: at least one computer processor; and at least one non-transitory computer memory coupled to the at least one processor, the at least one non-transitory computer memory having computer-executable instructions stored thereon that, when executed by the at least one processor, cause the at least one processor to generate an interactive graphical user interface including: a first row of selection buttons distributed at a uniform interval on a touch sensitive display screen, wherein each button of the first row is configured to be actuated by a first selection gesture; and a second row of selection buttons distributed on the touch sensitive display screen such that buttons of the second row: occur at the same interval as the buttons of the first row; interleave with the buttons of the first row; overlap with the buttons of the first row; and are each configured to be actuated by a second selection gesture unique from the first selection gesture.

The buttons of the first and second rows may be a same size. The first and second rows may entirely overlap one another. A button of the first row may overlap with each of two buttons from the second row by 50% of button width and a button of the second row may overlap with each of two buttons from the first row by 50% of button width. The graphical user interface may further include a character assigned to each button of the first and second rows. The first selection gesture may be a button tap and the second selection gesture may be a tap-and-swipe. The characters assigned to each button of the first and second rows may be letters of an alphabet and letters used least frequently in a language and may be assigned to buttons of the second row.

The graphical user interface may further include: a different character pair assigned to each of at least one button of the first row; a different character assigned to each button of the first row other than the each of the at least one button of the first row; and a different character assigned to each button of the second row.

A computer processor-implemented method may be summarized as including: receiving, by at least one computer processor, an indication of initiation of a button activation; storing, by at least one computer processor, a tentative character in response to the initiation of a button activation; monitoring, by at least one computer processor, positional displacement of the button activation; updating, by at least one computer processor, the stored character to be a first alternate character when the positional displacement exceeds a previously selected distance threshold; and interpreting, by at least one computer processor, the stored character as input in response to completion of the button activation.

The tentative character and the first alternate character may be assigned to separate but overlapping buttons.

The computer processor-implemented method may further include:
monitoring, by at least one computer processor, a duration of the button activation; and updating, by at least one computer processor, the stored character to be a second alternate character when the duration exceeds a previously selected time threshold.

The monitoring the duration of the button activation and updating the stored character to be the second alternative character may occur before the interpreting the stored character. The tentative character and the first alternate character may be assigned to separate but overlapping buttons; and the tentative character and the second alternate character may be a character pair assigned to a same button.

The computer processor-implemented method may further include: acquiring, by at least one computer processor, a sequence of interpreted characters; and disambiguating, by at least one computer processor, the acquired sequence by converting interpreted tentative characters to each interpreted tentative character's respective second alternate character to determine a word.

In another computer processor-implemented embodiment of the method, letters of intervening buttons become selected by a correction from a tap-selected letter of an adjacent letter selection button (also referred to as conventional button). In an embodiment where buttons lie adjacent to one another along a row, selection of the letter of the intervening button can occur due to a tap selection on either of two adjacent selection buttons.

An alternative description of the apparatus is a letter selection interface in which letters of intervening buttons visually separate letters that are selectable from just one, but not the same, button. For example, consider an embodiment where letters of a conventional button are selectable from only their assigned button and there are two assigned letters per conventional button. In this embodiment, a letter of an intervening button does not visually separate the two assigned letters (because the letters are on the same button), but does separate the assigned letters of adjacent conventional buttons (because the letters are not selectable from the same button).

Yet another description of the apparatus is a letter selection interface in which no letters that are visually adjacent have mutually exclusive selection areas. Instead, visually adjacent letters have buttons that either partially or completely overlap. For example, in no case do letters of adjacent conventional buttons not have an intervening letter between them. In this example, an overlap occurs between a first button of the adjacent conventional buttons and the intervening button, and another overlap occurs between the intervening button and a second button of the adjacent conventional buttons.

Note that throughout the disclosure, the words 'interleaved' and 'intervening' are used interchangeably.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 26 is an example of an application of a method of character selection.

FIG. 35 is a table that shows how values of the format for representing button actuations on the interface correspond with letter assignments for one embodiment of the interface.

FIG. 39 is an example of an application of a method of character selection.

FIGS. 44A and B, FIG. 45, and FIG. 46 are an example of an application of a method of character selection.

FIG. 51 is a plot of graphical representations of possible examples of responses of input selection gestures.

FIGS. 55-58 are examples of an application of a method of character selection.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Various embodiments are described herein that provide overlapping, bi-gesture sensitive character selection interfaces, systems, and devices. Furthermore, various embodiments are described herein that provide methods for selecting characters overlapping, bi-gesture sensitive character selection interfaces, systems, and devices.

Figure 3:
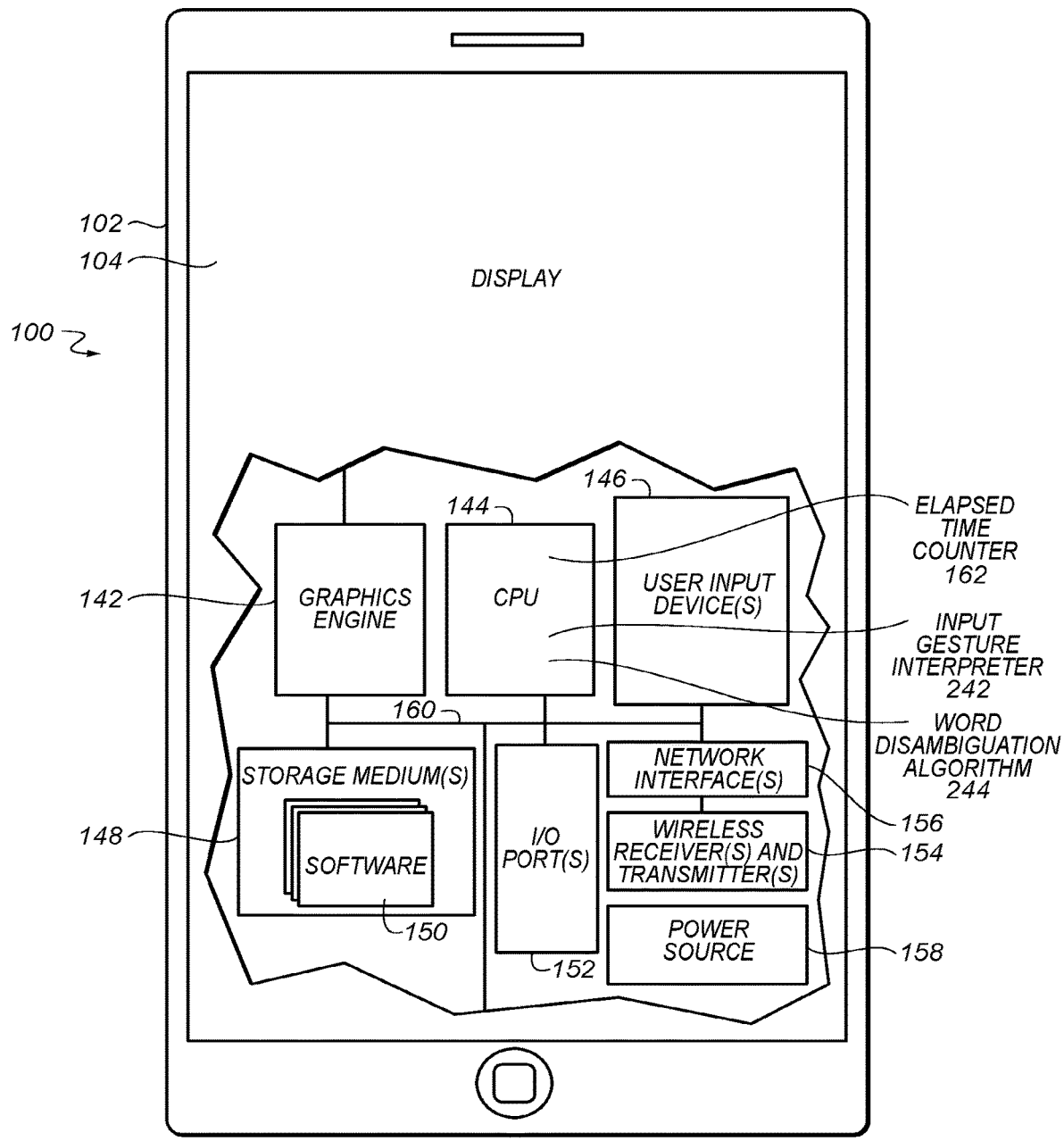
FIG. 3 is a schematic view of an example electronic device with an interleaved bi-gesture sensitive (IBGS) text input interface according to one illustrated embodiment, the electronic device being a mobile device having a case, a display, a graphics engine, a central processing unit (CPU), user input device(s), one or more storage mediums having various software modules thereon that are executable by the CPU, input/output (I/O) port(s), network interface(s), wireless receiver(s) and transmitter(s), a power source, an elapsed time counter, an input gesture interpreter, and a word disambiguation algorithm.

For example, FIG. 3 is a schematic view of one example electronic device, in this case mobile device 100, for input of characters with optional overlapping alternating bi-gesture sensitive selection buttons according to one illustrated embodiment. The mobile device 100 shown in FIG. 3 may have a case 102, a display 104, a graphics engine 142, a central processing unit (CPU) 144, one or more user input devices 146, one or more storage mediums 148 having various software modules 150 stored thereon comprising instructions that are executable by the CPU, input/output (I/O) port(s) 152, one or more wireless receivers and transmitters 154, one or more network interfaces 156, and a power source. In some embodiments, some or all of the same, similar or equivalent structure and functionality of the mobile device 100 shown in FIG. 3 and described herein may be that of, part of or operably connected to a communication and/or computing system of another device or machine.

The mobile device 100 may be any of a large variety of devices such as a cellular telephone, a smartphone, a wearable device, a wristwatch, a portable media player (PMP), a personal digital assistant (PDA), a mobile communications device, a portable computer with built-in or add-on cellular communications, a portable game, a game controller or console, a global positioning system (GPS), a handheld industrial electronic device, a television, an automotive interface, an augmented reality (AR) device, a virtual reality (VR) device or the like, or any combination thereof. The mobile device 100 has at least one central processing unit (CPU) 144 which may be a scalar processor, a digital signal processor (DSP), a reduced instruction set (RISC) processor, or any other suitable processor. The central processing unit (CPU) 144, display 104, graphics engine 142, one or more user input devices 146, one or more storage mediums 148, input/output (I/O) port(s) 152, one or more wireless receivers and transmitters 154, and one or more network interfaces 156 may all be communicatively connected to each other via a system bus 160. The system bus 160 can employ any suitable bus structures or architectures, including a memory bus with memory controller, a peripheral bus, and/or a local bus.

The mobile device 100 also includes one or more volatile and/or non-volatile storage medium(s) 148. The storage mediums 148 may be comprised of any single or suitable combination of various types of processor-readable storage media and may store instructions and data acted on by CPU. For example, a particular collection of software instructions comprising software 150 and/or firmware instructions comprising firmware are executed by CPU 144. The software or firmware instructions generally control many of the operations of the mobile device 100 and a subset of the software and/or firmware instructions may perform functions to operatively configure hardware and other software in the mobile device 100 to provide the initiation, control and maintenance of applicable computer network and telecommunication links from the mobile device 100 to other devices using the wireless receiver(s) and transmitter(s) 154, network interface(s) 156, and/or I/O ports 152. The CPU 144 includes an elapsed time counter 162. The elapsed time counter 162 may be implemented using a timer circuit operably connected to or as part of the CPU 144. Alternately some or all of the elapsed time counter 162 may be implemented in computer software as computer executable instructions stored on volatile and/or non-volatile storage medium(s) 148, for example, that when executed by CPU 144 or a processor of a timer circuit, performs the functions described herein of the elapsed time counter 162.

The CPU 144 includes an input gesture interpreter 242. Alternately, some or all of the input gesture interpreter 242 may be implemented in computer software as computer executable instructions stored on volatile and/or non-volatile storage medium(s) 148, for example, that when executed by the CPU, performs the functions described herein of the input gesture interpreter 242.

The CPU 144 includes a word disambiguation algorithm 244. Alternately, some or all of the word disambiguation algorithm 244 may be implemented in computer software as computer executable instructions stored on volatile and/or non-volatile storage medium(s) 148, for example, that when executed by the CPU, performs the functions described herein of the word disambiguation algorithm 244.

By way of example, and not limitation, the storage medium(s) 148 may be processor-readable storage media which may comprise any combination of computer storage media including volatile and nonvolatile, removable and non-removable media implemented in any method or technology for storage of information such as computer readable instructions, data structures, program modules or other data. Combinations of any of the above should also be included within the scope of processor-readable storage media.

The storage medium(s) 148 may include system memory which includes computer storage media in the form of volatile and/or nonvolatile memory such as read-only memory (ROM) and random access memory (RAM). A basic input/output system (BIOS), containing the basic routines that help to transfer information between elements within mobile device 100, such as during start-up or power-on, is typically stored in ROM. RAM typically contains data and/or program modules that are immediately accessible to and/or presently being operated on by CPU 144. By way of example, and not limitation, FIG. 3 illustrates software modules 150 including an operating system, application programs and other program modules that implement the processes and methods described herein.

The mobile device 100 may also include other removable/non-removable, volatile/nonvolatile computer storage media drives. By way of example only, the storage medium(s) 148 may include a hard disk drive or solid state storage drive that reads from or writes to non-removable, nonvolatile media, an SSD that reads from or writes to a removable, nonvolatile SSD, and/or an optical disk drive that reads from or writes to a removable, nonvolatile optical disk such as a DVD-RW or other optical media. Other removable/non-removable, volatile/nonvolatile computer storage media that can be used in an operating environment of the mobile device 100 include, but are not limited to, flash memory cards, other types of digital versatile disks (DVDs), micro-discs, digital video tape, solid state RAM, solid state ROM, and the like. The storage medium(s) are typically connected to the system bus 160 through a non-removable memory interface. The storage medium(s) 148 discussed above and illustrated in FIG. 3 provide storage of computer readable instructions, data structures, program modules and other data for the mobile device 100. In FIG. 3, for example, a storage medium may store software 150 including an operating system, application programs, other program modules, and program data. The storage medium(s) 148 may implement a file system, a flat memory architecture, a database, or any other method or combination capable for storing such information.

A user may enter commands and information into the mobile device 100 through touch screen display 104 or the one or more other input device(s) 146 such as a keypad, keyboard, tactile buttons, camera, motion sensor, position sensor, light sensor, biometric data sensor, accelerometer, or a pointing device, commonly referred to as a mouse, trackball or touch pad. Other input devices of the mobile device 100 may include a microphone, joystick, thumbstick, game pad, optical scanner, other sensors, or the like. Furthermore the touch screen display 104 or the one or more other input device(s) 146 may include sensitivity to swipe gestures, such as a user dragging a finger tip across the touch screen display 104. The sensitivity to swipe gestures may include sensitivity to direction and/or distance of the swipe gesture. These and other input devices are often connected to the CPU 144 through a user input interface that is coupled to the system bus 160, but may be connected by other interface and bus structures, such as a parallel port, serial port, wireless port, game port or a universal serial bus (USB). Generally, a unique software driver stored in software 150 configures each input mechanism to sense user input, and then the software driver provides data points that are acted on by CPU 144 under the direction of other software 150. The display is also connected to the system bus 160 via an interface, such as the graphics engine 142. In addition to the display 104, the mobile device 100 may also include other peripheral output devices such as speakers, a printer, a projector, an external monitor, etc., which may be connected through one or more analog or digital I/O ports 152, network interface(s) 156 or wireless receiver(s) and transmitter(s) 154. The mobile device 100 may operate in a networked environment using connections to one or more remote computers or devices, such as a remote computer or device.

When used in a LAN or WAN networking environment, the mobile device 100 may be connected via the wireless receiver(s) and transmitter(s) 154 and network interface(s) 156, which may include, for example, cellular receiver(s) and transmitter(s), Wi-Fi receiver(s) and transmitter(s), and associated network interface(s). When used in a WAN networking environment, the mobile device 100 may include a modem or other means as part of the network interface(s) for establishing communications over the WAN, such as the Internet. The wireless receiver(s) and transmitter(s) 154 and the network interface(s) 156 may be communicatively connected to the system bus 160. In a networked environment, program modules depicted relative to the mobile device 100, or portions thereof, may be stored in a remote memory storage device of a remote system.

The mobile device 100 has a collection of I/O ports 152 and/or short range wireless receiver(s) and transmitter(s) 154 and network interface(s) 156 for passing data over short distances to and from the mobile device 100 or for coupling additional storage to the mobile device 100. For example, serial ports, USB ports, Wi-Fi ports, Bluetooth® ports, IEEE 1394 (i.e., FireWire), and the like can communicatively couple the mobile device 100 to other computing apparatuses. Compact Flash (CF) ports, Secure Digital (SD) ports, and the like can couple a memory device to the mobile device 100 for reading and writing by the CPU 144 or couple the mobile device 100 to other communications interfaces such as Wi-Fi or Bluetooth transmitters/receivers and/or network interfaces.

Mobile device 100 also has a power source 158 (e.g., a battery). The power source 158 may supply energy for all the components of the mobile device 100 that require power when a traditional, wired or wireless power source is unavailable or otherwise not connected. Other various suitable system architectures and designs of the mobile device 100 are contemplated and may be utilized which provide the same, similar or equivalent functionality as those described herein.

It should be understood that the various techniques, components and modules described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as various solid state memory devices, DVD-RW, RAM, hard drives, flash drives, or any other machine-readable or processor-readable storage medium wherein, when the program code is loaded into and executed by a machine, such as a processor of a computer, vehicle or mobile device, the machine becomes an apparatus for practicing various embodiments. In the case of program code execution on programmable computers, vehicles or mobile devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system of mobile device 100. However, the program(s) can be implemented in assembly or machine language, if desired. In any case, the language may be a compiled or interpreted language, and combined with hardware implementations.

Figure 4:
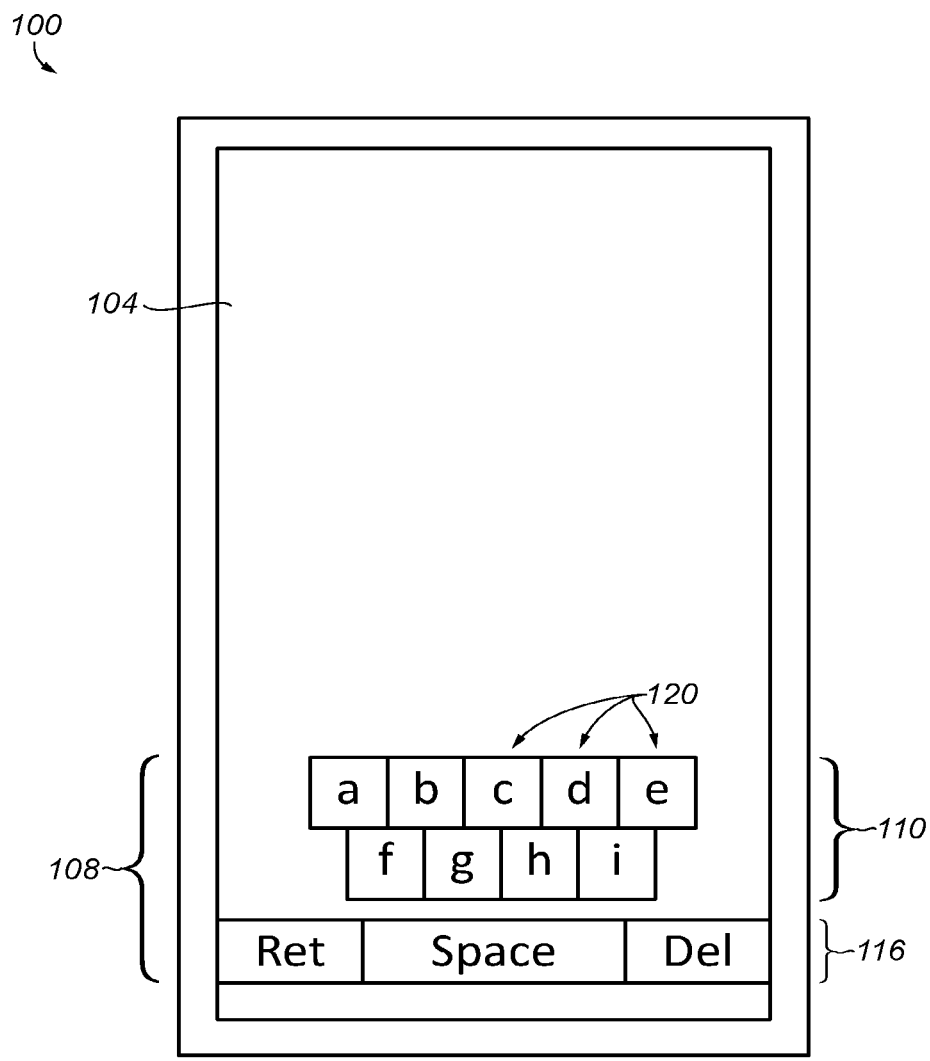
FIG. 4 is a schematic drawing of another embodiment of the electronic device.

FIG. 4 is another embodiment of the electronic device 100. The embodiment depicts a mobile phone or smartphone, but in other embodiments the electronic device could be a wearable device, game, game controller, TV controller, augmented or virtual reality system, portion of an automotive dashboard or any number of other electronic devices that require user input.

The user input interface 108 occupies the lower portion of the display screen 104. The text input interface 110 and the plurality of function buttons 116 make up the user input interface 108. The text input interface includes nine selection buttons 120 split between two rows. In one embodiment, the buttons of each row are all the same size and are positioned immediately adjacent to one another. In still a further embodiment, the buttons from different rows are offset from one another by 50% of button width.

The text input interface 110 of FIG. 4 enables human language input, but in alternative embodiments enables input of non-language data, such as numbers or symbols. The embodiment of FIG. 4 enables English-language input (albeit for only some letters of the alphabet), but in alternative embodiments enables input of other languages. For the embodiment of FIG. 4, selection of a button 120 selects the letter displayed on the selected button.

Figure 5:
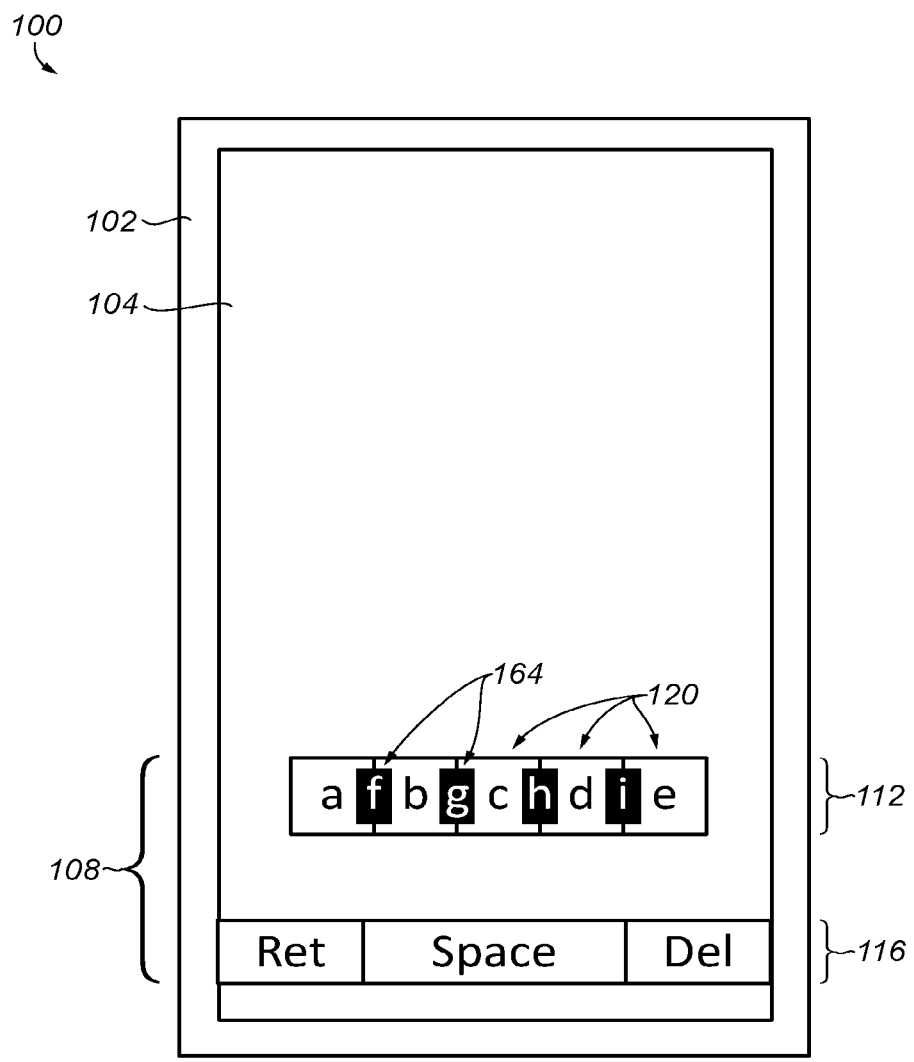
FIG. 5 is a schematic drawing of yet another embodiment of the electronic device.
Figure 6:
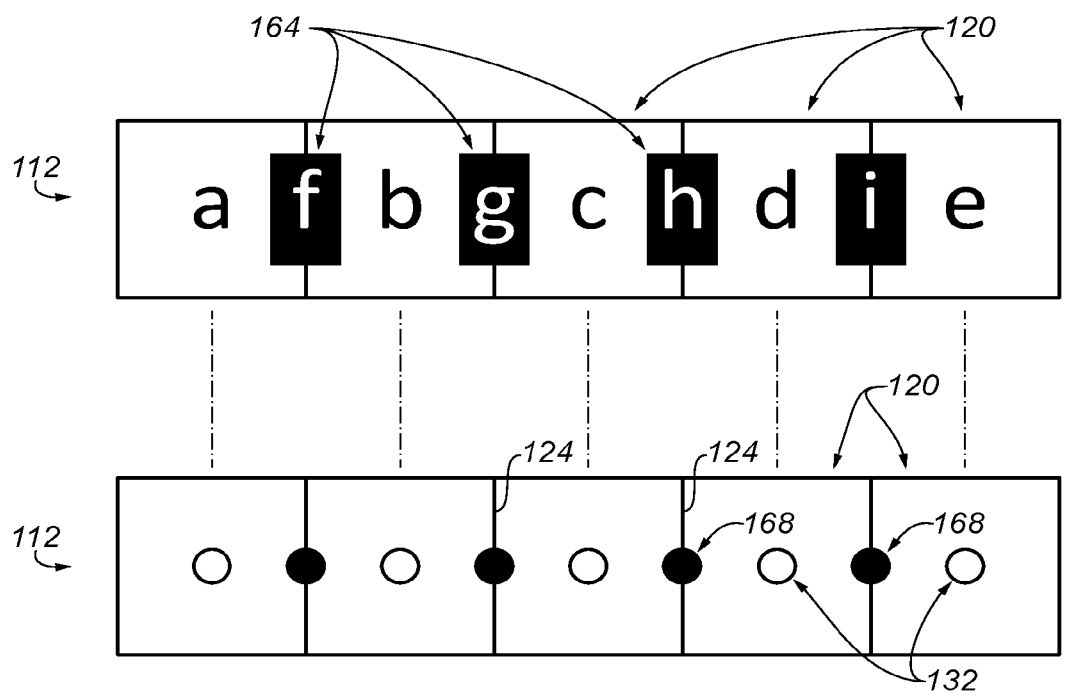
FIG. 6 is two plan views of one embodiment of an interleaved bi-gesture sensitive (IBGS) text input interface.
Figure 7:
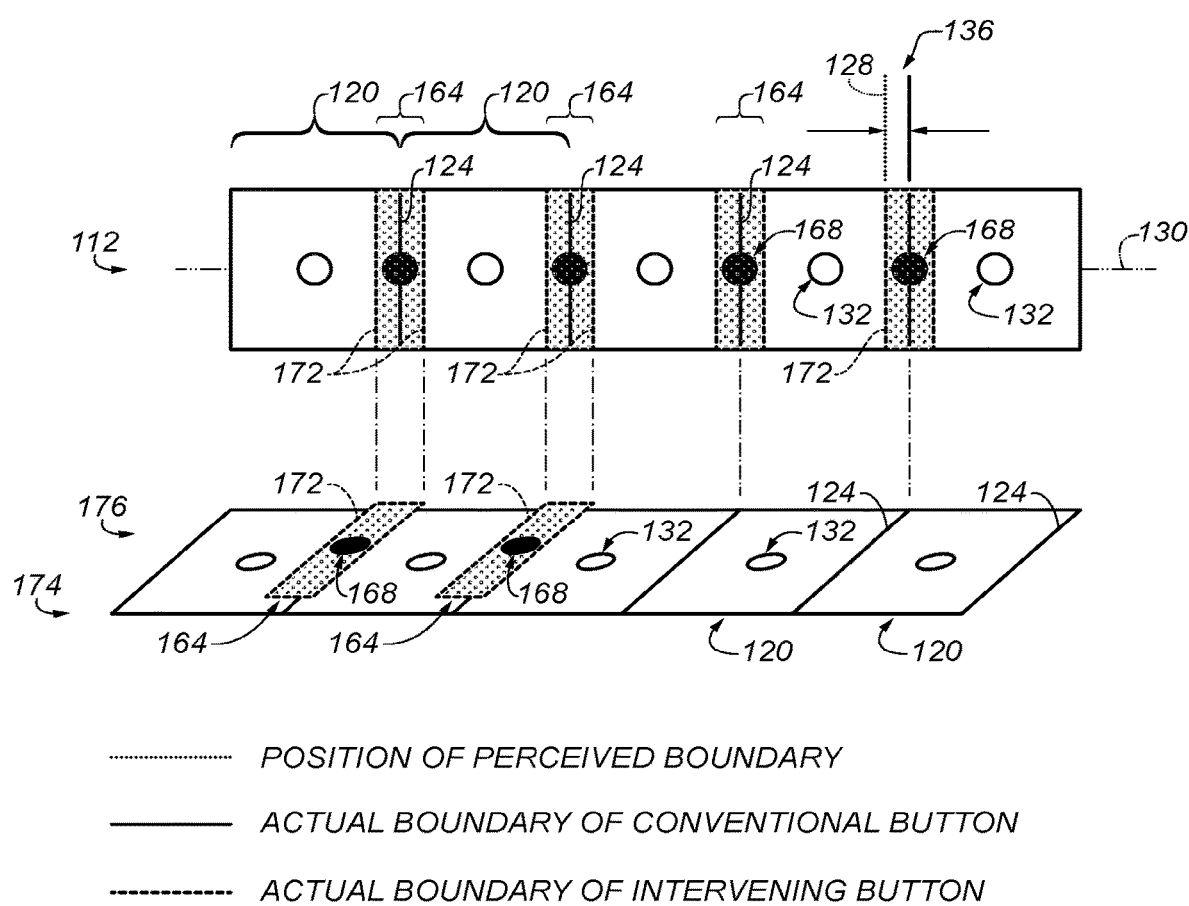
FIG. 7 is a plan view and a perspective view of one embodiment of the interleaved bi-gesture sensitive (IBGS) text input interface.

FIGS. 5-7 together disclose another embodiment of the electronic device 100. The embodiment of FIG. 5 depicts a mobile phone or smartphone. But in alternative embodiments, the electronic device 100 could be a wearable device, game, game controller, TV controller, augmented or virtual reality system, portion of an automotive dashboard or a number of other electronic devices that require user input.

In the embodiment of FIGS. 5-7, the case 102 mechanically supports the touch sensitive display screen 104. The user input interface 108 occupies the lower portion of the display screen 104. The user input interface includes the plurality of function buttons 116 and an interleaved bi-gesture-sensitive (IBGS) text input interface 112.

In the embodiment of FIGS. 5-7, the IBGS interface 112 includes five conventional selection buttons 120 (letters 'a', 'c', 'd' and 'e') and four intervening selection buttons 164 (letters 'a', 'g', 'h' and 'i'). The conventional selection buttons 120 are rectangular, identical in size and shape, and are arranged in a row such that each button is immediately adjacent to two other buttons in the row.

The intervening buttons 164 are arranged in a row too. The intervening buttons appear, from purely a visual standpoint, to interleave with the conventional selection buttons 120. In other words, in a visual scan of the button row, the buttons of the interface 112 appear to alternate between conventional buttons 120 and intervening buttons 164. Although the two kinds of buttons appear to alternate, which is intended, FIGS. 6 and 7 disclose further details about the boundaries of the buttons and how the two kinds of buttons interlace with one another.

Conventional buttons 120 of the interface 112 are actuated using a button tap. Intervening buttons 164 are actuated using an input selection gesture different from a button tap. In other words, intervening buttons are actuated using a selection gesture that is not a button tap. In one embodiment, the gesture that actuates the intervening buttons is a tap-and-swipe gesture, which is a button tap that incorporates a swipe gesture (or lateral displacement) during the tap. In a further embodiment, the gesture that actuates the intervening buttons is a tap-and-swipe gesture where the swipe is to the left or right. In yet another embodiment, the gesture that actuates the intervening buttons is a tap-and-swipe gesture where the swipe is up or down.

In yet a further embodiment, the input gesture interpreter 242 analyzes an input gesture received by the touch sensitive display screen 104, interprets the input gesture as either a button tap or a unique selection gesture, then classifies the input as a conventional button selection or an intervening button selection based on the interpretation.

The text input interface 112 of FIGS. 5-7 enables human language input, but in alternative embodiments enables input of non-language data, such as numbers or symbols. The embodiment enables English-language input (albeit for only some letters of the alphabet), but in alternative embodiments enables input of other languages. For the embodiment of FIGS. 5-7, selection of either a conventional or an intervening button 120, 164 selects the letter displayed on the selected button.

FIG. 6 shows two views of the IBGS text input interface 112 of FIG. 5, but in further detail. The top view shows the IBGS text input interface substantially as it is shown in FIG. 5. The bottom view shows the IBGS text input interface, but with letters omitted so that particular characteristics of the interface can be more easily described.

The bottom view shows the press targets 132 (colored white) for the conventional buttons 120 and an intervening button press target 168 (colored black) for each intervening button 164. For both kinds of buttons, the press target 132, 168, is the point on the button that a user sees as the intended press target. For a symmetrical button, the press target is typically the center of the button.

As the top view shows, the buttons 120, 164 alternate between the conventional kind and the intervening kind along the length of the button row. Therefore, as the bottom view shows, the press targets 132, 168 for the two kinds of buttons alternate along the length of the button row too. As the top view shows, each intervening button 164 lies midway between two adjacent conventional buttons 120. Therefore, as the bottom view shows, each intervening button press target 168 lies midway between two adjacent conventional button press targets 132. As a result, for the embodiment of FIGS. 5-7, each intervening button press target 168 lies directly on the overlapping button boundaries 124 of two adjacent conventional buttons 120. In an alternative embodiment, the intervening buttons do not lie midway between two adjacent conventional buttons and the intervening press targets do not lie directly on the overlapping button boundaries of two adjacent conventional buttons.

FIG. 7 shows two more views of the IBGS text input interface 112 of FIGS. 5-7, but in still further detail. The top view shows a plan view of the IBGS interface 112 with button boundary details. The bottom view shows an exploded perspective view of the IBGS interface.

As the plan view shows, the conventional and intervening buttons 120, 164 lie along the imaginary axis 130. The press targets 132, 168 of each button lie on the imaginary axis. The conventional buttons 120 are rectangular, are distributed uniformly along the imaginary axis, and lie immediately adjacent to one another along the axis. The boundary of each conventional button overlaps the boundary of the button's two adjacent conventional buttons, except at the row end. One intervening button (area with hatching) lies midway between each two adjacent conventional buttons. Each intervening button press target lies directly on the overlapping conventional button boundaries of each two adjacent conventional buttons.

In the embodiment of FIGS. 5-7 the intervening buttons are rectangular, are the same height as the conventional buttons, but are narrower in width. Therefore each intervening button has an intervening button boundary 172 (indicated by a dashed line) that lies between the button press targets 132 of each two adjacent conventional buttons.

As the plan view of FIG. 7 shows, the intervening buttons 164 completely overlap the conventional buttons 120. Because the conventional buttons are immediately adjacent to one another in the row, conventional buttons occupy 100% of the selectable area of the IGBS interface 112. In comparison, the intervening buttons 164 are narrower (in width) than the conventional buttons and therefore do not lie immediately adjacent to one another along the row. As a consequence, intervening buttons occupy less than 100% of the IBGS interface's total selectable area.

As a further consequence, the area of the IBGS interface occupied by only conventional buttons (i.e., area without hatching) can be actuated with only the button tap input gesture. Area occupied by overlapping conventional and intervening buttons (i.e., area with hatching) can be actuated by either the button tap input gesture or the unique selection gesture, such as the tap-and-swipe. For areas of the IBGS interface where actuation by either input gesture is possible, the input gesture interpreter 242 interprets the received gesture as either a button tap or a unique selection gesture, classifies the input as either a conventional button selection or an intervening button selection based on the gesture interpreted, and then identifies the intended letter based on which button received the interpreted gesture.

The perspective view of FIG. 7 offers an alternative way for understanding how the conventional and intervening buttons 120, 164 interlace.

Conceptually, the conventional and intervening buttons can be thought of as lying on separate and independent layers. In one embodiment, the conventional buttons 120 lie on a lower button layer 174 and the intervening buttons 164 lie on an upper button layer 176. In a further embodiment, the lower layer is receptive to a button tap input gesture and the upper layer is receptive to a selection gesture unique from a button tap, such as a tap-and-swipe. When an input occurs, both layers interpret the received gesture. The layer receptive to the received gesture (in this embodiment, either a tap or a tap-and-swipe) records the selection. The IBGS interface 112 selects the letter that corresponds to (1) the position on the interface that receives gesture and (2) the layer that records the input gesture.

In this approach, the gesture interpreter 242 can be thought of as a filter. The gesture interpreter receives a selection gesture, interprets it, and then assigns the input to the appropriate layer according to the gesture interpreted. Then the assigned layer interprets the intended letter based on where on the layer that the input gesture is received.

For the embodiment of FIGS. 5-7, the perceived boundary between two buttons is the boundary 172 of the intervening button 164. That is the case because a user experienced with the conventional text input interface 110 would not expect to be able to select a conventional button in the area where an intervening button lies. A typical user would expect that they must avoid tapping the intervening button in order to select the conventional button. As such, the perceived button boundary indicator 128 (dotted line) points to the intervening button boundary 172.

Keep in mind that adjacent conventional buttons are still actually adjacent. The conventional button boundary 124 still lies at (or on, or under) the intervening button press target 168. A button tap on the intervening button press target 168 is interpreted as a conventional button press and selects the letter for the conventional button that gets tapped. Those facts remain in force even in the presence of an intervening button.

As a consequence of the intervening buttons 164, there is a non-zero distance between the perceived button boundary (shown by the indicator 128) and the actual button boundary 124 of the conventional selection buttons 120. The difference indicator 136 shows the distance between the perceived and actual boundaries of the conventional selection buttons. For the embodiment of FIGS. 5-7, the distance between the perceived button boundary and the actual button conventional button boundary is 50% of the intervening button width.

A benefit of a non-zero distance between the perceived and actual button boundary is that the separation leads a user to underestimate the area they have to execute a selection gesture. In the view at the top of FIG. 6, a user would likely believe that to select the letter 'c', they must tap between the buttons that select the letters 'g' and 'h'. In fact they must only tap between the buttons that select the letters 'b' and 'd'.

The intervening letters cause the user to guide their conventional button selections more accurately toward the conventional button press target than the gesture actually needs to be. In doing so, the user guides their selection away from the conventional button press boundary. That effect reduces the likelihood that a selection error occurs due to an inaccurate button press selection. The effect is particularly valuable for text input interfaces where the selection button size is less than the size of the selector, such as text input interfaces on mobile devices.

Figure 8:
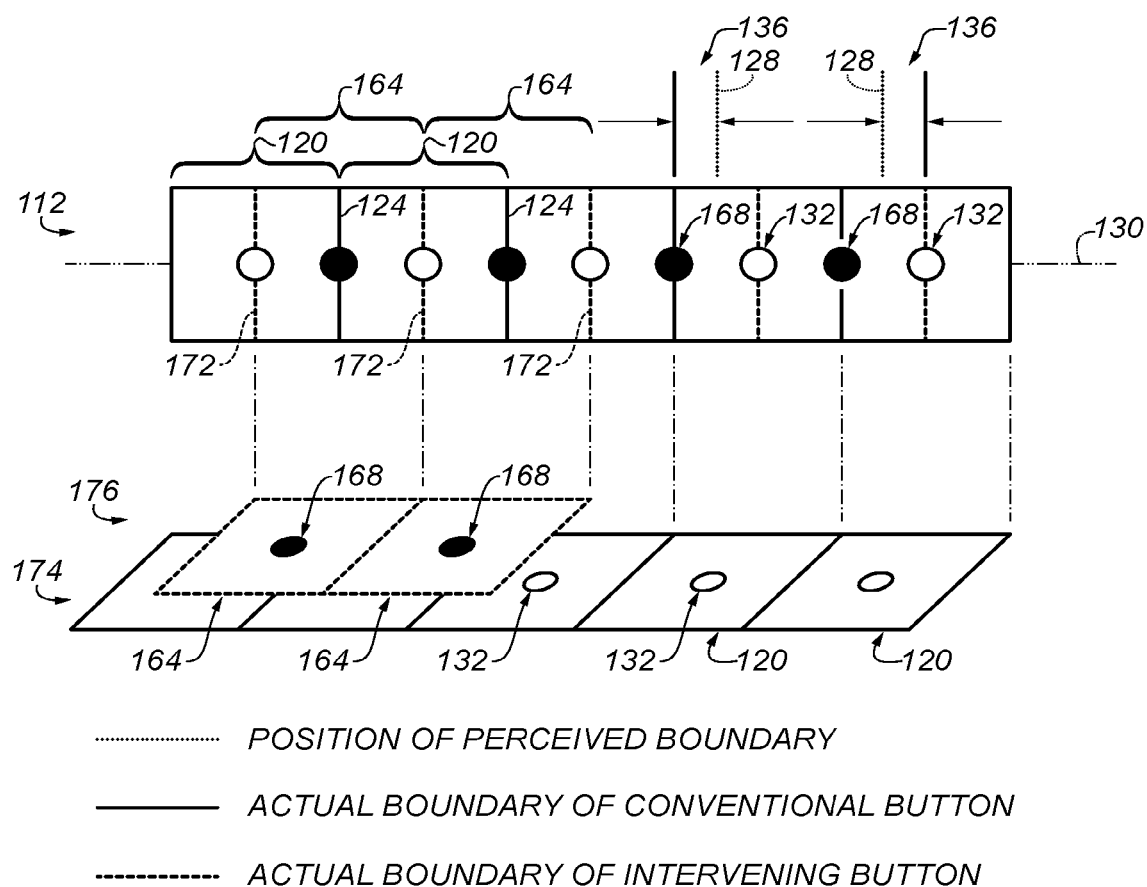
FIG. 8 is a plan view and a perspective view of one embodiment of the interleaved bi-gesture sensitive (IBGS) text input interface.

FIGS. 8-11 together disclose another embodiment of the IBGS text input interface 112 of the electronic device 100. FIG. 8 shows the interface in both a plan view and an exploded perspective view.

As the plan view shows, both the conventional and intervening buttons 120, 164 lie in a row along the imaginary axis 130. The press targets 132, 168 of each button lie directly on the imaginary axis. The conventional buttons 120 are rectangular, are distributed uniformly along the imaginary axis, and lie immediately adjacent to one another along the axis. The boundary 124 of each conventional button overlaps the boundary of its two adjacent conventional buttons, except at the row end. The intervening buttons are also rectangular, distributed uniformly along the imaginary axis and, in contrast to the embodiment of FIGS. 5-7, also lie immediately adjacent to one another along the axis. Therefore the intervening button boundary 172 (indicated by a dashed line) of each intervening button overlaps the boundary of its two adjacent intervening buttons, except at the row end.

One intervening button 164 lies midway between every two adjacent conventional buttons 120. Each intervening button press target 168 lies directly on the overlapping conventional button boundaries 124 of the two adjacent conventional buttons. Furthermore, one conventional button lies midway between every two adjacent intervening buttons. Each conventional button press target 132 lies directly on the overlapping intervening button boundaries 172 of the two adjacent intervening buttons, except at the row end where the press target lies on only one intervening button boundary.

Said another way, the conventional and intervening buttons 120,164 are nominally the same size, same shape and have the same distribution along the imaginary axis. One difference is that the two kinds of buttons are offset from one another along the imaginary axis by 50% of the button width.

As the plan view of FIG. 8 shows, the conventional and intervening buttons 164 completely overlap one another. Because the conventional buttons are immediately adjacent to one another in the row, conventional buttons occupy 100% of the selectable area of the IBGS interface 112. Because the intervening buttons are immediately adjacent to one another in the row, intervening buttons occupy 100% of the selectable area of the IBGS interface 112 as well.

As a consequence, there is no area of the IBGS interface that cannot be actuated with either the button tap selection gesture or the unique selection gesture, such as the tap-and-swipe. Therefore, wherever an input gesture occurs on the IBGS interface, the input gesture interpreter 242 interprets the received gesture as either a button tap or a unique selection gesture, classifies the input as either a conventional button selection or an intervening button selection based on the gesture interpreted, and then identifies the intended letter based on which button received the interpreted gesture.

The perspective view of FIG. 8 offers an alternative way for understanding how the conventional and intervening buttons 120, 164 interlace. Conceptually, the conventional and intervening buttons can be thought of as lying on separate and independent layers. In one embodiment, the conventional buttons 120 lie on a lower button layer 174 and the intervening buttons 164 lie on an upper button layer 176. In a further embodiment, the lower layer is receptive to a button tap input gesture and the upper layer is receptive to a selection gesture different from a button tap, such as a tap-and-swipe. When an input occurs, both layers interpret the received gesture. The layer receptive to the received gesture (either a tap or a tap-and-swipe) records the selection. The IBGS interface 112 identifies the letter that corresponds to (1) the layer that records the input gesture and (2) the position of the interface that receives the gesture.

In this approach, the gesture interpreter 242 can be thought of as a filter. The gesture interpreter receives a selection gesture, interprets it, and then assigns the input to the appropriate layer according to the gesture interpreted. Then the assigned layer interprets the intended letter based on where on the layer that the input gesture is received.

Figure 9:
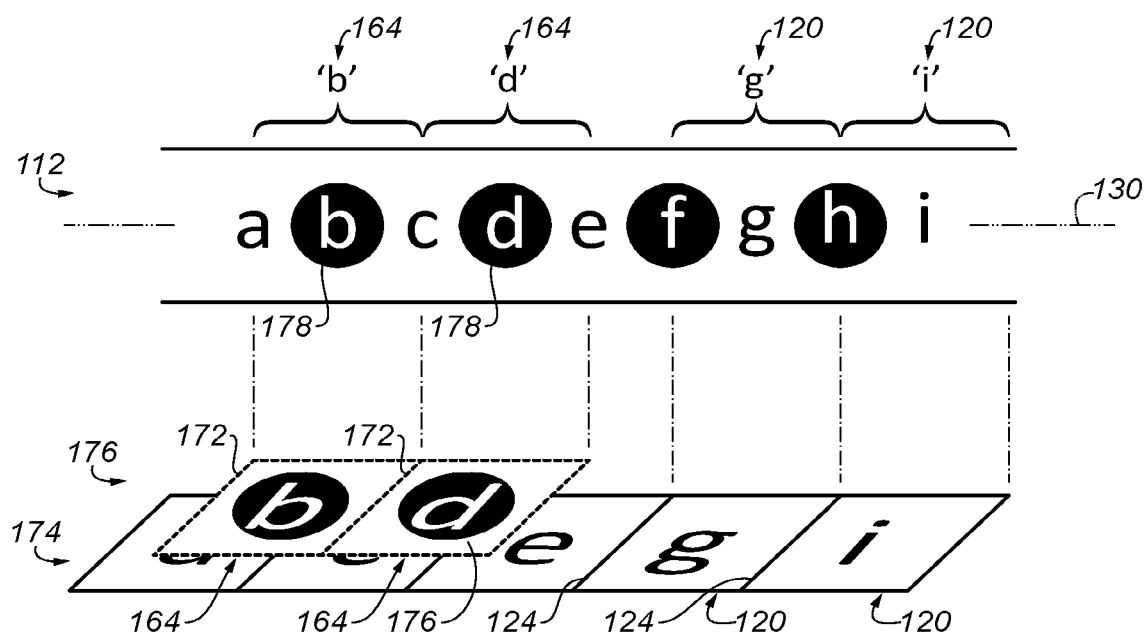
FIG. 9 is a plan view and a perspective view of one embodiment of the interleaved bi-gesture sensitive (IBGS) text input interface.

FIG. 9 shows two more views of the embodiment of the IBGS text input interface 112 of FIGS. 8-11. A plan view shows the interface as a user would see it. An exploded perspective view shows both the letters and the conventional and intervening button boundary lines 124, 172.

In the plan view, the conventional and intervening buttons 120, 164 lie in a row along the imaginary axis 130 as shown in the previous Figure. One letter is assigned to each button. In this particular embodiment letters occur in alphabetical order starting from the left, but in alternative embodiments the letters are assigned in non-alphabetical order. The button boundary lines 124, 172 are omitted from the view, but brackets above the interface 112 indicate where boundaries of the buttons 120, 164 lie. In this embodiment, a swipe selection mark 178 identifies the letters of the interface that require a unique selection gesture, such as a tap-and-swipe, in order to be selected. Letters not identified by the swipe selection mark are selected using a button tap.

In the perspective view, the conventional and intervening buttons 120, 164 are shown on separate layers 174, 176 and include the button boundary lines 124, 172. One letter is assigned to each button. The button boundary lines 124, 172 indicate where button boundaries lie and how the buttons interlace with one another. In the embodiment of FIGS. 8-11, the button to which letter 'b' is assigned overlaps 50% with the button to which letter 'a' is assigned and 50% with the button to which letter 'c' is assigned. The button to which letter 'c' is assigned overlaps 50% with the button to which letter 'b' is assigned and 50% with the button to which letter 'd' is assigned. The button to which letter 'd' is assigned overlaps 50% with the button to which letter 'c' is assigned and 50% with the button to which letter 'e' is assigned, and so on. In an alternative embodiment, the degree of overlap between buttons is not exactly 50%.

In the plan view, which in the embodiment of FIGS. 8-11 is the view of the interface 112 that a user would see, the interface does not display the button boundaries. As a result, a user must conclude for themselves where button boundaries lie and how precisely they must be make their selection presses. In the absence of visible button boundaries, a user would typically conclude that the boundary on each side of their desired letter lies midway between the desired letter and the adjacent letter, as described in the following two Figures.

Figure 10:
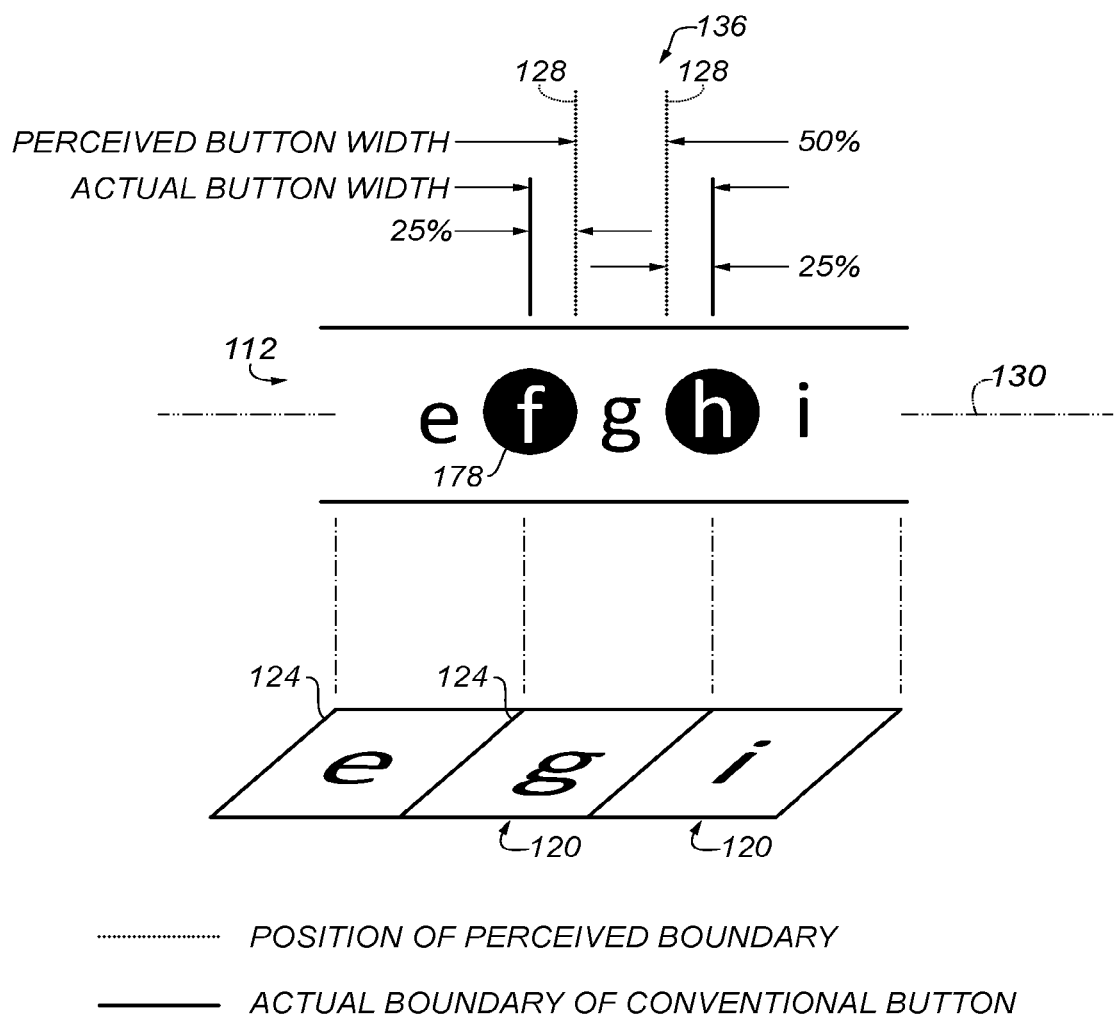
FIG. 10 is a plan view and a perspective view of one embodiment of the interleaved bi-gesture sensitive (IBGS) text input interface.
Figure 11:
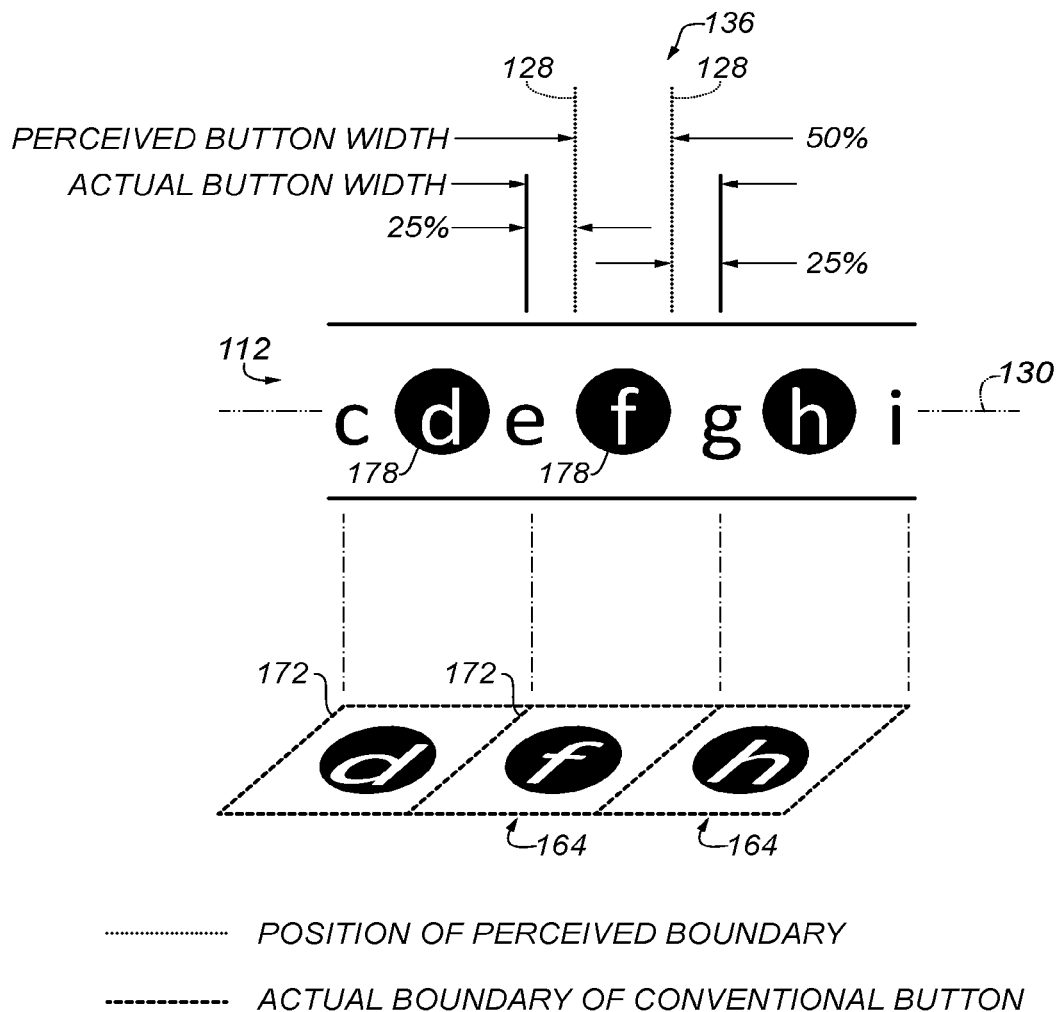
FIG. 11 is a plan view and a perspective view of one embodiment of the interleaved bi-gesture sensitive (IBGS) text input interface.

FIGS. 10 and 11 show a portion of the interface 112 shown in FIG. 9.

In FIG. 10, the perceived button boundary indicator 128 points to where the perceived button boundary lies for the conventional button 120 assigned the letter 'g'. On the left side of the button, the perceived button boundary lies midway between the displayed letters T and 'g'. On the right side of the button, the perceived button boundary lies midway between the displayed letters 'g' and 'h'.

The perspective view of FIG. 10 shows where the actual conventional button boundaries 124 lie for the three conventional buttons 120 in the plan view. Projecting the actual conventional button boundaries 124 from the perspective view onto the imaginary axis of the plan view shows that the actual button boundaries 124 do not match where the perceived button boundaries lie.

The boundary difference indicator 136 highlights the separation between the perceived and actual boundaries for the conventional selection button 120 with assigned letter 'g'. In an embodiment such as FIGS. 8-11 where the conventional and intervening buttons are the same size, the distance between the perceived and actual boundaries for the conventional selection buttons is 25% of button width. The overall difference in size between the actual and perceived conventional button width is 50% of button width. In FIG. 11, the perceived button boundary indicator 128 points to where the perceived button boundary lies for the intervening button 164 assigned the letter T. On the left side of the button, the perceived button boundary lies midway between the displayed letters 'e' and T. On the right side of the button, the perceived button boundary lies midway between the displayed letters T and 'g'.

The perspective view of FIG. 11 shows where the actual button boundaries 172 lie for the three intervening buttons 164 in the plan view. Projecting the actual button boundaries 172 from the perspective view onto the imaginary axis of the plan view shows that the actual button boundaries 172 do not match where the perceived button boundaries lie.

The boundary difference indicator 136 highlights the separation between the perceived and actual boundaries for the intervening selection button 164 with assigned letter T. In an embodiment such as FIGS. 8-11 where the conventional and intervening buttons are the same size, the distance between the perceived and actual boundaries for the intervening selection buttons is 25% of button width. The overall difference in size between the actual and perceived intervening button width is 50% of button width.

Looking back to the plan view of FIG. 8, the difference indicator 136 shows the separation between the perceived and actual boundaries for the conventional selection buttons 120 (the indicator 136 on the left). In the plan view of FIG. 8, the difference indicator 136 shows the separation between the perceived and actual boundaries for the intervening selection buttons 164 (the indicator 136 on the right).

Note that although letters of adjacent conventional buttons are separated by the letter of an intervening button, the adjacent conventional buttons themselves are still adjacent. The conventional button boundary 124 still lies at (or on, or under) the intervening button press target 168. A button tap on the intervening button press target 168 is interpreted as a tap on a conventional button and selects the letter of whichever conventional button gets tapped.

Furthermore, although letters of adjacent intervening buttons are separated by the letter of a conventional button, the adjacent intervening buttons themselves are still adjacent. The intervening button boundary 172 still lies at (or on, or under) the conventional button press target 124. A unique input button gesture, for example a tap-and-swipe, on the conventional button press target 124 is interpreted as a tap on an intervening button and selects the letter of whichever intervening button gets tapped.

Figure 12:
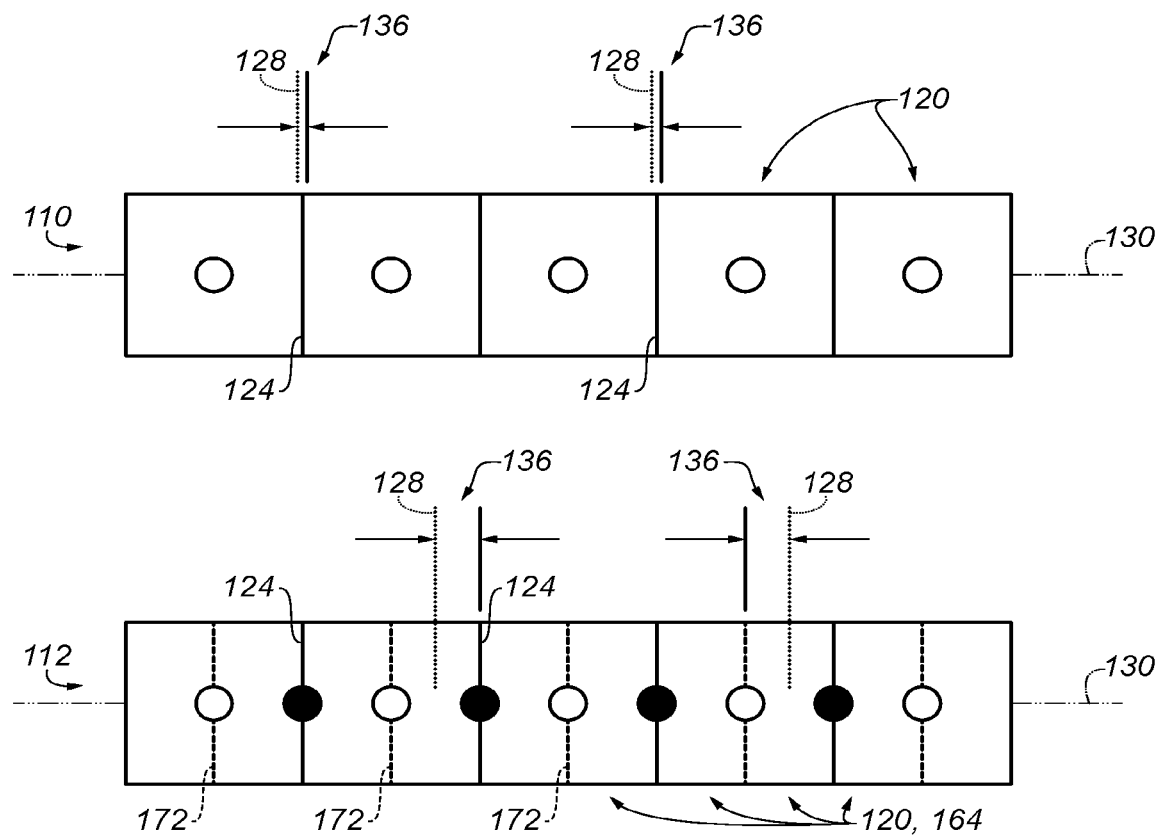
FIG. 12 is two plan views of one embodiment of the interleaved bi-gesture sensitive (IBGS) text input interface.

FIG. 12 compares the perceived button boundary, actual button boundary and the distance between the perceived and actual boundaries for the conventional text input interface 110 and the interleaved bi-gesture sensitive (IBGS) interface 112. For this comparison, FIG. 12 looks at the embodiment of the conventional text input interface 110 of FIG. 2 and the embodiment of the IBGS interface of FIGS. 8-11.

Figure 1:
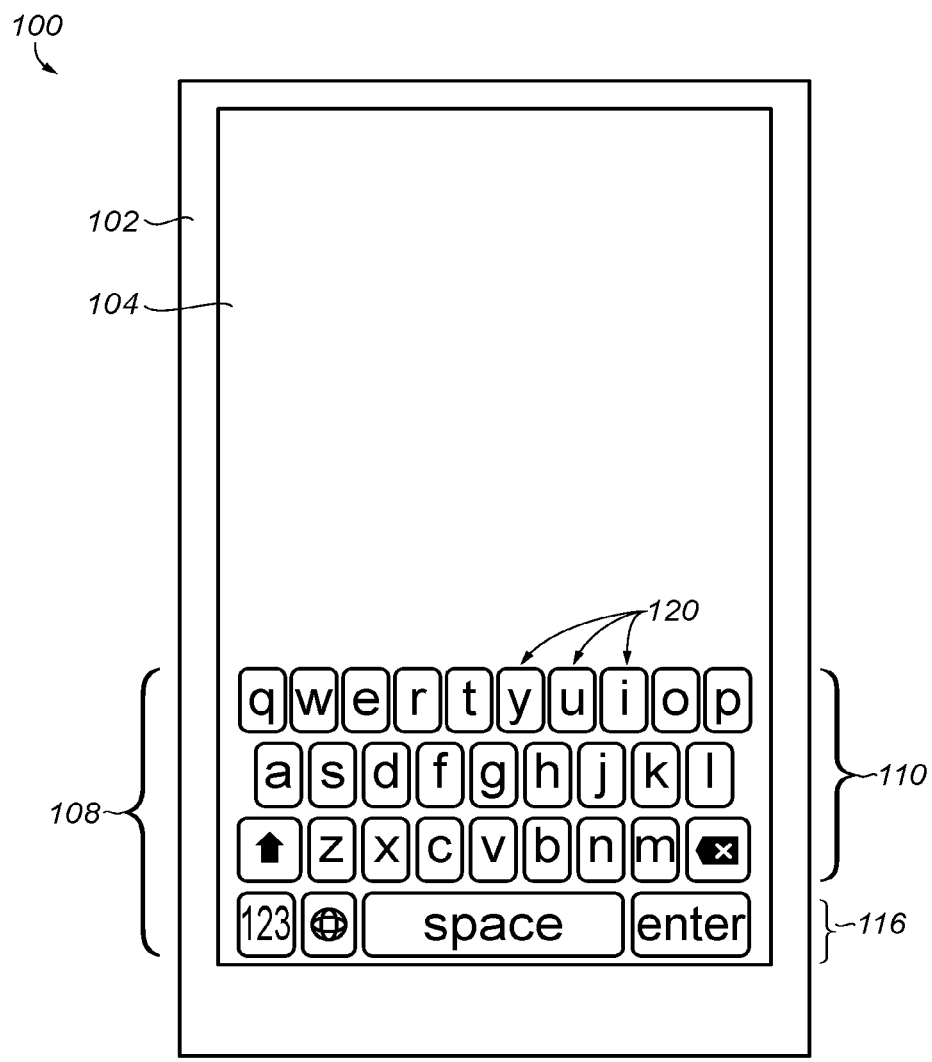
FIG. 1 is a schematic drawing of one embodiment of an electronic device.
Figure 2:
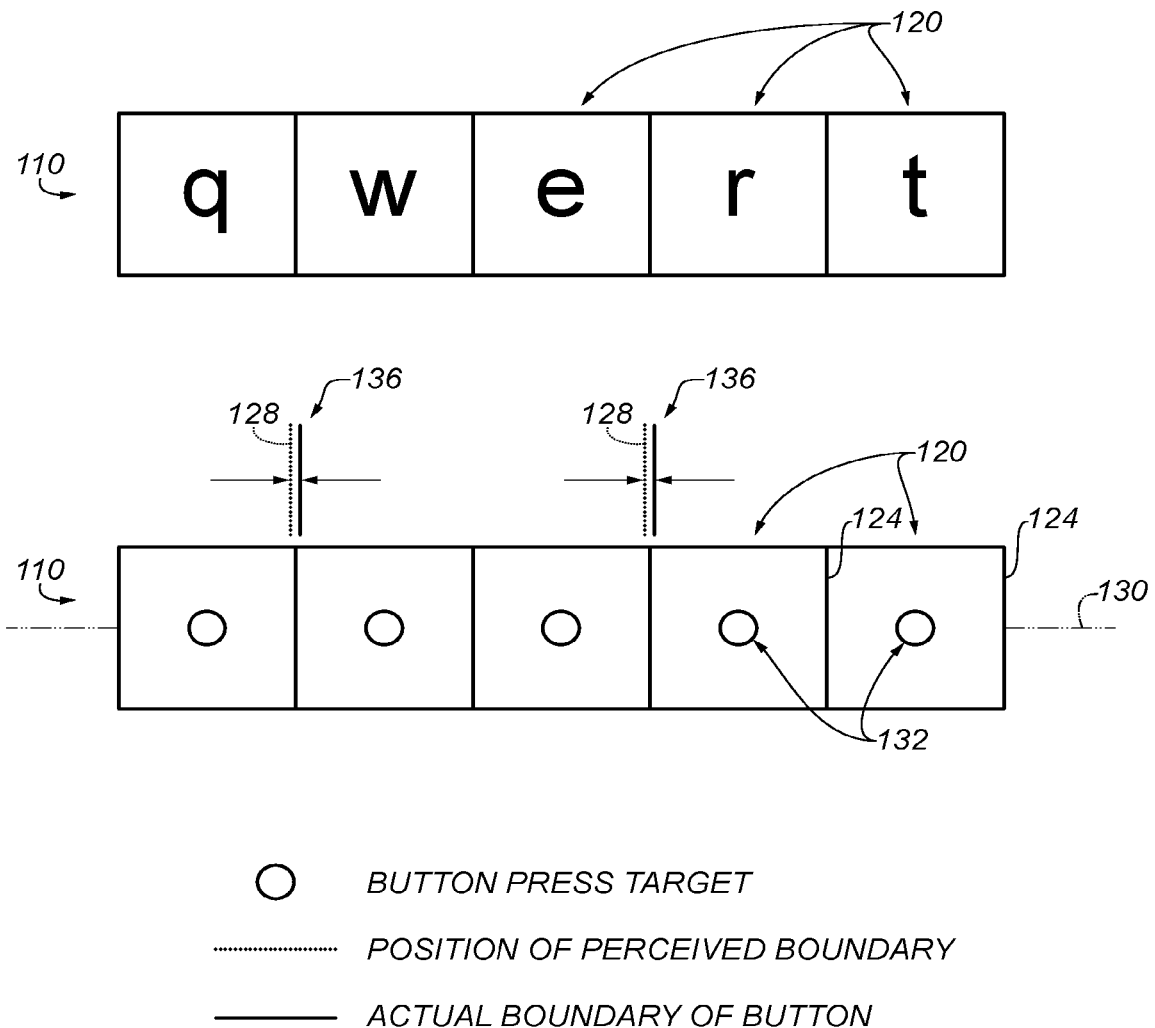
FIG. 2 is two plan views of one embodiment of a conventional text input interface.

In the top view, as previously described in FIG. 2, there is no difference between the perceived button boundary (identified by the perceived button boundary indicator 128) and the actual button boundary 124 for the conventional text input interface 110.

In the bottom view, as previously described in FIGS. 8-11, there is a difference between the perceived button boundary (identified by the perceived button boundary indicator 128) and the actual button boundary 124 for the conventional buttons 120 of the IBGS text input interface 112. Furthermore, as previously described in FIGS. 8-11, there is a difference between the perceived button boundary (identified by the perceived button boundary indicator 128) and the actual button boundary 172 for the intervening buttons 164 of the IBGS text input interface 112 as well.

For the embodiment of FIGS. 8-11 the separation between the perceived and actual boundaries for the conventional buttons is nominally 25% of the button width. For the embodiment of FIGS. 8-11 the separation between the perceived and actual boundaries for the intervening buttons is nominally 25% of the button width.

As described earlier, a benefit of a non-zero distance between the perceived and actual button boundary is that the separation leads a user to underestimate the area they have to execute a selection gesture.

The intervening letters cause the user to guide their conventional button selections more accurately toward the conventional button press target than the gesture actually needs to be. In doing so, the user guides their selection away from the conventional button press boundary. At the same time, the conventional letters cause the user to guide their intervening button selections more accurately toward the intervening button press target than the gesture actually needs to be. In doing so, the user guides their selection away from the intervening button press boundary.

That effect reduces the likelihood that a selection error occurs due to an inaccurate button press selection. The effect is particularly valuable for text input interfaces where the selection buttons are smaller than the selector that is actuating them, such as the finger-actuated text input interface of a mobile device.

The views of FIG. 12 clearly show that the perceived and actual button boundaries of an IBGS interface 112 have greater separation than the perceived and actual button boundaries of a conventional text input interface 110.

Figure 13:
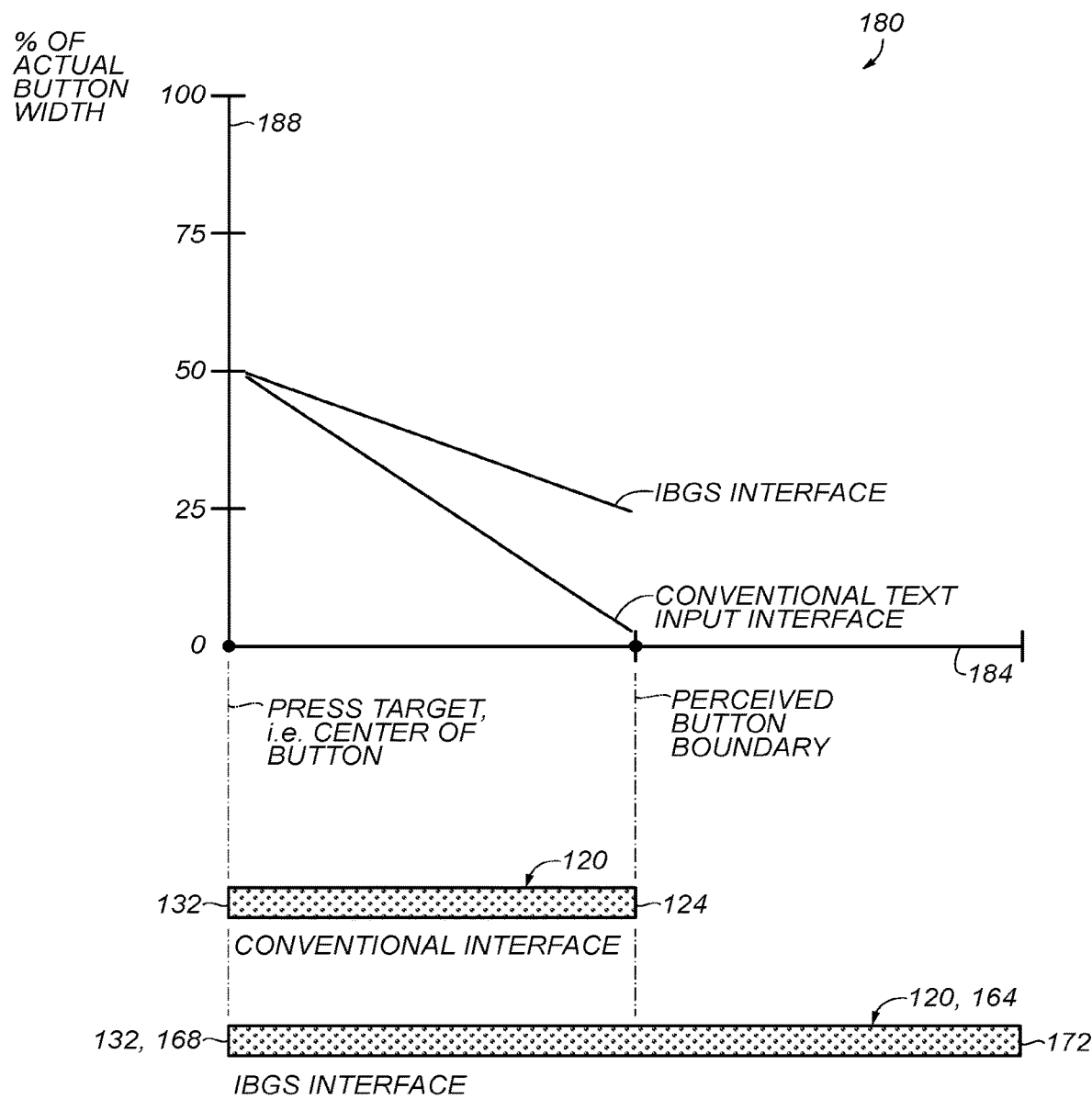
FIG. 13 is a plot of the distance from a button boundary as a function of position on the button for two embodiments of a text input interface.

FIG. 13 is a plot 180 of the distance from a button's actual boundary as a function of position on the button. The plot 180 shows the response for two different text input interfaces: (1) the embodiment of the conventional text input interface 110 of FIG. 2, and (2) the embodiment of the IBGS text input interface 112 of FIGS. 8-11. Note that for the embodiment of the IBGS interface of FIGS. 8-11, the response is the same whether the distance is plotted for the conventional button 120 or the intervening button 164 because the two kinds of buttons are the same size.

An x-axis 184 of the plot 180 is a reference against which to plot selection button position. The origin of the x-axis represents the center of the selection button. Positive advancement along the x-axis represents advancement from the button's center outward toward the button's boundary. Below the x-axis 184 are representative cross-sections of the button 120 from the conventional text input interface 110 and the conventional button 120 (or intervening button 164) from the IBGS text input interface 112. Because the origin of the x-axis is the center of the button, the representative cross-sections of the selection buttons are just one half the width of the button. Therefore, a projection from the origin of the x-axis onto the representative cross-section of the button 120 from the conventional text input interface 110 lands on the button press target 132 of the button. Furthermore, a projection from the origin of the x-axis onto the representative cross-section of the conventional button 120 (or intervening button 164) from the IBGS interface 112 lands on the button press target 132 (or press target 168) of the button.

The perceived button boundary occurs at approximately the middle of the x-axis. A projection from the perceived button boundary on the x-axis to the representative selection button cross-section 120 for the conventional interface 110 shows that for the conventional interface the perceived and actual button boundaries are the same (0%, i.e., actually at the button boundary).

A projection from the maximum value on the x-axis 184 onto the representative cross-section of the conventional button 120 (or intervening button 164) from the IBGS interface 112 lands on the actual button boundary 172 of the button.

A y-axis 188 of the plot 180 provides a reference against which to plot distance from the actual button boundary. The y-axis measures the distance relative to the width of the selection button, i.e., distance/button width 100. Because the origin of the plot is the press target 132, 168, the response at the y-axis for either interface 110, 112 is 50%.

For the conventional interface 110, the plotted distance from the actual button boundary 124 falls linearly from 50% at the press target 132 to 0% at the perceived boundary. The distance falls all the way to 0% because for the conventional interface at that position on the button the perceived and actual button boundaries are the same.

For the IBGS interface 112, the plotted distance from the actual button boundary 172 falls linearly from 50% at the press target 132, 168 to 25% at the perceived boundary. The response falls to only 25% at the perceived boundary because for the IBGS interface the actual button boundary 172 extends beyond the perceived button boundary for reasons explained in FIGS. 8-12.

The difference in the distance to reach the actual button boundary from the perceived boundary (i.e., 0% for the conventional interface, 25% for the IBGS interface) shows a benefit of the IBGS interface. If a user's button selections land within, or at least nearly within, the perceived button boundary then the likelihood that their selections land beyond the 25% margin is low.

Figure 14:
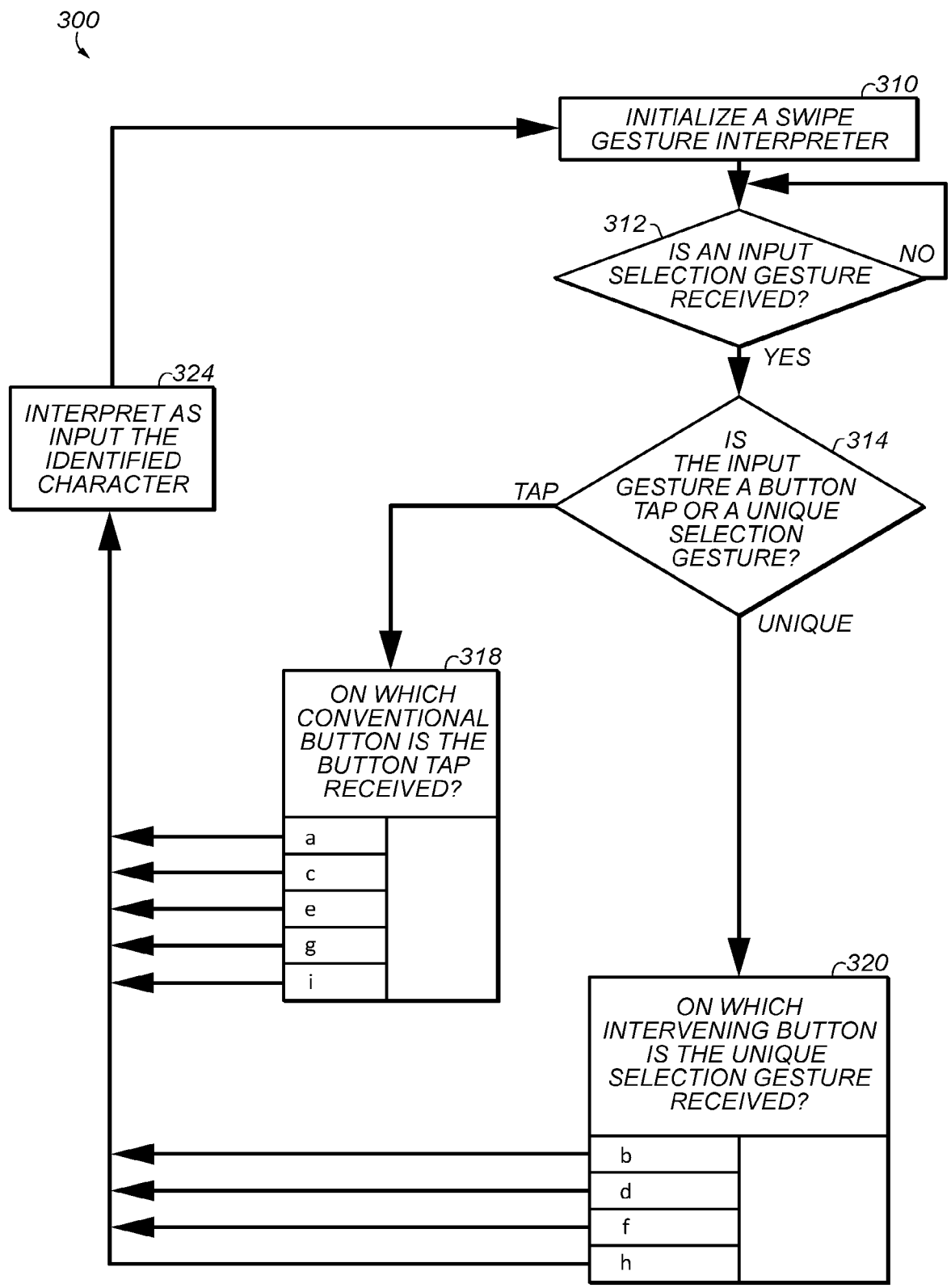
FIG. 14 is a flowchart of an embodiment of a method for a processor of the electronic device 100 to interpret character selections.

FIG. 14 shows a flowchart of an embodiment of a method 300 for the processor 144 of the electronic device 100 to interpret character selections.

In step 310 of a method 304, the processor 144 initializes the input gesture interpreter 242. In step 310 of method 300, the input gesture interpreter 242 monitors the IBGS text input interface 112 for an input selection gesture. Once a first selection gesture occurs, in step 314, the input gesture interpreter determines if the input selection gesture is a button tap or a unique selection gesture.

If in step 314 the input gesture interpreter 242 determines the selection gesture is a button tap, in subsequent step 318 the input gesture interpreter determines which conventional button 120 receives the button tap. If in step 314 the input gesture interpreter 242 determines the selection gesture is a unique selection gesture, in one embodiment a tap-and-swipe selection gesture, then in subsequent step 320 the input gesture interpreter determines which intervening button 164 receives the unique selection gesture.

In a final step 324, the CPU 144 interprets as input the character identified by the determination of the selection button that received the input gesture.

According to a further embodiment of the invention, the CPU executes method 300 iteratively, selecting one character with each iteration. According to another embodiment, in a further step the CPU 144 displays the identified character on the display screen 104.

Although method 300 of FIG. 14 is one embodiment of a method for specifying series of characters, the scope of the method is not limited by this particular embodiment, but rather by the scope of the claims.

Figure 15:
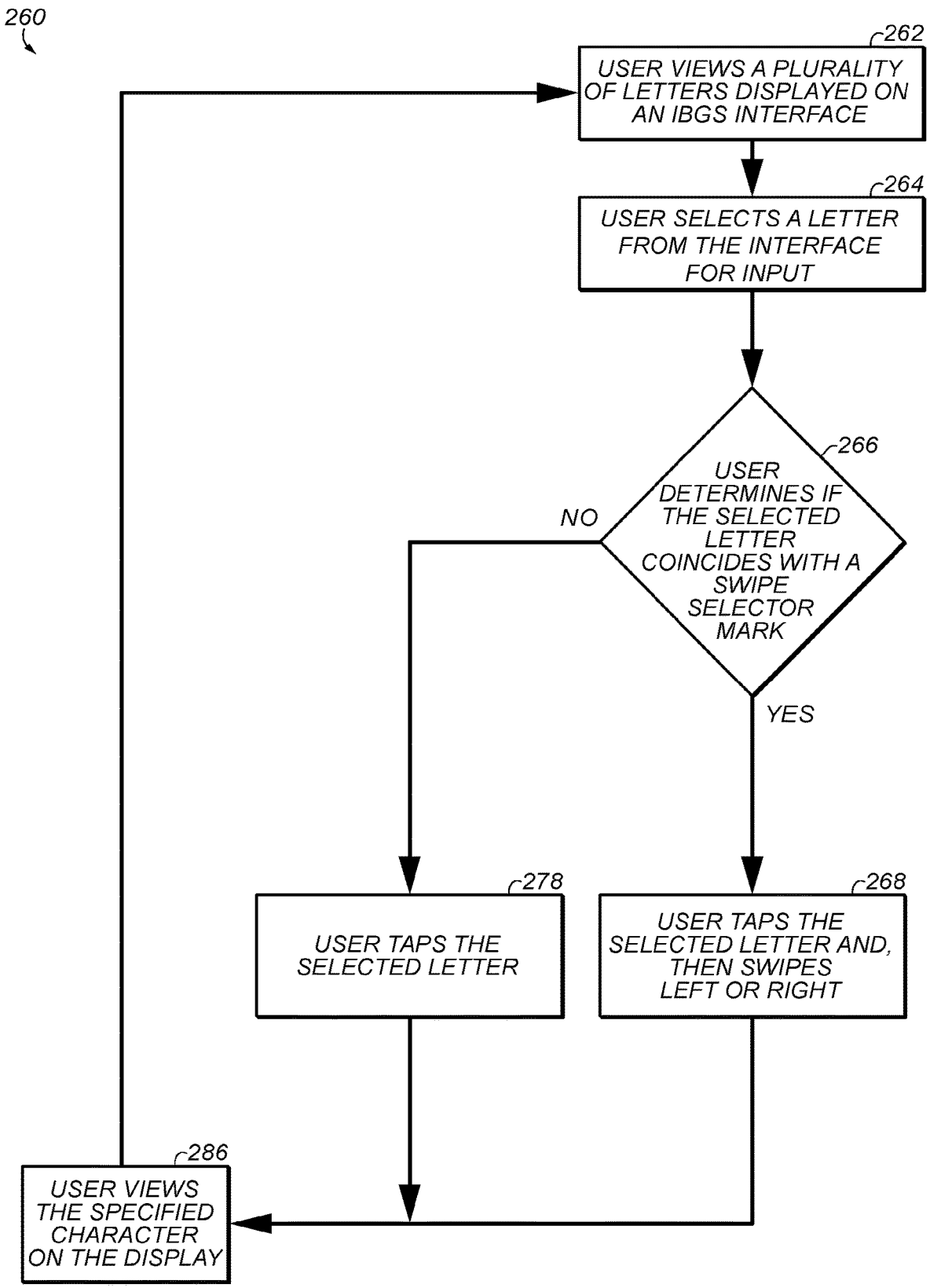
FIG. 15 is a flowchart of an embodiment of a method for a user to specify a character from among a plurality of characters.

FIG. 15 shows a flowchart of an embodiment of a method 260 for a user to specify a character from among a plurality of characters. In step 262 of method 260, a user views the characters of the IBGS text input interface 112. In step 264, the user selects a character from the interface 112 for input to the electronic device 100.

In step 266, the user determines if the selected letter coincides with the swipe selection mark 178.

If the user determines the selected letter coincides with the swipe selection mark 178, then in step 268 the user executes a unique selection gesture on the letter, such as tapping on the letter and then swiping left or right.

If the user determines the selected letter does not coincide with the swipe selection mark 178, then in step 278 the user taps on the letter.

Then in an optional step 286, the user views the specified character on the display 104. In an alternative embodiment, step 286 is bypassed.

Figure 16:
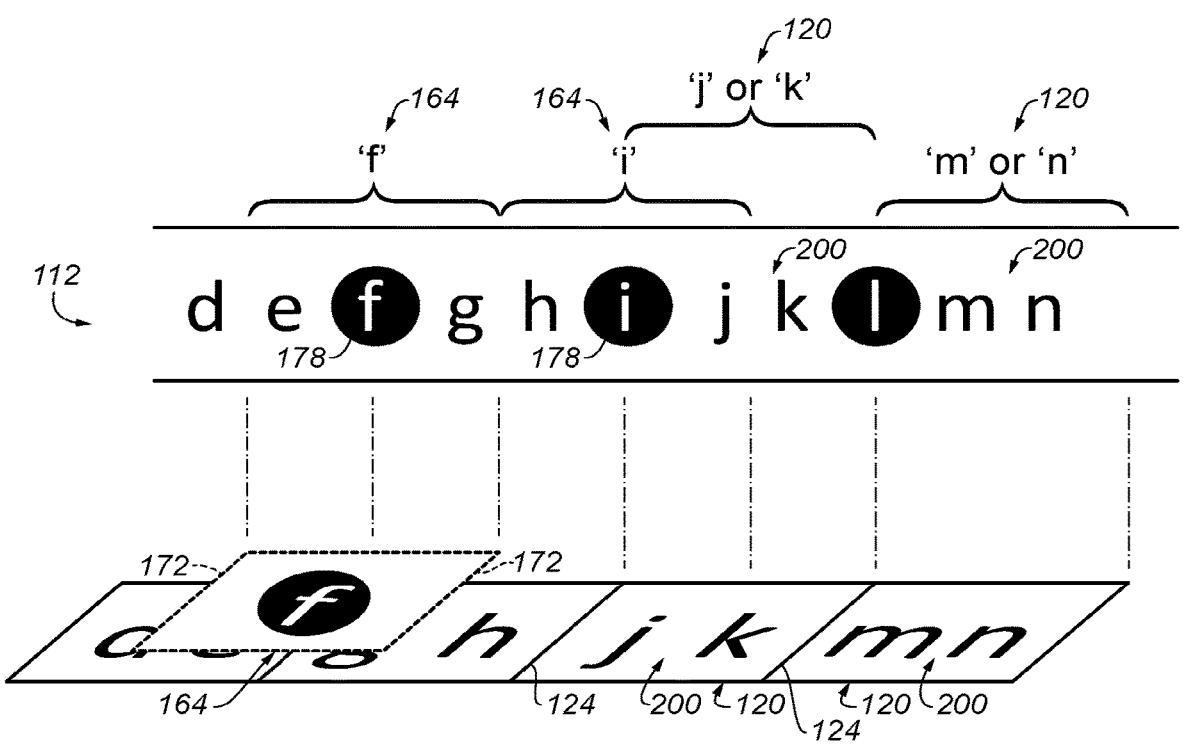
FIG. 16 is a plan view and a perspective view of one embodiment of the interleaved bi-gesture sensitive (IBGS) text input interface.
Figure 17:
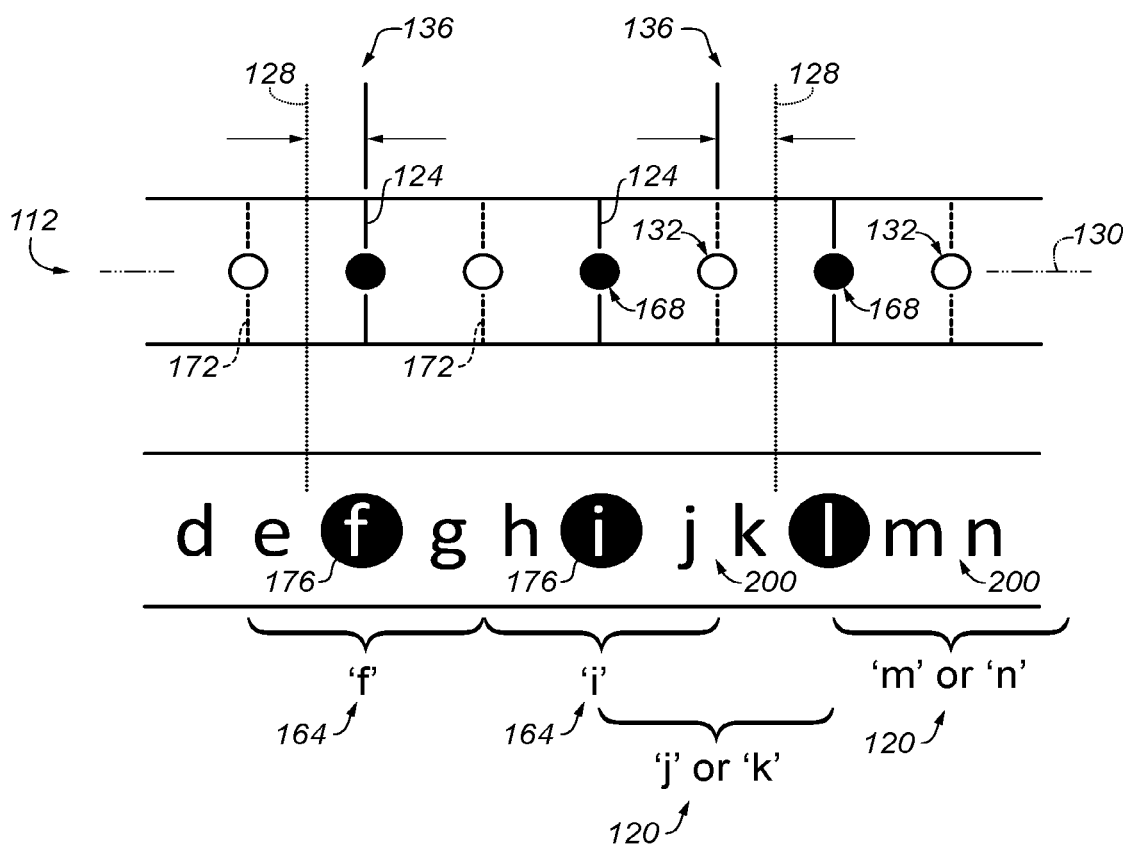
FIG. 17 is two plan views of one embodiment of the interleaved bi-gesture sensitive (IBGS) text input interface.
Figure 18:
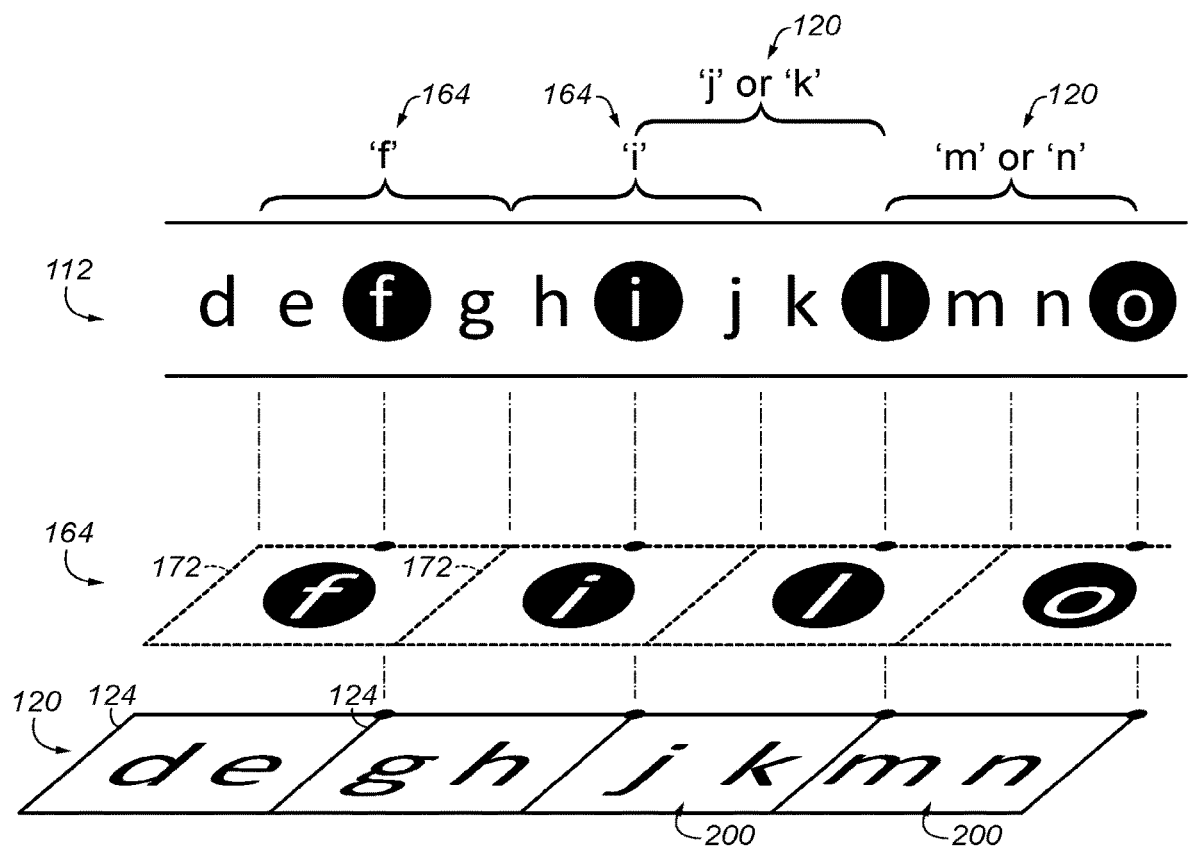
FIG. 18 is a plan view and a perspective view of one embodiment of the interleaved bi-gesture sensitive (IBGS) text input interface.

According to another embodiment of the invention, the character specification method 260 described above is used iteratively to specify series of characters from the IBGS text input interface. In one embodiment, words and sentences are formed on the display 104 by iteratively specifying characters according to the method above, and a spacebar is used in the plurality of function buttons 116 to input spaces between words on the display. FIGS. 16-18 show an embodiment of the IBGS text input interface 112 that has a letter pair 200 assigned to each conventional button 120, instead of a single letter.

FIG. 16 shows two views of the embodiment of FIGS. 16-18.

A plan view shows the embodiment as it would appear to a user on the display screen 104. An exploded perspective view shows the boundaries 124, 172 of the conventional buttons 120 and the intervening buttons 164.

In the plan view, the conventional and intervening buttons 120, 164 (identified by brackets) lie in a row as described in the embodiment of FIGS. 8-11. In contrast to the embodiment of FIGS. 8-11, a letter pair 200, instead of a single character, is assigned to each conventional button 120. One letter is assigned to each intervening button 164. The button boundary lines 124, 172 are omitted in the plan view, but the brackets above the interface 112 indicate where button boundaries lie.

The swipe selection mark 178 identifies which letters of the interface are selected using a unique selection gesture, such as a tap-and-swipe. Letters not identified by the swipe selection mark are selected using a button tap. In one embodiment, a time-dependent button tap identifies which letter of the letter pair 200 gets selected. In another embodiment, the button tap is an ambiguous selection of both letters of the pair and a disambiguation algorithm determines which letter of the pair the user intends.

In the perspective view, the conventional and intervening buttons 120, 164 are shown including the button boundaries 124, 172. One letter pair 200 is assigned to each conventional button 120. One letter is assigned to each intervening button 164. The button boundary lines 124, 172 indicate where button boundaries lie and how the buttons interlace with one another. In the embodiment of FIGS. 16-18, the button to which letter T is assigned overlaps 50% with the button to which the letter pair 'd e' is assigned and 50% with the button to which the letter pair 'g h' is assigned. The button to which the letter pair 'g h' is assigned overlaps 50% with the button to which letter T is assigned and 50% with the button to which letter 'i' is assigned. The button to which letter 'i' is assigned overlaps 50% with the button to which the letter pair 'g h' is assigned and 50% with the button to which the letter pair 'j k' is assigned, and so on. In an alternative embodiment, the degree of overlap between buttons is not exactly 50%.

FIG. 17 shows two additional plan views of the embodiment of the IBGS text interface 112 of FIGS. 16-18.

The plan view at top omits the letters and the swipe selection mark 178 from the interface. The view shows the conventional and intervening button press targets 132, 168 and the conventional and intervening button boundaries 124, 172.

The plan view at bottom shows the IBGS interface 112 as it would appear to a user on the device display screen 104. This view shows how details disclosed in the top view correspond with features of the interface as they appear on the display screen.

As the top view shows, both the conventional and intervening buttons 120, 164 lie in a row along the imaginary axis 130. The press targets 132, 168 of each button lie directly on the imaginary axis. The conventional buttons 120 are rectangular, are distributed uniformly along the imaginary axis, and lie immediately adjacent to one another along the axis. The boundary 124 of each conventional button (indicated by a solid line) overlaps the boundary of its two adjacent conventional buttons within the row. The intervening buttons are also rectangular, distributed uniformly along the imaginary axis, and lie immediately adjacent to one another along the axis. Therefore the boundary 172 of each intervening button (indicated by a dashed line) overlaps the boundary of its two adjacent intervening buttons within the row.

One intervening button 164 lies midway between every two adjacent conventional buttons. Each intervening button press target 168 lies directly on the overlapping conventional button boundaries 124 of the two adjacent conventional buttons. Furthermore, one conventional button lies midway between every two adjacent intervening buttons. Each conventional button press target 132 lies directly on the overlapping intervening button boundaries 172 of the two adjacent intervening buttons.

Said another way, the conventional and intervening buttons 120, 164 are nominally the same size, same shape and have the same distribution along the imaginary axis. One difference is that the two kinds of buttons are offset from one another along the imaginary axis by 50% of the button width.

One difference between the embodiments of the IBGS interface of FIGS. 16-18 and that of FIGS. 8-11 is the width of the selection buttons 120, 164. The selection buttons in the embodiment of FIGS. 16-18 are wider relative to their height than the selection buttons of FIGS. 8-11. The wider buttons accommodate the letter pairs 200 that are assigned to the conventional buttons 120 of the embodiment of FIGS. 16-18. The intervening buttons are wider too so that the intervening buttons are adjacent to one another, as shown in the perspective view of FIG. 18.

One benefit of wider selection buttons is that the absolute distance between the perceived and absolute button boundaries is either the same or greater.

In FIG. 17, the perceived button indicator 128 in the top view points to the perceived button boundary in the bottom view. As the indicator 128 shows, the perceived boundary is midway between the letter of the intervening button and the closest letter of the letter pair.

The perceived boundary indicator 128 projects the perceived boundary from the lower view onto the imaginary axis 130 in the top view. Then, in the top view the difference indicators 136 show the distance between the perceived and actual boundary for a conventional button (the indicator 136 at left) and an intervening button 164 (the indicator 136 at right).

For the intervening buttons, the distance is nominally 33% of button width. In terms of absolute distance, the distance is twice that of the single letter embodiment of FIGS. 8-11. For the conventional buttons, the distance is nominally 16.7% of button width. In terms of absolute distance, the distance is the same as that of the single letter embodiment of FIGS. 8-11. The reason the distance is not the same for the conventional and intervening buttons is because the perceived boundary is not symmetric with respect to the conventional and intervening buttons.

FIG. 18 shows two more views of the embodiment of FIGS. 16-18. A plan view shows the embodiment as it would appear on the display screen 104. An exploded perspective view shows the boundaries 124, 172 of the conventional buttons 120 and the intervening buttons 164.

As the perspective view of FIG. 18 shows, the conventional and intervening buttons 164 completely overlap one another. Because the conventional buttons are immediately adjacent to one another in the row, conventional buttons occupy 100% of the selectable area of the IBGS interface 112. Because the intervening buttons are immediately adjacent to one another in the row, intervening buttons occupy 100% of the selectable area of the IBGS interface 112 as well.

As a consequence, there is no area of the IBGS interface that cannot be actuated with either the button tap selection gesture or the unique selection gesture, such as the tap-and-swipe. Therefore, wherever an input gesture occurs on the IBGS interface, the input gesture interpreter 242: (1) interprets the received input gesture as either a button tap or a unique selection gesture, (2) classifies the input as either a conventional button selection or an intervening button selection based on the gesture interpreted, and then (3) identifies the intended letter based on the classification and on which button received the interpreted gesture.

A benefit of increased distance between the perceived and actual button boundary is that the separation leads a user to more drastically underestimate the area they have to execute a selection gesture. In the view at the top of FIG. 18, a user likely believes that to select the letter 'g', they must tap between the letters T and 'h'. In fact they must only tap between the buttons that select the letters 'e' and T. In another example, a user likely believes that to select the letter 'k', they must tap between the buttons that select the letters T and T. In fact they must only tap between the buttons that select the letters 'h' and 'm'.

The intervening letters cause the user to guide their button selections more accurately toward the button press target than the selection actually needs to be. In doing so, the user guides their selection away from the button press boundary.

Assigning letter pairs 200 to at least one kind of button (conventional or intervening) enhances the effect by increasing the width of each button relative to its height and also by increasing the distance between the perceived and actual button boundary for one or both kinds of buttons, in comparison to an embodiment that assigns just a single letter to the buttons. Ultimately the effect reduces the likelihood that a selection error occurs due to an inaccurate button press selection. The effect is particularly valuable for text input interfaces where the selection buttons are smaller than the selector that is actuating them, such as the finger-actuated text input interface of a mobile device.

Figure 19:
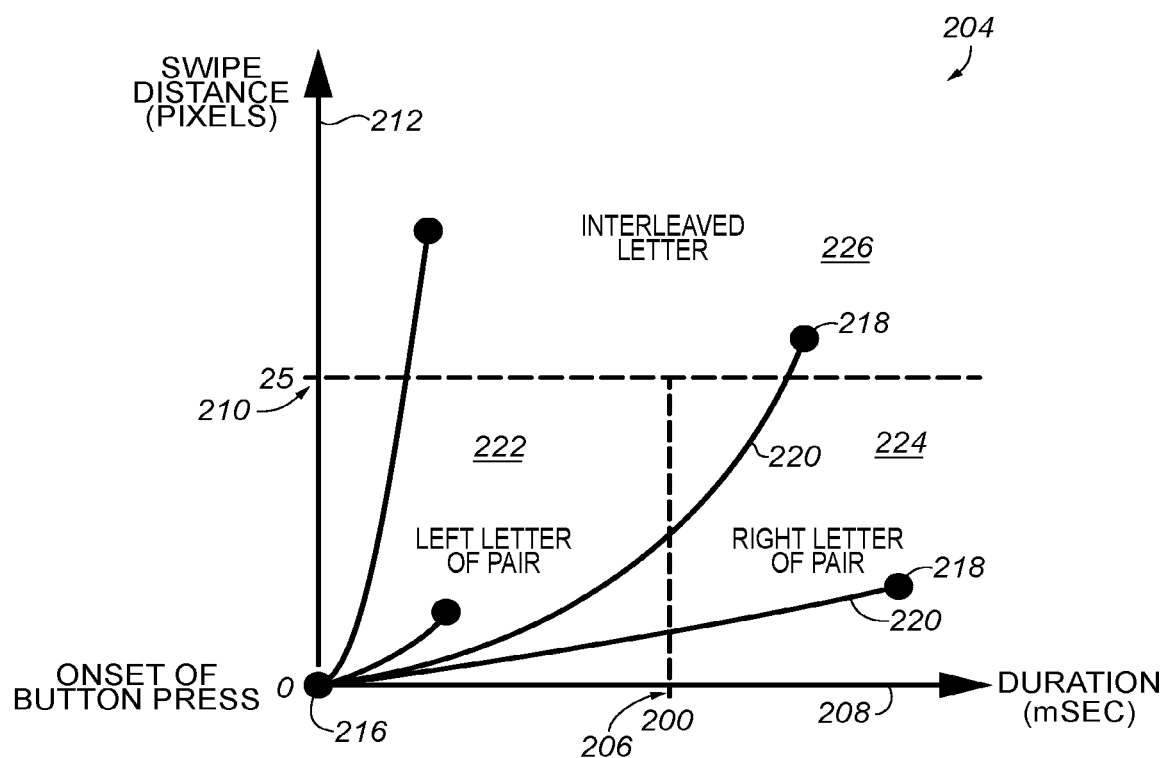
FIG. 19 is a plot of graphical representations of possible examples of responses of input selection gestures.
Figure 20:
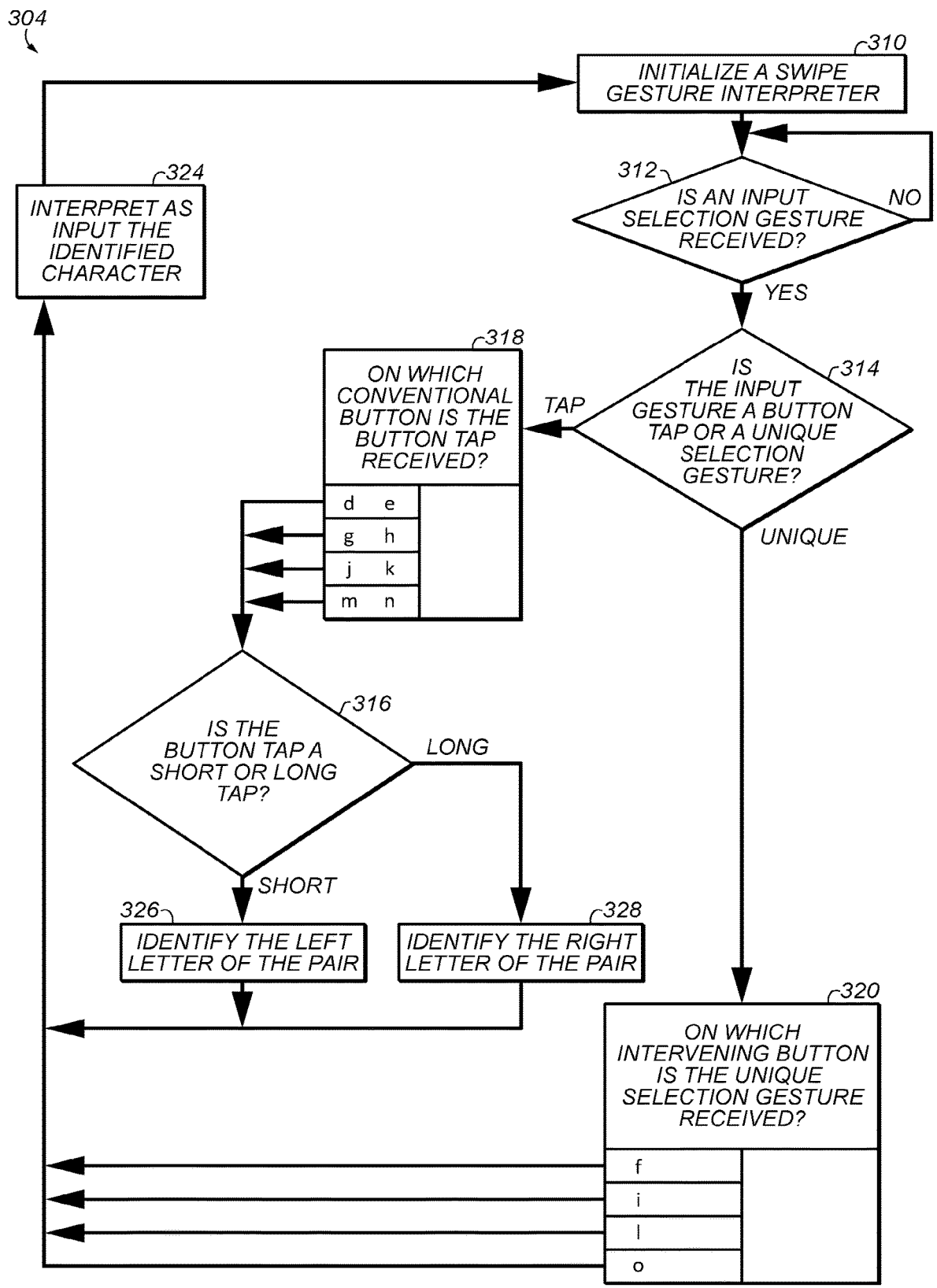
FIG. 20 is a flowchart of an embodiment of a method for a processor of the electronic device to interpret character selections.

FIGS. 19 and 20 together disclose an embodiment of a method for interpreting input selection gestures received by the IBGS interface 112 of FIGS. 16-18. FIG. 19 discloses a method for interpreting time- and distance-dependent input selection gestures. FIG. 20 discloses a method for identifying intended characters from input provided according to the method of FIG. 19.

Input selection gestures simultaneously incorporate information about position, duration and distance of displacement. The plot of FIG. 19 graphically represents the duration and displacement information.

A gesture becomes initiated via a button tap at some position on the display screen. The position of the tap on the screen corresponds with one or more buttons of the interface 112. For the embodiment of FIGS. 16-18, the position corresponds with two overlapping buttons of the interface. The tap has duration of some length typically measured in units of milliseconds. The tap also incorporates a lateral displacement (between zero and some finite number) along the touch sensitive screen during the course of a button tap. The swipe has a displacement (or distance) of some length typically measured in units of pixels, millimeters, or thousandths of an inch.

In FIG. 19 another plot 204 represents an input selection gesture graphically. Any point on the plot represents values for the variables duration and swipe distance at a given moment. Each curve 220 represents a possible progression of the two variables over the course of a selection gesture.

In the plot, button tap duration is plotted on the x-axis 208. Swipe distance is plotted on the y-axis 212. In one embodiment, the swipe distance can have both positive and negative values, where the polarity of the value represents the direction of the swipe. For example a positive swipe could be a swipe to the right along the button row and a negative swipe a swipe to the left. In the embodiment of FIG. 19, the input gesture interpreter 242 ignores the swipe direction and records purely the magnitude of the swipe distance.

The onset of an input gesture occurs at the plot's origin 216. The onset marks the point in time and distance where the onset of an input gesture occurs. The release of a button tap—and thereby the end of the selection gesture—is represented by a terminus 218 at the end of each curve. The path that the curve 220 follows from the origin to the terminus reflects the duration and swipe distance of the input selection gesture over the course of the gesture.

The response of an input gesture is converted to a binary value by comparing the response with threshold values for duration and swipe distance. The thresholds enable the analog values of each measured response to be recast as a binary output, i.e., a high or low value. A response that exceeds a threshold value is a high value; one that falls below the threshold value is a low value.

In the plot 204, an elapsed time threshold 206 splits the duration axis 208 into two segments, in this example at 200 msec. The duration threshold determines whether a button tap becomes classified as a SHORT tap (a tap <200 msec) or a LONG tap (a tap >200 msec).

A swipe distance threshold 208 splits the swipe distance axis 212 into two segments, in this example at 25 pixels. The swipe distance threshold determines whether a positional displacement becomes classified as a button tap (a swipe distance <25 pixels) or a SWIPE gesture (a swipe distance >25 pixels).

Applying the threshold values 206, 208 to the plot 204 divides the plot into three regions 222, 224, 226. Each region represents a unique combination of the two binary output values from the input gestures. In other words, for the gesture responses 'swipe distance' and 'button press duration', each region represents one possible combination of high and low values ('swipe distance':'duration') as follows—low:low, low:high, and swipe.

During the course of an input selection gesture, the classification at any moment reflects the current values for duration and swipe distance. Because the path that a curve 220 takes through the plot may intersect more than one region of the plot, the classification may evolve during the course of the selection. The terminus 218 marks the moment that the user lifts their finger from the touch sensitive display screen 104. The particular region where the terminus lies determines the final classification of the selection gesture. For the embodiment of FIG. 19, possible classifications for an input selection gesture are SHORT tap, LONG tap and SWIPE.

The selection gestures are designed specifically to satisfy a couple of conditions: (1) every possible selection gesture falls within one of the three possible classifications, and (2) classification of a gesture as a LONG tap or SWIPE can be generalized to a SHORT tap by disregarding one or both thresholds.

The two conditions satisfy the requirement that every input gesture selects a letter no matter where on the interface the gesture occurs. In particular, in an embodiment of the interface where there is an area with only one button (i.e., non-overlapping), the swipe threshold can be disregarded so that a gesture with a swipe of any length becomes interpreted as a button tap. In another embodiment where there is a conventional button that is assigned only one letter, for that button the time threshold can be disregarded so a button tap of any duration becomes classified as a SHORT tap.

FIG. 20 discloses one embodiment of method 304 for identifying a user's intended character from input provided according to the method of FIG. 19.

In step 310 of method 304, the processor 144 initializes the input gesture interpreter 242. In step 312 of the method, the input gesture interpreter monitors the IBGS text input interface 112 for an input selection gesture. Once a selection gesture commences, in step 314, the input gesture interpreter determines if the selection gesture is a button tap or a swipe selection gesture according to method 204 of FIG. 19.

If in step 314 the input gesture interpreter 242 determines the gesture is a button tap, in subsequent step 318 the input gesture interpreter determines which conventional button 120 received the button tap. Then, in subsequent step 316 the input gesture interpreter determines if the selection gesture is a SHORT tap or a LONG tap according to method 204 of FIG. 19.

If step 316 determines the selection gesture is a SHORT tap, in a step 326 the input gesture interpreter 242 identifies the left letter of the letter pair assigned to the button determined in step 318 as the intended letter selection. If step 316 determines the selection gesture is a LONG tap, in a step 328 the input gesture interpreter 242 identifies the right letter of the letter pair assigned to the button determined in step 318 as the intended letter selection.

If in step 314 the input gesture interpreter 242 determines the selection gesture is a unique selection gesture, such as a tap-and-swipe, then in subsequent step 320 the input gesture interpreter determines which intervening button 164 received the unique selection gesture and identifies the letter assigned to the determined button as the intended selection.

In a final step 324, the processor 144 interprets as input the letter identified in either steps 320, 326 or 328.

In a further embodiment of the invention, the processor executes method 304 iteratively, interpreting one letter per iteration. According to another embodiment, in a further step the processor displays the identified letter on the display screen 104.

Although method 304 of FIG. 20 is one embodiment of a method for identifying a user's intended character, the scope of the method is not limited by this particular embodiment, but rather by the scope of the claims.

Figure 21A:
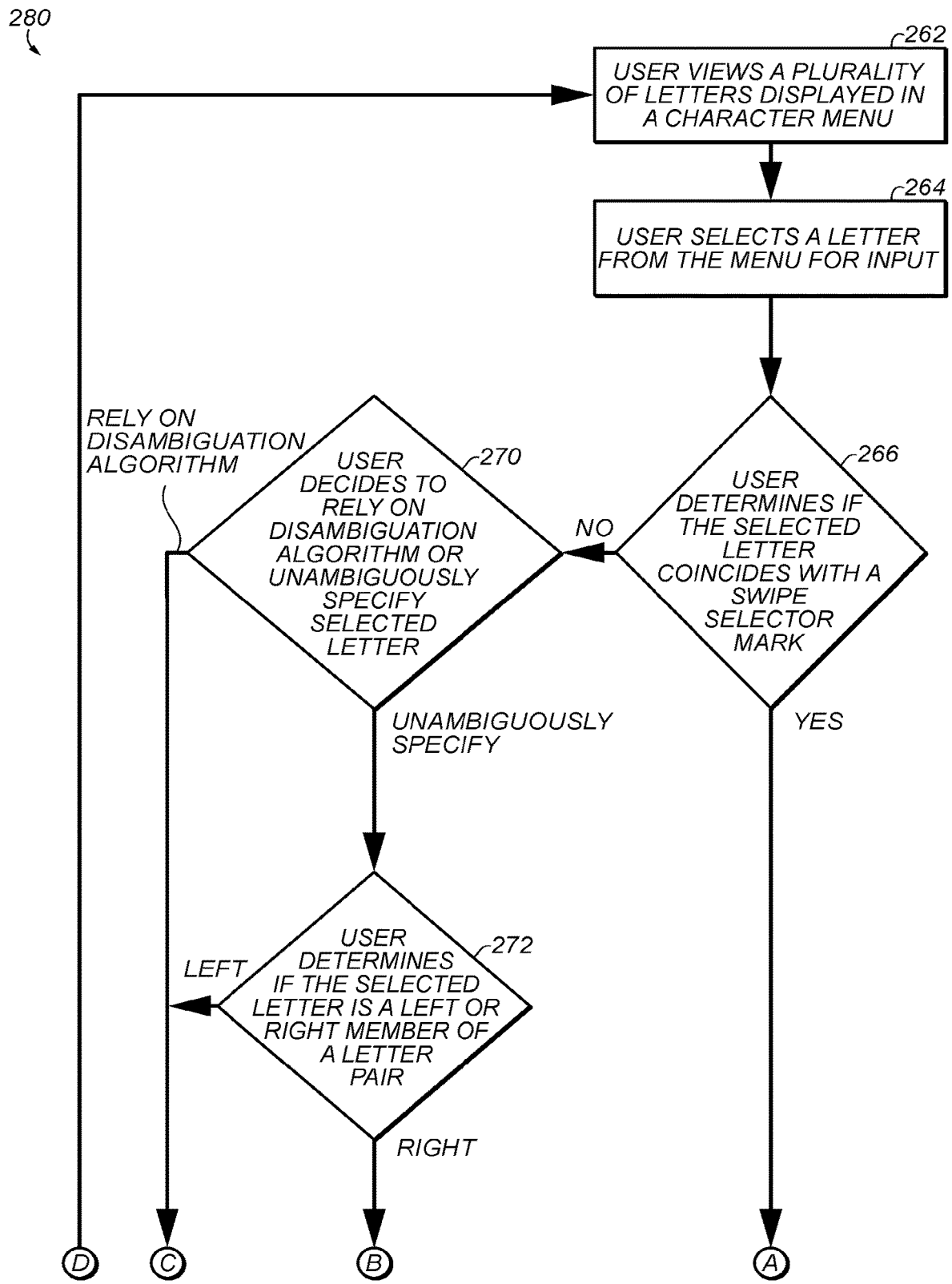
FIGS. 21A and B are flowcharts of an embodiment of a method for a user to specify a character from among a plurality of characters.
Figure 21B:
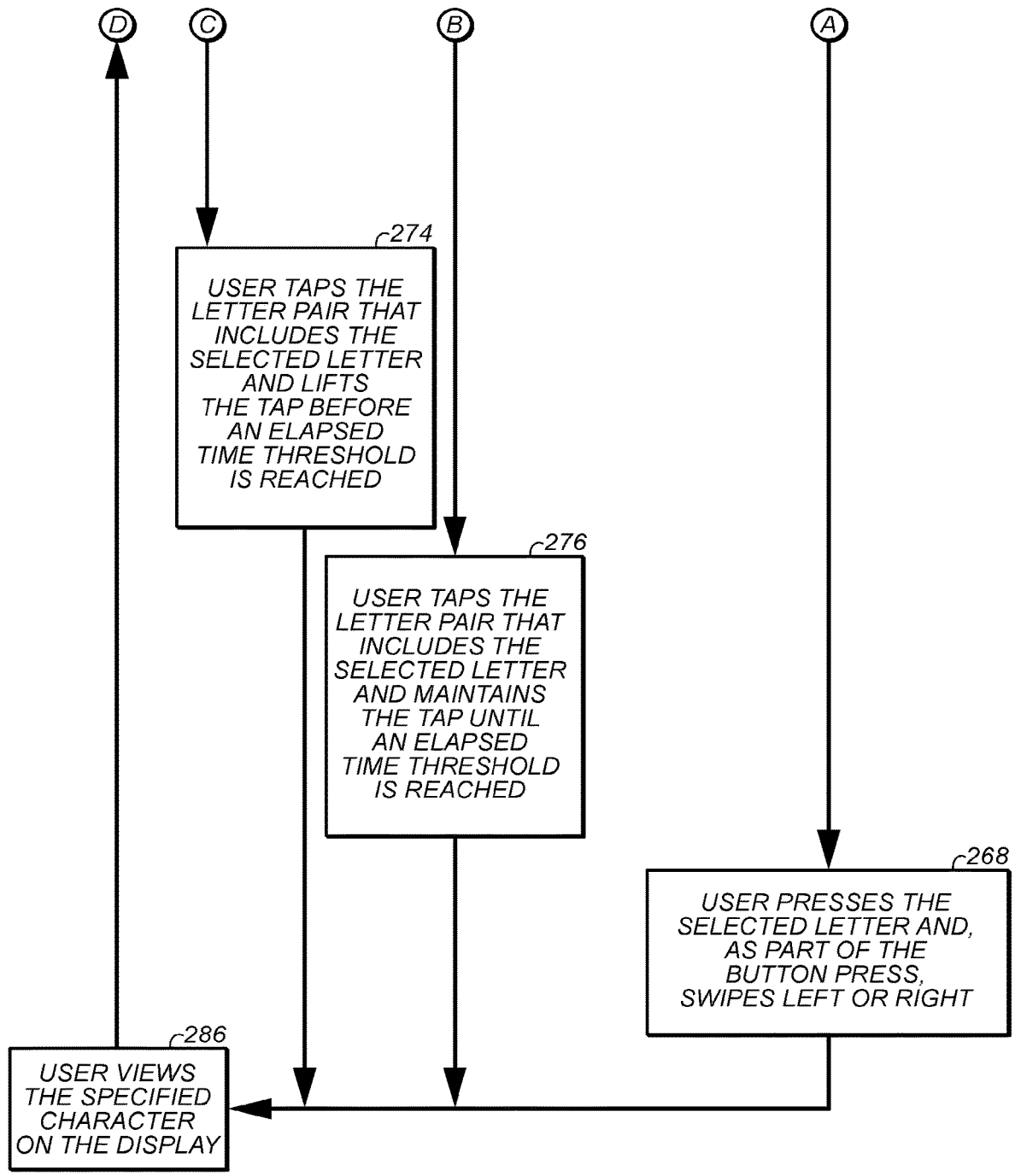

FIG. 21 shows a flowchart of an embodiment of a method 280 for a user to specify a character from among a plurality of characters. In step 262 of method 280, a user views the characters in the IBGS text input interface 112. In step 264, the user selects a character from the interface 112 for input to the electronic device 100.

In step 266, the user determines if the selected letter coincides with the swipe selection mark 178.

If the user determines the selected letter coincides with the swipe selection mark 178, then in step 268 the user executes a unique selection gesture on the letter, such as tapping on the letter and then swiping left or right.

If the user determines the selected letter does not coincide with the swipe selection mark 178, then in a step 270 the user decides whether to rely on a disambiguation algorithm to disambiguate a letter pair selection or to unambiguously specify the letter using a time-dependent input selection gesture.

If in step 270 the user decides to rely on the disambiguation algorithm, in a step 274 the user taps the letter pair that includes the selected letter and ends the button tap before the elapsed time threshold 206 is reached.

If in step 270 the user decides to unambiguously specify the letter, in a step 272 the user determines if the selected letter is a left or right member of the letter pair. If the user determines the selected letter is the left member, in step 274 the user taps the letter pair that includes the selected letter and ends the button tap before the elapsed time threshold 206 is reached. If the user determines the selected letter is the right member, in a step 276 the user taps the letter pair that includes the selected letter and maintains the button tap at least until the elapsed time threshold 206 is reached.

Then in an optional step 286, the user views the specified character on the display 104. In an alternative embodiment, step 286 is bypassed.

According to another embodiment of the invention, the character specification method 280 described above is used iteratively to specify series of characters from the IBGS text input interface. In one embodiment, words and sentences are formed on the display 104 by iteratively specifying characters according the method above, and a spacebar is used in the plurality of function buttons 116 to input spaces between words on the display.

Figure 22:
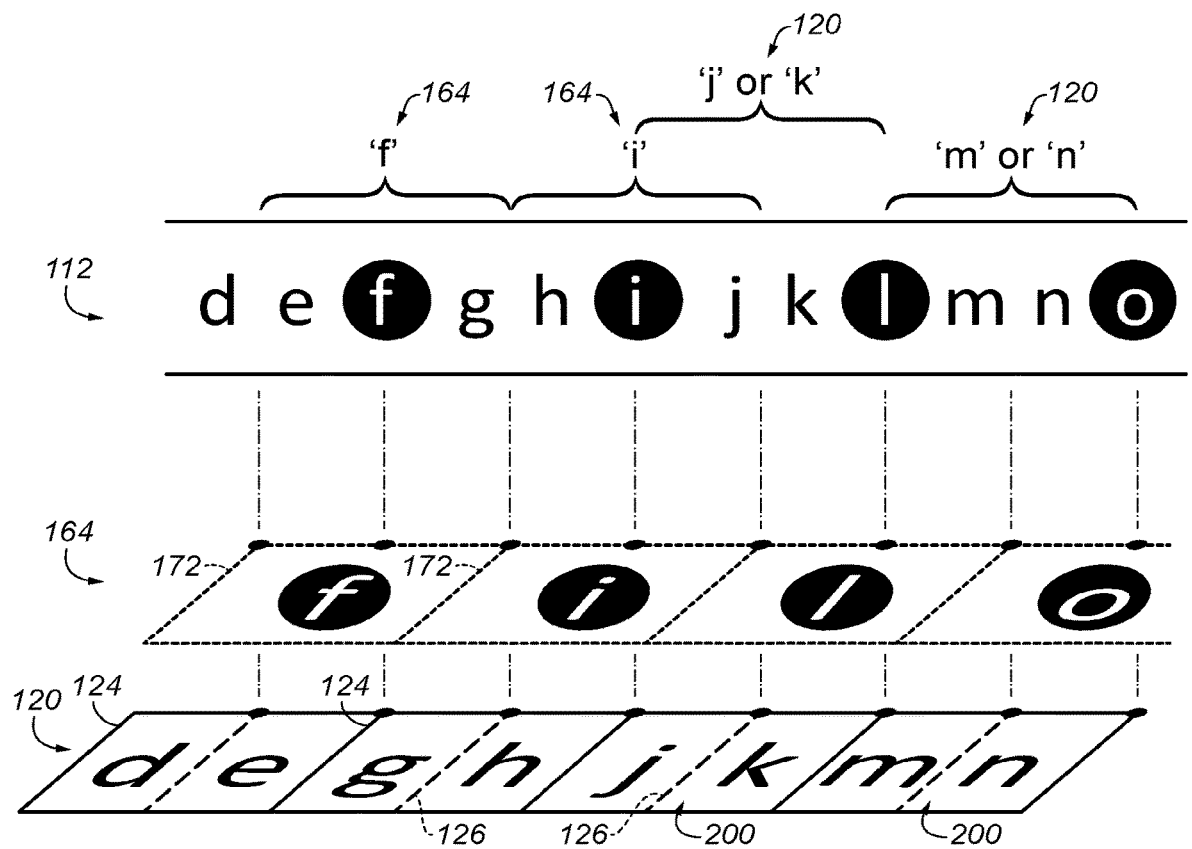
FIG. 22 is a plan view and a perspective view of another embodiment of the interleaved bi-gesture sensitive (IBGS) text input interface.

FIG. 22 discloses an embodiment of the IBGS interface 112 similar to the embodiment of FIGS. 16-18, but further includes a conventional button dividing boundary 126.

FIG. 22 shows the embodiment in two views. A plan view shows the embodiment as it would appear on the display screen 104. An exploded perspective view shows the boundaries 124, 172 of the conventional buttons 120 and the intervening buttons 164, as well as the conventional button dividing boundary 126.

For the embodiment of FIG. 22, at least one conventional button 120 includes the conventional button dividing boundary 126. In one embodiment, the conventional button dividing boundary 126 transects the at least one conventional button from the boundary on one edge of the button to the boundary on another edge. In a further embodiment, the button dividing boundary transects the at least one conventional button from the boundary at the button's top edge to the boundary at the button's bottom edge. In still a further embodiment, the button dividing boundary divides the at least one conventional button into halves of equal area. In yet another embodiment, the button dividing boundary lies between the letters of the letter pair 200 displayed on the at least one conventional button.

As in the embodiment of FIGS. 16-18, the conventional and intervening buttons 164 completely overlap one another. As a consequence, there is no area of the IBGS interface that cannot be actuated with either the button tap selection gesture or the unique selection gesture, such as the tap-and-swipe. Furthermore, a button tap selection gesture received by the at least one conventional button that includes the button dividing boundary is further classified as either a left-half or right-half selection.

Therefore, for the embodiment of the interface 112 of FIG. 22, wherever an input gesture occurs on the IBGS interface, the input gesture interpreter 242: (1) interprets the received input gesture as either a button tap or a unique selection gesture, (2) classifies the input as either a conventional button selection or an intervening button selection based on the gesture interpreted, (3) if the interpreter classifies the input as a conventional button selection, the interpreter further classifies the input as either a left-half selection or a right-half selection, and lastly (4) identifies the intended letter based on the classification and on which button of the interface received the interpreted gesture.

The embodiment of FIG. 22 has all the benefits described for the embodiment of FIG. 18, but with the addition that the input gesture interpreter 242 identifies which half of the at least one conventional button the user pressed. In one embodiment, the processor 144 tentatively identifies which letter of the letter pair the user intends based on the button half classification. In a further embodiment, the word disambiguation algorithm 244 overrides the letter identification made as a result of the button half classification, but does not override the classification of the input as a conventional or intervening button selection.

Figure 23:
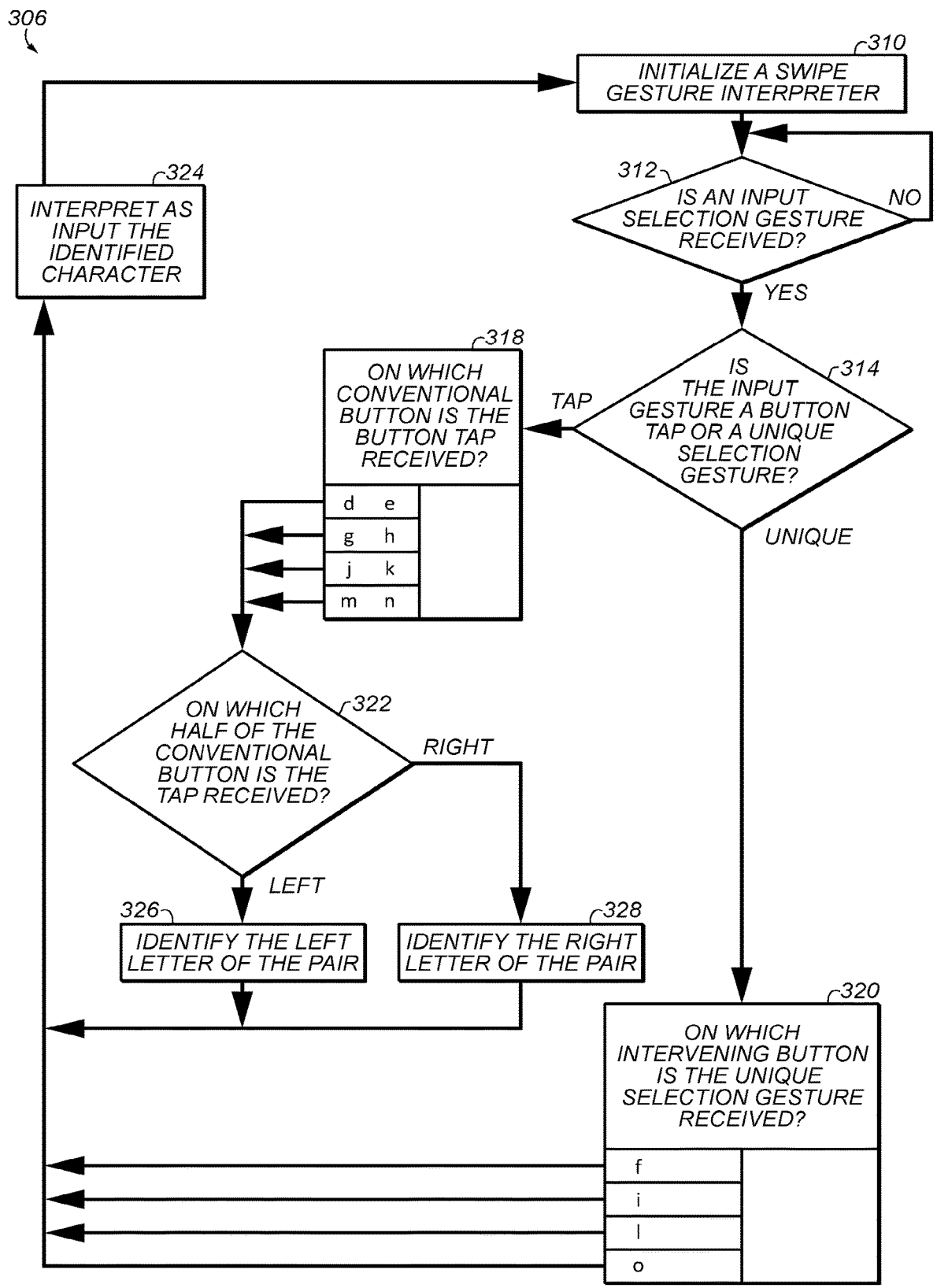
FIG. 23 is a flowchart of an embodiment of a method for a processor of the electronic device to interpret character selections.

FIG. 23 discloses one embodiment of a method 306 for identifying a user's intended character from input provided by the interface 112 of FIG. 22.

In step 310 of method 306, the processor 144 initializes the input gesture interpreter 242. In step 312 of the method, the input gesture interpreter monitors the IBGS text input interface 112 for an input selection gesture. Once a selection gesture commences, in step 314, the input gesture interpreter determines if the selection gesture is a button tap or a swipe selection gesture. In one embodiment, the gesture interpreter makes the determination based on the distance of the positional displacement incorporated into the selection gesture, as described by method 204 of FIG. 19. The gesture interpreter ignores the time-dependent aspect of the selection gesture.

If in step 314 the input gesture interpreter 242 determines the gesture is a button tap, in subsequent step 318 the input gesture interpreter determines which conventional button 120 received the button tap. Then, in subsequent step 322 the input gesture interpreter determines which half of the conventional button receives the tap.

If step 322 determines the selection gesture is a left-half tap, in step 326 the input gesture interpreter 242 identifies the left letter of the letter pair assigned to the button determined in step 318 as the intended letter selection. If step 322 determines the selection gesture is a right-half tap, in step 328 the input gesture interpreter 242 identifies the right letter of the letter pair assigned to the button determined in step 318 as the intended letter selection.

If in step 314 the input gesture interpreter 242 determines the selection gesture is a unique selection gesture, such as a tap-and-swipe, then in subsequent step 320 the input gesture interpreter determines which intervening button 164 received the unique selection gesture and identifies the letter assigned to the determined button as the intended selection.

In final step 324, the processor 144 interprets as input the letter identified in either steps 320, 326 or 328.

In a further embodiment of the invention, the processor executes method 306 iteratively, interpreting one letter per iteration. According to another embodiment, in a further step the processor displays the identified letter on the display screen 104.

Although method 306 of FIG. 23 is one embodiment of a method for identifying a user's intended character, the scope of the method is not limited by this particular embodiment, but rather by the scope of the claims.

Figure 24A:
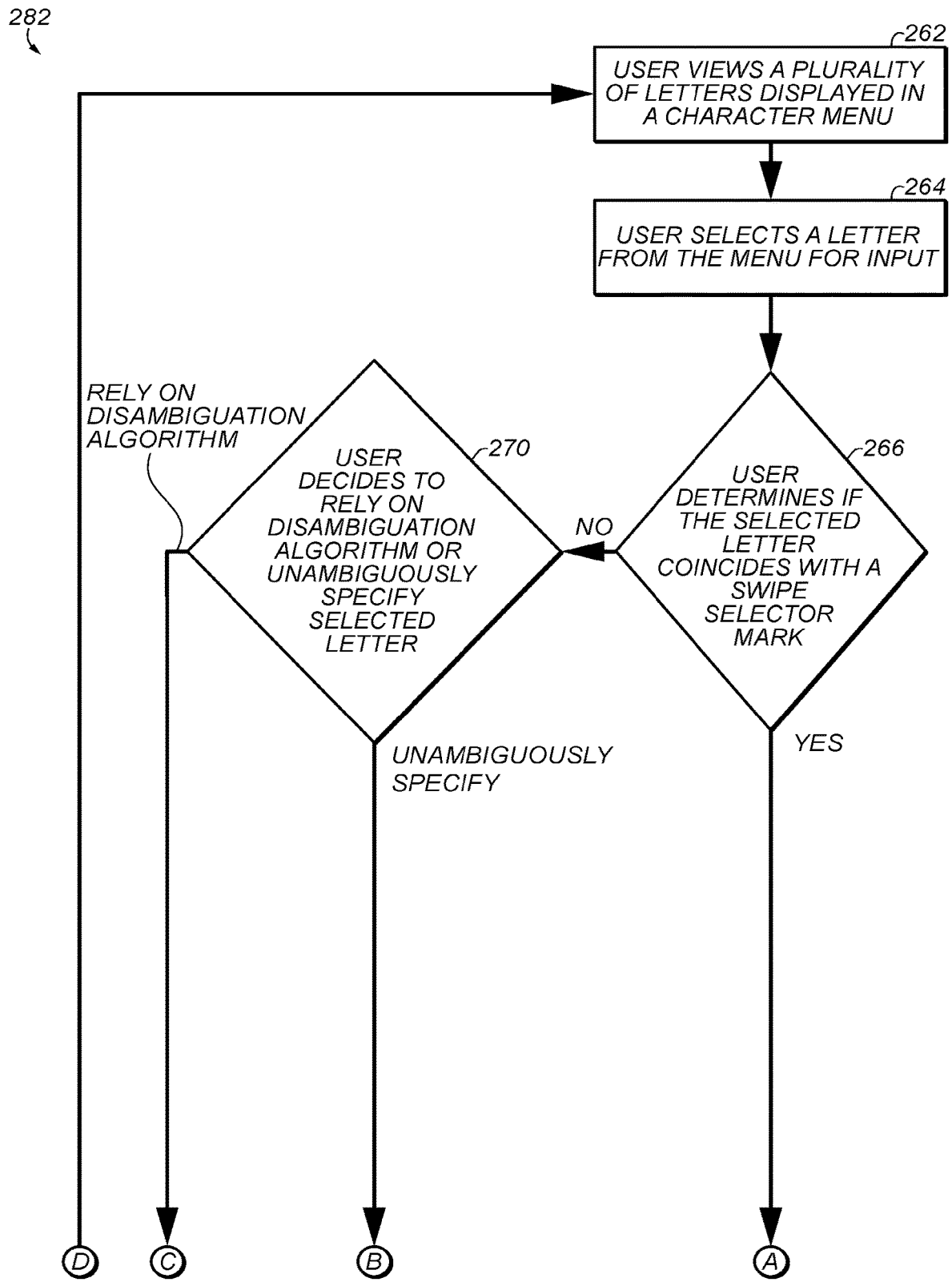
FIGS. 24A and B are flowcharts of an embodiment of a method for a user to specify a character from among a plurality of characters.
Figure 24B:
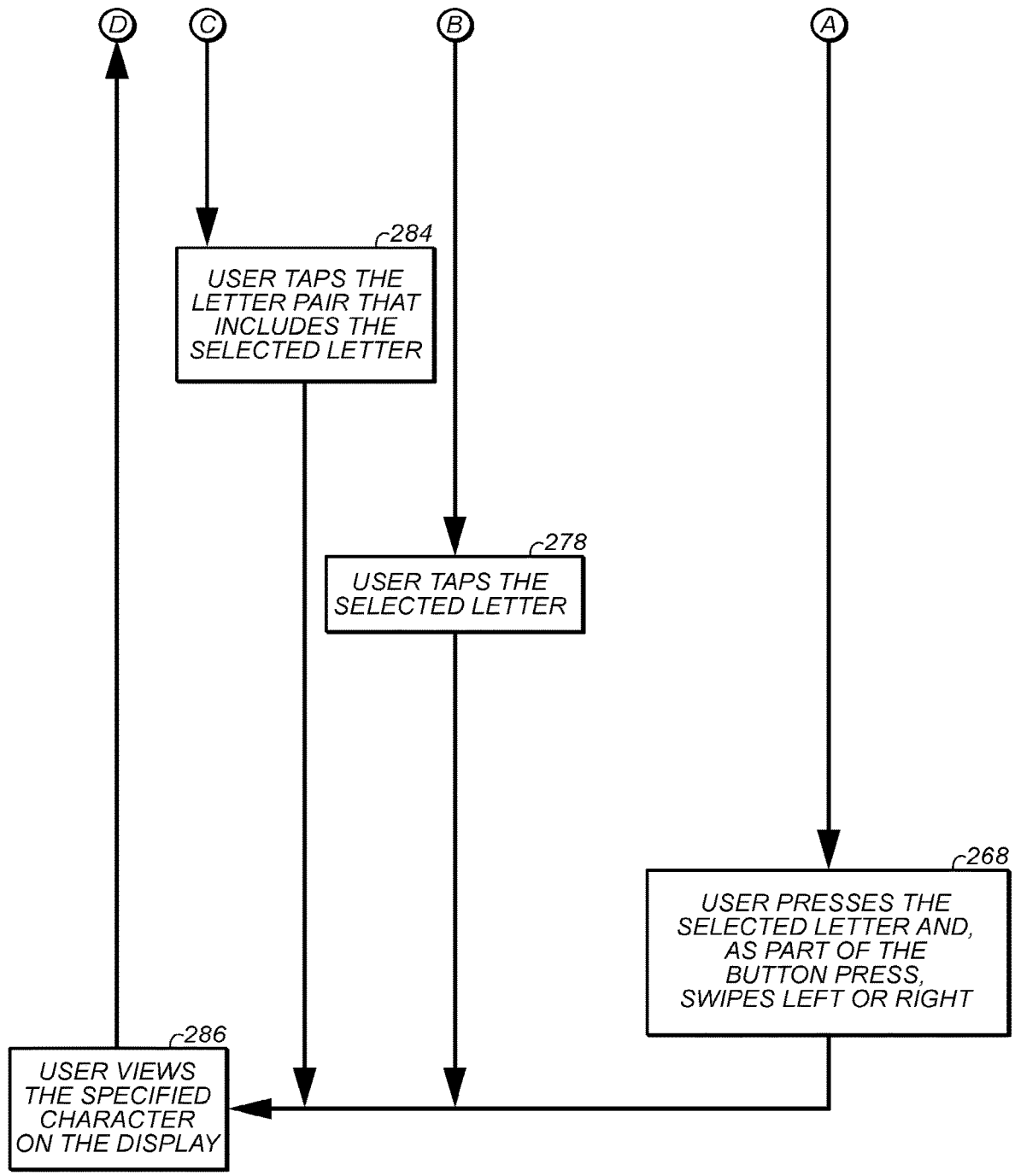

FIG. 24 shows a flowchart of an embodiment of a method 282 for a user to specify a character from among a plurality of characters. In step 262 of method 282, a user views the characters in the IBGS text input interface 112. In step 264, the user selects a character from the interface 112 for input to the electronic device 100.

In step 266, the user determines if the selected letter coincides with the swipe selection mark 178.

If the user determines the selected letter coincides with the swipe selection mark 178, then in step 268 the user executes a unique selection gesture on the letter, such as tapping on the letter and then swiping left or right.

If the user determines the selected letter does not coincide with the swipe selection mark 178, then in step 270 the user decides whether to rely on a disambiguation algorithm to disambiguate a letter pair selection or to unambiguously specify the selected letter.

If in the step 270 the user decides to rely on the disambiguation algorithm, in step 284 the user taps on the letter pair that includes the selected letter.

If in step 270 the user decides to unambiguously specify the letter, in step 278 the user taps on the selected letter.

Then in optional step 286, the user views the specified character on the display 104. In an alternative embodiment, step 286 is bypassed.

According to another embodiment of the invention, the character specification method 282 described above is used iteratively to specify series of characters from the IBGS text input interface. In one embodiment, words and sentences are formed on the display 104 by iteratively specifying characters according the method above, and a spacebar is used in the plurality of function buttons 116 to input spaces between words on the display.

Figure 25:
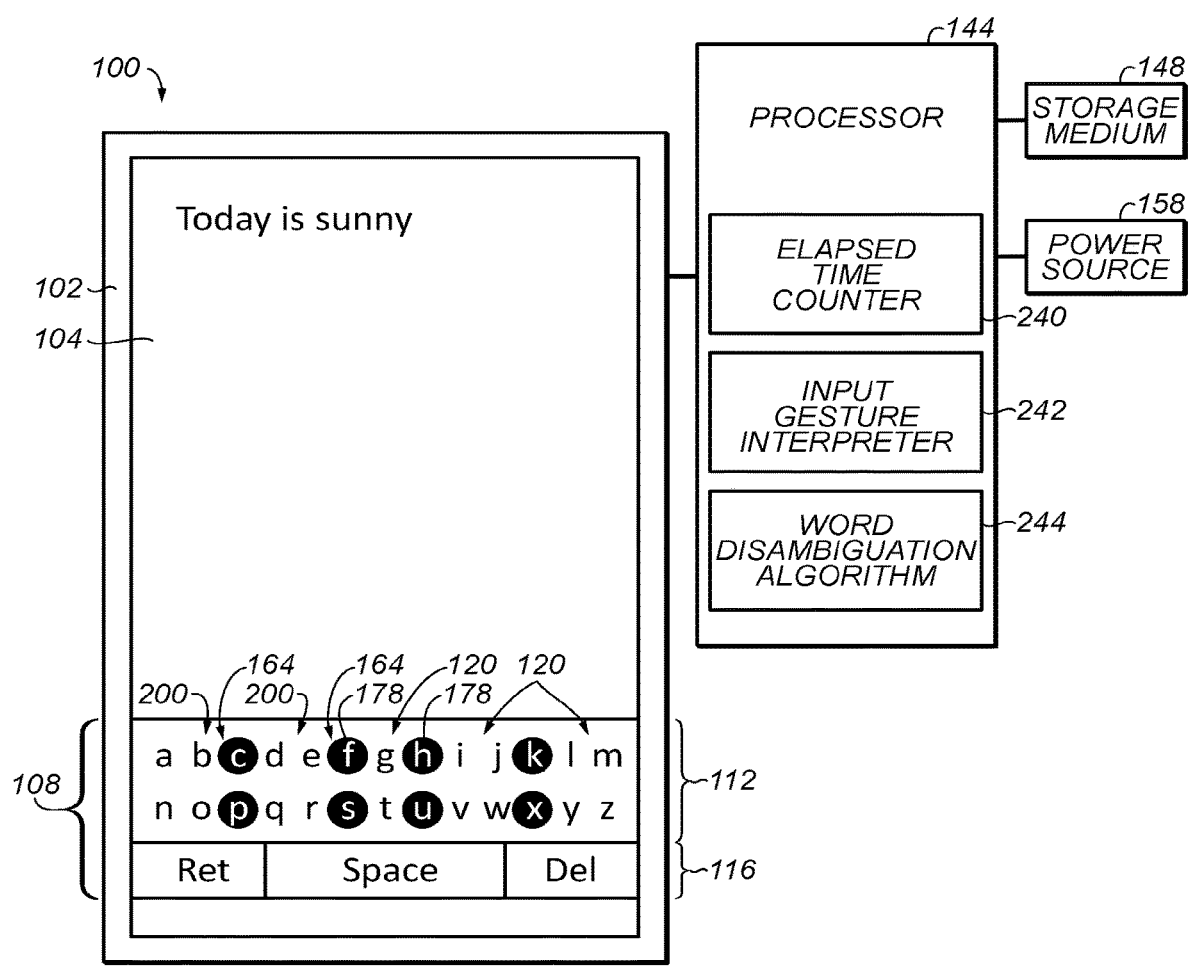
FIG. 25 is a schematic drawing of yet another embodiment of the electronic device.

FIG. 25 shows a schematic drawing of one embodiment of the electronic device 100. The device 100 may have some or all the components and functionality described herein with respect to the mobile device 100 of FIG. 3. The device 100 has aspects previously disclosed in FIG. 9 of U.S. Pat. No. 8,487,877, which is hereby incorporated by reference in its entirety.

The embodiment of FIG. 25 shows the electronic device as a mobile phone or smartphone. But in alternative embodiments, the electronic device 100 could be a wearable device, game, game controller, TV controller, augmented or virtual reality system, portion of an automotive dashboard or a number of other electronic devices that require user input.

In the embodiment of FIGS. 25, the case 102 mechanically supports the touch sensitive display screen 104. The user input interface 108 occupies the lower portion of the display screen 104. The user input interface includes the plurality of function buttons 116 and the interleaved bi-gesture-sensitive (IBGS) text input interface 112.

In one embodiment, the IBGS interface 112 includes two button rows. The interface has five conventional selection buttons 120 and four intervening selection buttons 164 per row. Four of the conventional buttons per row are assigned the letter pair 200. One conventional button per row is assigned a single letter. Each of the four intervening selection buttons per row is assigned a single letter. The intervening selection buttons are identified by the swipe gesture mark 178.

The conventional selection buttons are rectangular, identical in size and shape, and are arranged in a row such that each button is immediately adjacent to two other buttons in the row. The intervening buttons 164 have the same size, shape and distribution as the conventional selection buttons. The conventional and intervening buttons overlap and alternate with one another, as described in the embodiment of FIGS. 16-18.

From a purely visual standpoint, the letters and letter pairs assigned to the buttons appear to be a continuous row. In one embodiment, the row has 13 letters, which alternate between letter pairs (or, in one case, a single letter) and single letters demarcated by the swipe gesture mark.

The conventional buttons 120 of the interface 112 are selected using a button tap. The intervening buttons 164 are selected using an input gesture different than a button tap. In one embodiment, the gesture that selects the intervening buttons is a tap-and-swipe gesture. In a further embodiment, the gesture that selects the intervening buttons is a tap-and-swipe gesture where the swipe is to the left or right. In yet another embodiment, the gesture that selects the intervening buttons is a tap-and-swipe gesture where the swipe is up or down. In still another embodiment, selection gestures are interpreted according to method 204 of FIG. 19. In a further embodiment, selection gestures are interpreted according to method 204 of FIG. 19 and letter selections are interpreted according to method 304 of FIG. 20. In still a further embodiment, letter selections are interpreted according to method 306 of FIG. 23.

The display 104, the IBGS text input interface 112, and the plurality of function buttons 116 are communicatively coupled with the processor 144, as described in the embodiment of FIG. 3. The processor 144 includes the elapsed time counter 240, the input gesture interpreter 242, and the word disambiguation algorithm 244. The processor 144 is communicatively coupled with the storage medium 148 and the power source 158, as described in the embodiment of FIG. 3.

In yet a further embodiment, the input gesture interpreter 242 analyzes an input gesture received by the touch sensitive display screen 104, interprets the input gesture as either a button tap or a unique selection gesture, then classifies the input as a conventional button tap or an intervening button tap based on the interpretation.

In another embodiment, the word disambiguation algorithm 244 analyzes a sequence of letter selections, compares the sequence with words in a language dictionary stored in the processor 144 or the storage medium 148, and disambiguates the letter pair selections within the sequence to identify an intended word.

In another embodiment, a user selects a letter by tapping on a letter pair. If the desired letter is identified by a swipe selection mark 178, such as a circle, then the user taps and swipes on the letter. An algorithm disambiguates pair selections. In one embodiment, words with ambiguous selections (like 'loon' and 'moon') require the user to tap the correct half of the button, i.e. tap the left half of 'l-m' to type 'loon' instead of 'moon'.

In a further embodiment, two layers of selection buttons overlap one another:
  a tap-selected layer and a swipe-selected layer. Layers align with one another such that the boundaries of selection targets on one layer coincide with the centers of selection targets on the other layer. Tap-selected targets record which half of the target receives the tap. Letters are tentatively displayed according to which half of the target gets tapped. An algorithm resolves ambiguous selections to identify the intended word. Incorrectly displayed letters become corrected.

One advantage is the interface drives all selection errors toward a single error type—a pair ambiguity. The interface does that in two ways.

First, boundaries of targets on one layer align with centers of targets on the other layer. That makes letters from one layer intervene with letters of the other. That makes tap-selected targets appear narrower than they actually are on one side. And swipe-selected target appear narrower than actuality on both sides. As a result, users guide their selections away from the target boundary on at least one side by a wider-than-needed margin.

Second—for tap targets—taps that cross the boundary from one target half to the other are not discouraged. As a result, users guide their selections toward the tap target boundary on that side.

The effects combine to make ambiguous pair selections the most highly likely error and minimizes the likelihood all the other kinds of errors. Consequently, the ambiguous pair selection is heavily anticipated (and therefore well-mitigated by the disambiguation algorithm) and an intended pair selection is ambiguous with only one other letter instead of two, three, or more letters as with a 26-button QWERTY interface.

The IBGS input interface 112 of FIG. 25 enables human language input, but in alternative embodiments enables input of non-language data, such as numbers, symbols, icons, or selectable functions of the device 100. The embodiment of FIG. 25 enables English-language input, but in alternative embodiments enables input of other languages.

Figure 27:
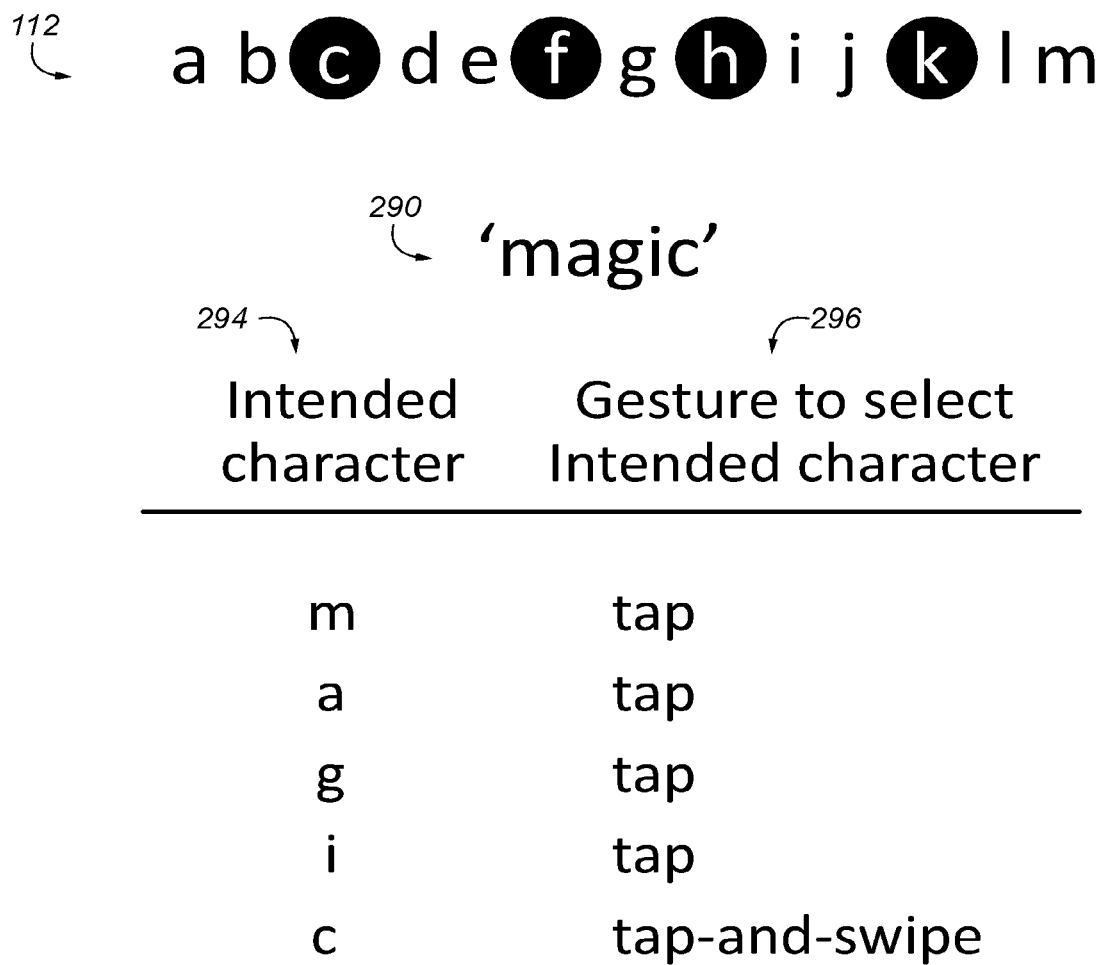
FIG. 27 is another example of an application of a method of character selection.

FIGS. 26 and 27 show examples of how a word 290 is composed according to method 306 of FIG. 23 and the embodiment of the IBGS interface 112 of FIG. 25. For the example of FIG. 26, the composed word 290 is 'field'.

Each row of FIG. 26 shows how an intended character 294 of the word 290 is selected using a particular gesture 296. A user selects letters based on the position of an intended character on the interface 112 of FIG. 25 and knowledge about how input gestures identify letters according to method 306 of FIG. 23.

For the example of FIG. 26, a tap-and-swipe on the button assigned letter T selects T. A tap on the button assigned the letter pair 'i j' tentatively selects the letter pair 'i j'. A tap on the button assigned the letter pair 'd e' tentatively selects the letter pair 'd e'. A tap on the button assigned the letter pair 'l m' tentatively selects the letter pair 'l m'. A tap on the button assigned the letter pair 'd e' tentatively selects the letter pair 'd e'. The word disambiguation algorithm 244 disambiguates the tentative selections to identify the word 'field'.

Each row of FIG. 27 shows how the intended character 294 of the word 290 is selected using the particular gesture 296. A user selects letters based on the position of an intended character on the interface 112 of FIG. 25 and knowledge about how input gestures identify letters according to method 306 of FIG. 23.

For the example of FIG. 27, a tap on the button assigned the letter pair 'l m' tentatively selects the letter pair 'l m'. A tap on the button assigned the letter pair 'a b' tentatively selects the letter pair 'a b'. A tap on the button assigned the letter 'g' selects 'g'. A tap on the button assigned the letter pair 'l j' selects the letter pair 'l j'. A tap-and-swipe on the button assigned letter 'c' selects 'c'. The word disambiguation algorithm 244 disambiguates the tentative selections to identify the word 'magic'.

Figure 28:
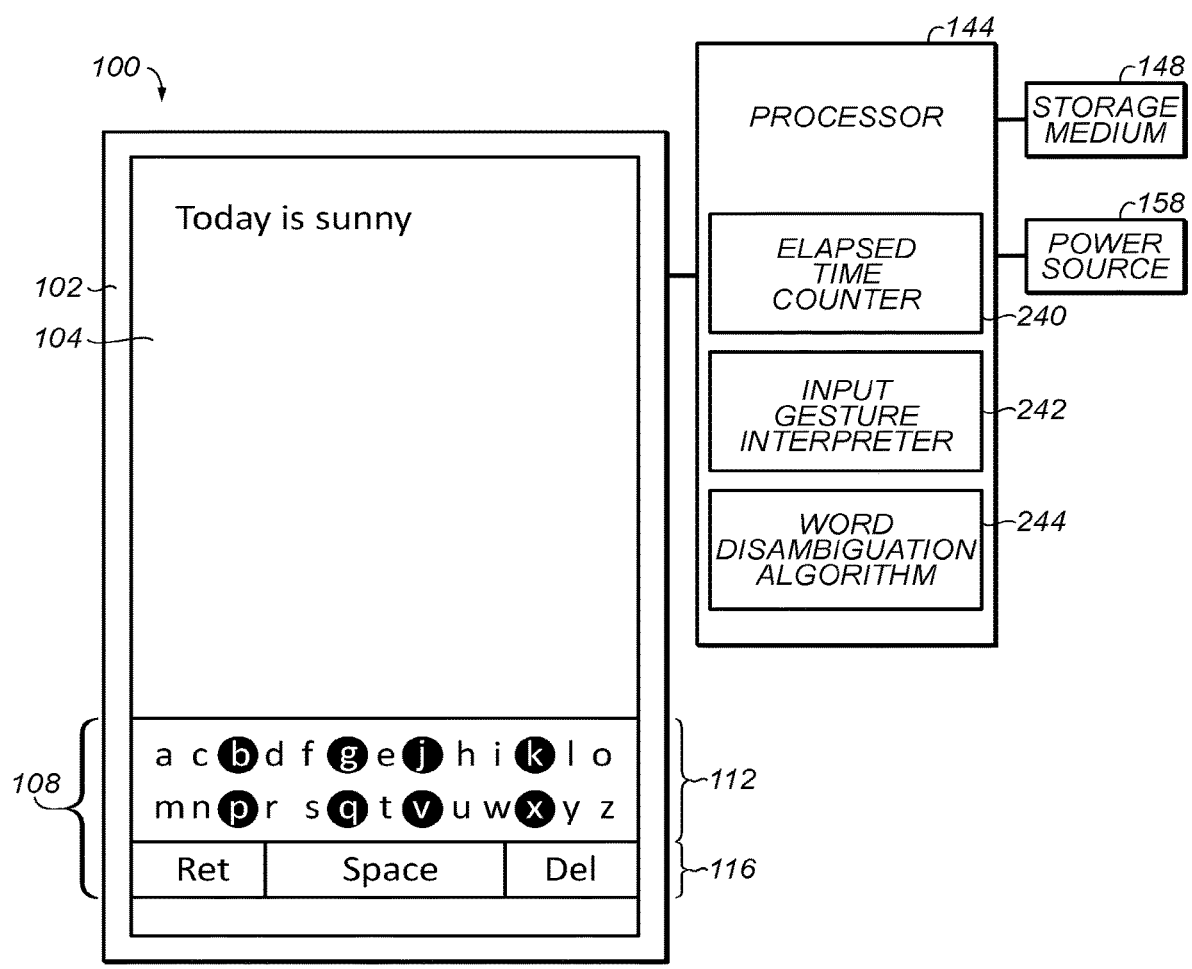
FIG. 28 is a schematic drawing of yet another embodiment of the electronic device.

FIG. 28 shows a schematic drawing of one embodiment of the electronic device 100. The device 100 may have some or all the components and functionality described herein with respect to the mobile device 100 of FIG. 3. The device 100 has aspects previously disclosed in FIG. 9 of U.S. Pat. No. 8,487,877, which is hereby incorporated by reference in its entirety.

The embodiment of FIG. 28 shows the electronic device as a mobile phone or smartphone. But in alternative embodiments, the electronic device 100 could be a wearable device, game, game controller, TV controller, augmented or virtual reality system, portion of an automotive dashboard or a number of other electronic devices that require user input.

In the embodiment of FIG. 28, the case 102 mechanically supports the touch sensitive display screen 104. The user input interface 108 occupies the lower portion of the display screen 104. The user input interface includes the plurality of function buttons 116 and the interleaved bi-gesture-sensitive (IBGS) text input interface 112.

In the embodiment of FIGS. 28, the case 102 mechanically supports the touch sensitive display screen 104. The user input interface 108 occupies the lower portion of the display screen 104. The user input interface includes the plurality of function buttons 116 and the interleaved bi-gesture-sensitive (IBGS) text input interface 112.

In one embodiment, the IBGS interface 112 includes two button rows. The interface has five conventional selection buttons 120 and four intervening selection buttons 164 per row. Four of the conventional buttons per row are assigned the letter pair 200. One conventional button per row is assigned a single letter. Each of the four intervening selection buttons per row is assigned a single letter. The intervening selection buttons are identified by the swipe gesture mark 178.

The conventional selection buttons are rectangular, identical in size and shape, and are arranged in a row such that each button is immediately adjacent to two other buttons in the row. The intervening buttons 164 have the same size, shape and distribution as the conventional selection buttons. The conventional and intervening buttons overlap and alternate with one another, as described in the embodiment of FIGS. 16-18.

From a purely visual standpoint, the letters and letter pairs assigned to the buttons appear to be a continuous row. In one embodiment, the row has 13 letters, which alternate between letter pairs (or, in one case, a single letter) and single letters demarcated by the swipe gesture mark. In another embodiment, the characters are arranged so that the least frequently used characters from among a plurality of characters are assigned to the intervening buttons. In a further embodiment, the least frequently used letters of an alphabet are assigned to the intervening buttons. In a further embodiment, the eight least frequently used letters of the English alphabet are assigned to the intervening buttons.

Figure 29:
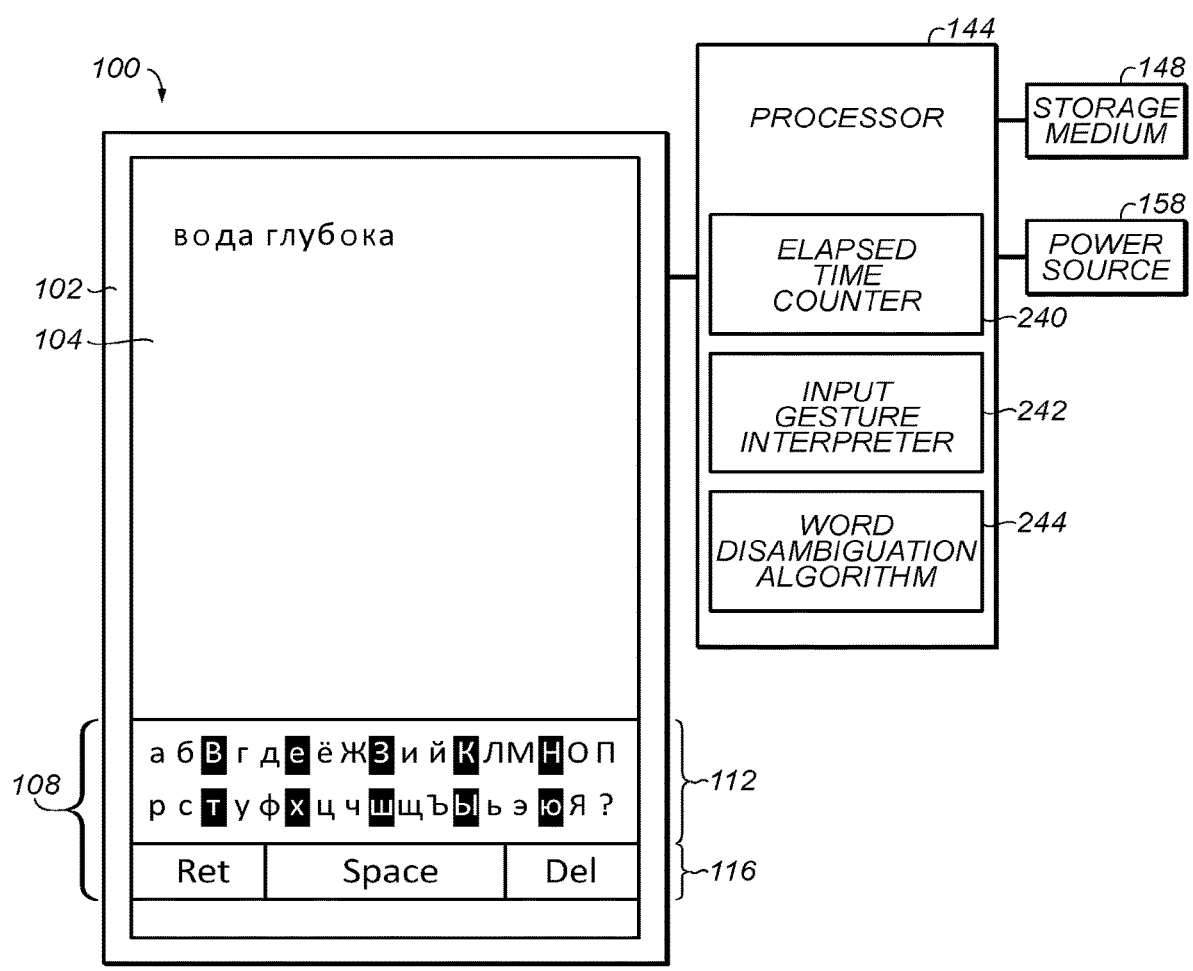
FIG. 29 is a schematic drawing of still another embodiment of the electronic device.

FIG. 29 shows a schematic drawing of one embodiment of the electronic device 100. The device 100 may have some or all the components and functionality described herein with respect to the mobile device 100 of FIG. 3. The device 100 has aspects previously disclosed in FIG. 9 of U.S. Pat. No. 8,487,877, which is hereby incorporated by reference in its entirety.

The embodiment of FIG. 29 shows the electronic device as a mobile phone or smartphone. But in alternative embodiments, the electronic device 100 could be a wearable device, game, game controller, TV controller, augmented or virtual reality system, portion of an automotive dashboard or a number of other electronic devices that require user input.

In the embodiment of FIG. 29, the case 102 mechanically supports the touch sensitive display screen 104. The user input interface 108 occupies the lower portion of the display screen 104. The user input interface includes the plurality of function buttons 116 and the interleaved bi-gesture-sensitive (IBGS) text input interface 112.

In one embodiment, the IBGS interface 112 includes two button rows. The interface has six conventional selection buttons 120 and five intervening selection buttons 164 per row. Each of the conventional buttons in a row is assigned a letter pair. Each of the intervening selection buttons in a row is assigned a single letter. The intervening selection buttons are identified by the swipe gesture mark 178.

The conventional selection buttons are rectangular, identical in size and shape, and are arranged in a row such that each button is immediately adjacent to two other buttons in the row. The intervening buttons 164 have the same size, shape and distribution as the conventional selection buttons. The conventional and intervening buttons overlap and alternate with one another, as described in the embodiment of FIGS. 16-18.

From a purely visual standpoint, the letters and letter pairs assigned to the buttons appear to be a continuous row. In one embodiment, the row has 17 letters, which alternate between letter pairs and single letters demarcated by the swipe gesture mark.

In one embodiment, selection gestures are interpreted according to method 204 of FIG. 19 and letter selections are interpreted according to method 304 of FIG. 20. In another embodiment, letter selections are interpreted according to method 306 of FIG. 23. In one embodiment, the letters of the interface 112 include the 33 letters of the Russian alphabet.

Figure 30:
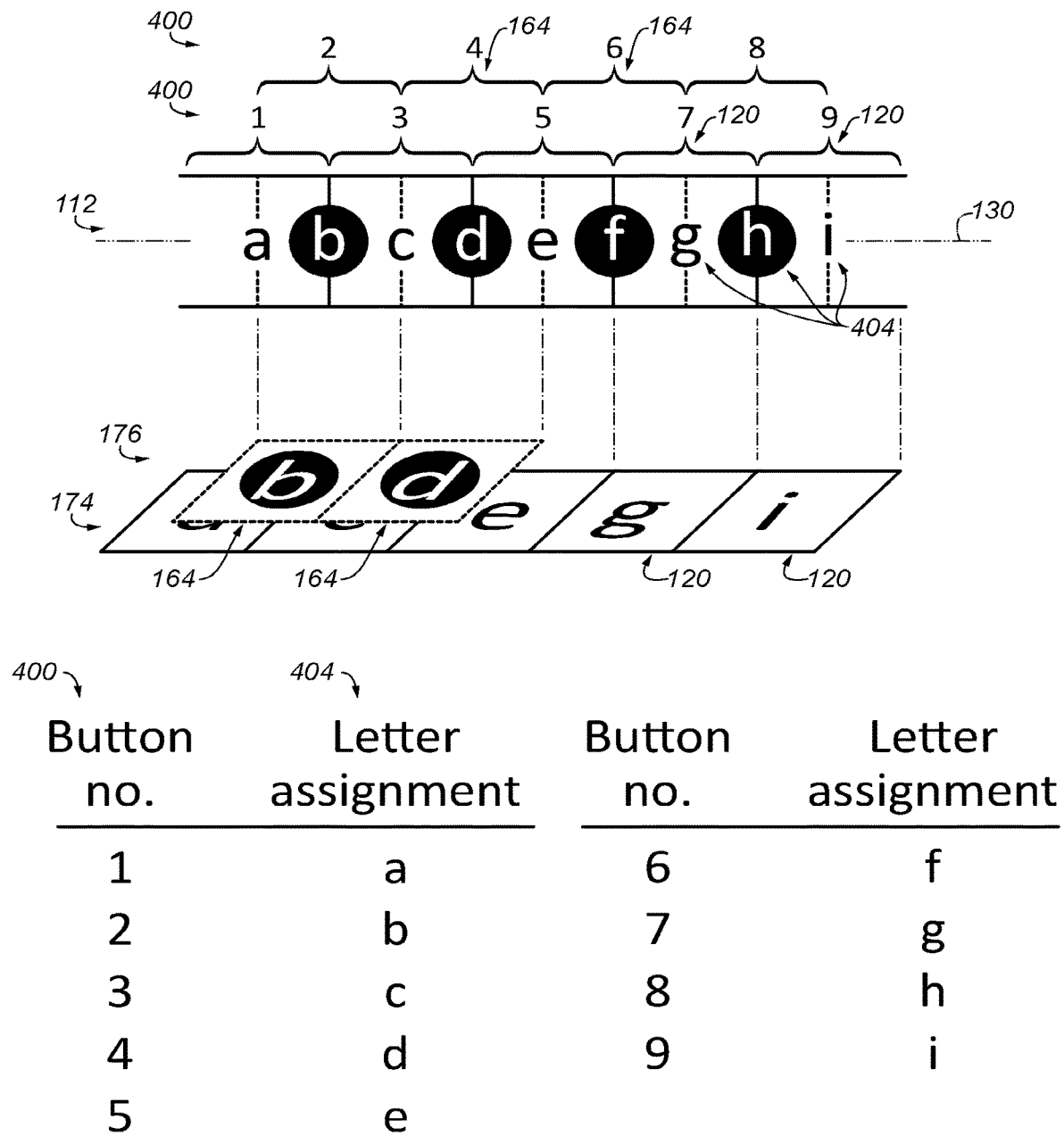
FIG. 30 is a plan view and a perspective view of one embodiment of the interleaved character selection interface, along with a table of one embodiment of letter assignments.

FIG. 30 shows two views of the embodiment of the IBGS text input interface 112 of FIGS. 8-11. As the plan view shows, the conventional and intervening buttons 120, 164 lie in a row along the imaginary axis 130. In the perspective view, the intervening buttons 120, 164 are shown on separate layers 174, 176, the intervening buttons above the conventional buttons, so that each kind of button can be seen separately. One letter is assigned to each button.

FIG. 30 further discloses button numbers 400. Button numbers identify individual buttons within the text input interface 112. In the embodiment of FIG. 30, the conventional buttons 120 have odd button numbers and the intervening buttons 164 have even button numbers. In an alternative embodiment, conventional and interleaving buttons have even and odd numbers, respectively. In yet another embodiment, each kind of button has both even and add button numbers.

FIG. 30 further discloses a letter assignment 404 for each conventional and interleaved button 120, 164. In the embodiment of FIG. 30, each button has one letter assignment, but in an alternative embodiment one button has more than one letter assignment.

In the embodiment of FIG. 30, button numbers identify buttons in increasing consecutive order from left to right along the interface 112. In an alternative embodiment, button numbers are in non-consecutive order. In yet another embodiment, button numbers identify buttons in decreasing consecutive order from left to right.

Figure 31:
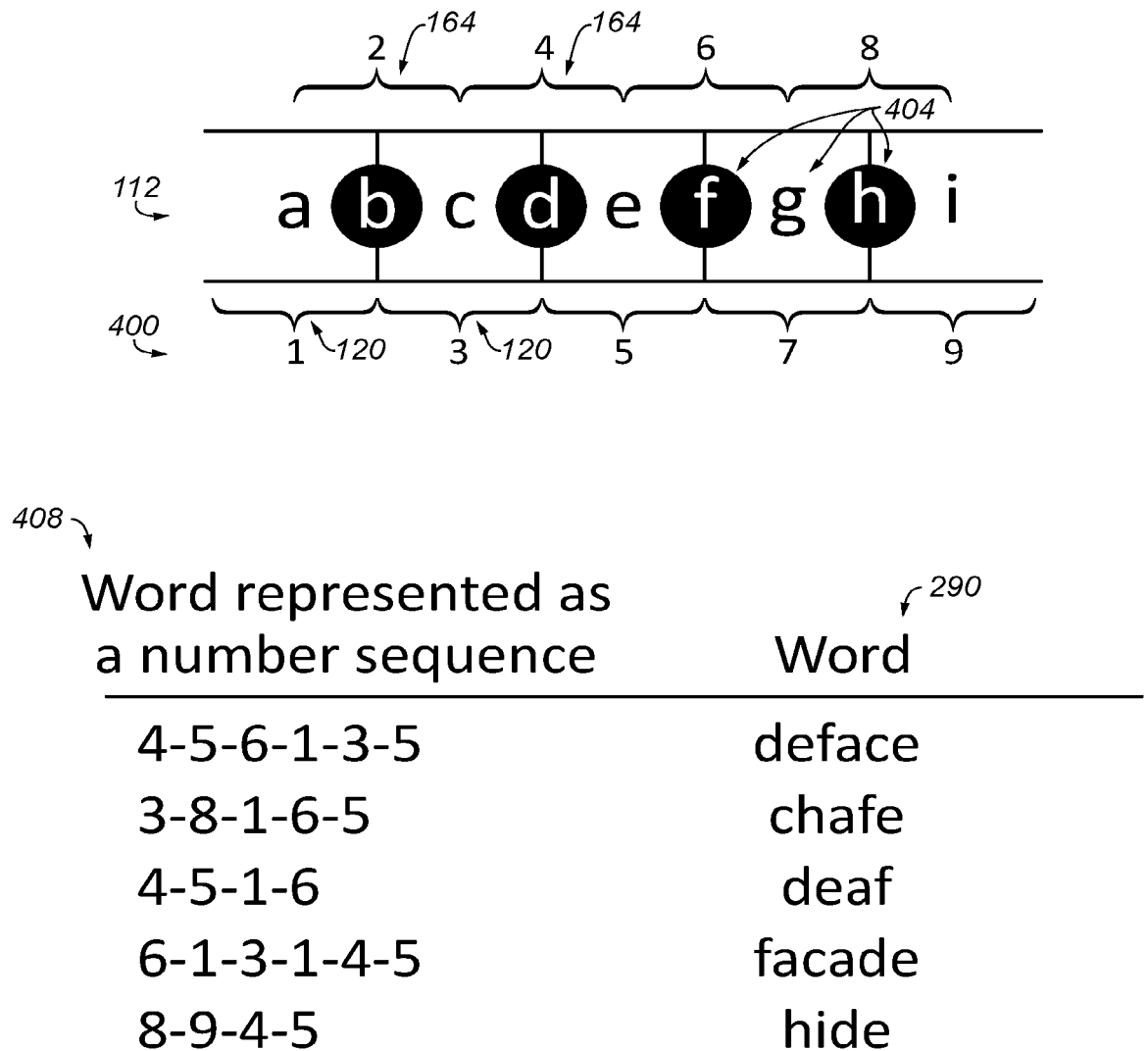
FIG. 31 is a plan view of one embodiment of the interleaved character selection interface, along with a table of words represented according to the embodiment of the interleaved character selection interface.

FIG. 31 discloses a plan view of the embodiment of the interface 112 of FIG. 30, including the button numbers 400 and the letter assignments 404 that correspond with each button 120, 164. FIG. 30 further discloses how button numbers appended together to form a sequence 408 represent a word 290.

In one example, according to the button numbers and letter assignments for the embodiment of FIG. 30, button numbers appended together to form the sequence 4-5-6-1-3-5 represent the word 'deface'. In another example, according to the button numbers and letter assignments for the embodiment of FIG. 30, button numbers appended together to form the sequence 3-8-1-6-5 represent the word 'chafe'.

Figure 32:
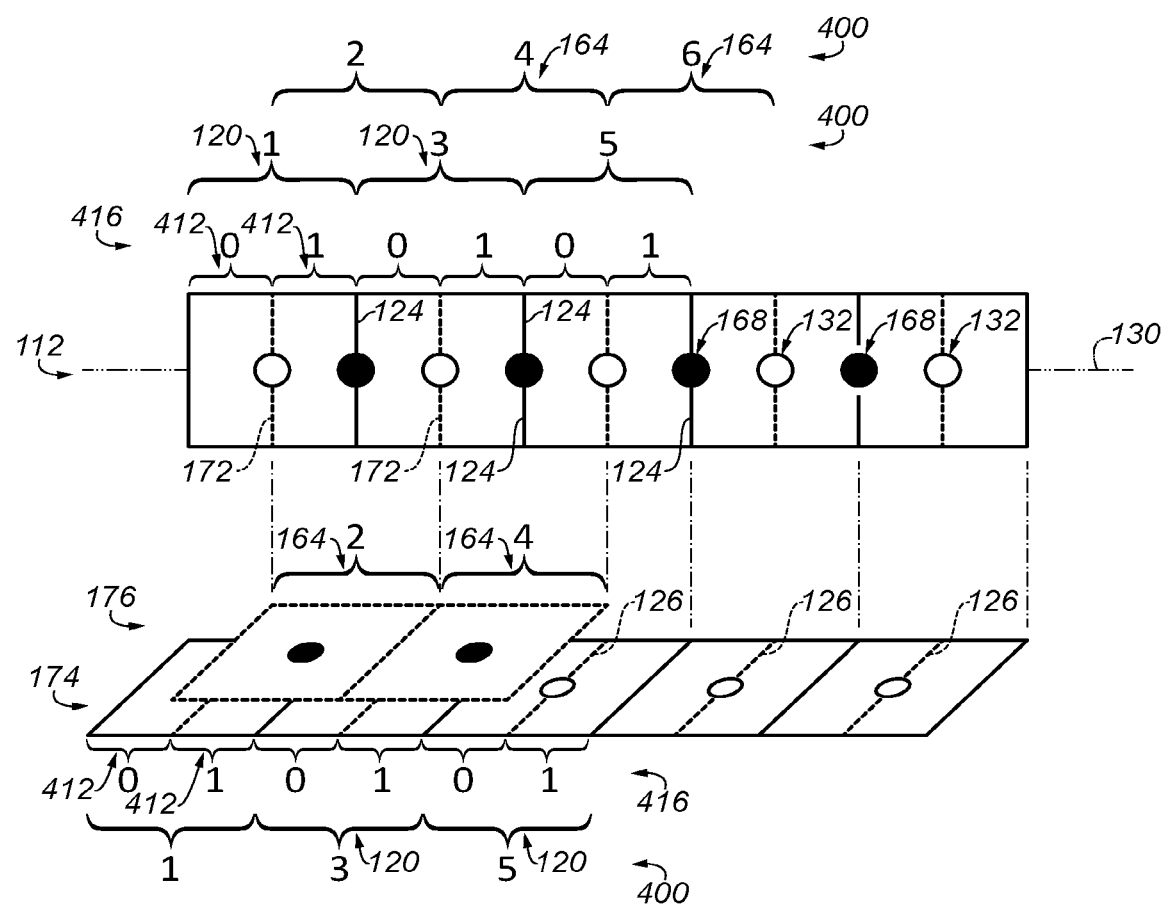
FIGS. 32 and 33 each show plan and perspective views of one embodiment of the interleaved character selection interface.
Figure 33:
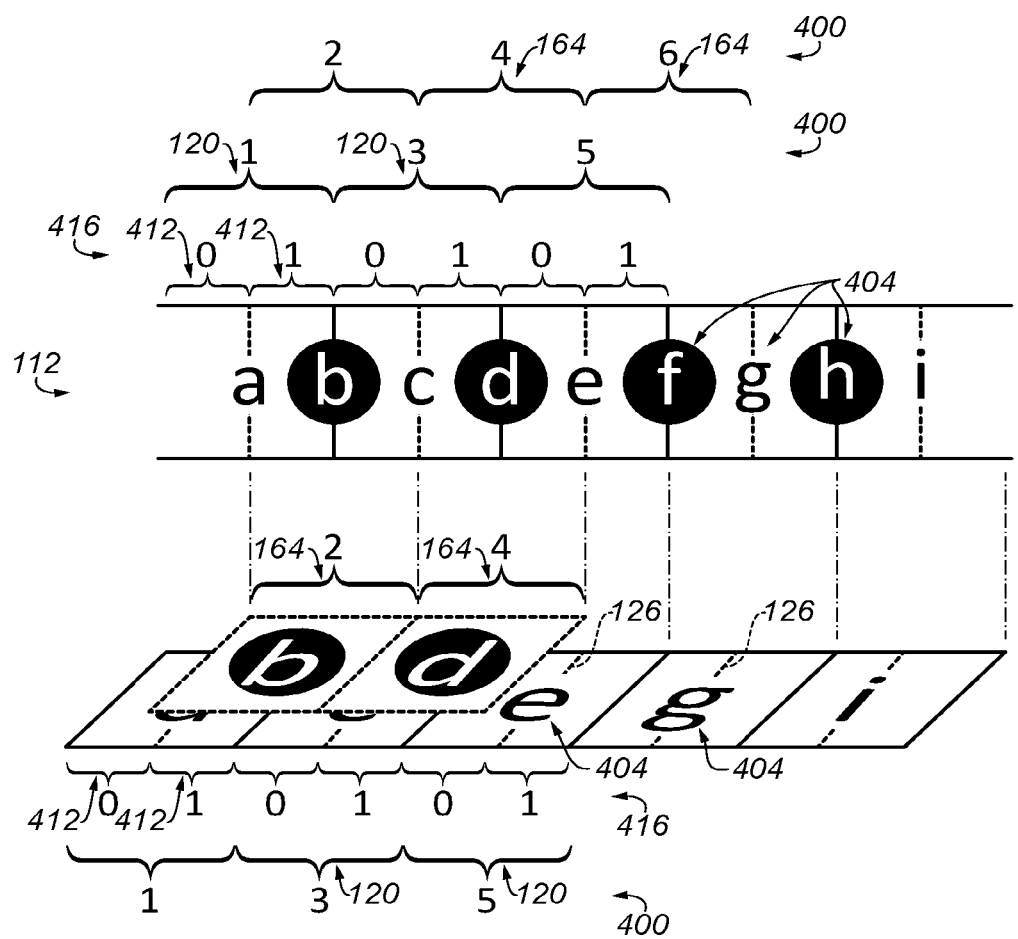

FIGS. 32 and 33 each show two additional views of the embodiment of the IBGS text input interface 112 of FIG. 22.

FIG. 32 shows the embodiment of FIG. 22, but with letter assignments omitted. As the plan view shows, both the conventional and intervening buttons 120, 164 lie in a row along the imaginary axis 130. The press targets 132, 168 for the two kinds of buttons alternate along the length of the button row. In the embodiment of FIG. 32, the conventional button press targets 132 lie on the intervening button boundaries 172 and the intervening button press targets 168 lie on the conventional button boundaries 124. The perspective view shows the conventional and intervening buttons 120, 164 on separate layers 174, 176, so that each kind of button can be viewed separately. The button numbers 400 identify individual buttons within the text input interface 112. In the embodiment of FIG. 32, the conventional buttons 120 have odd button numbers and the intervening buttons 164 have even button numbers.

FIG. 32 further discloses a button half 412 and a button-half number 416. The button half 412 is the portion of the conventional button 120 that lies on one side of the conventional button dividing boundary 126. The button-half number 416 is a number that identifies an individual button half 412.

In the embodiment of FIG. 32, the two button halves 412 of a given button are identified by the button-half numbers 0 and 1. In an alternative embodiment, a different pair of numbers are used. In another alternative embodiment, the button-half numbers 416 are symbols, such as L and R. In yet another embodiment, the button halves don't use the same pair of numbers throughout the interface 112.

FIG. 33 shows the same views and elements as FIG. 32, except FIG. 33 omits the button press targets 132, 164 shown in FIG. 32 and discloses the letter assignments 404.

Note that although the letter assignments of FIGS. 22 and 33 differ, the embodiments of FIGS. 22, 32 and 33 are the same. The embodiment is defined by the relationship between the interleaved buttons 164, the conventional buttons 120, and the button halves 412, which is the same in all three Figures.

Note that although the embodiment of FIG. 33 has the same letter assigned to each button half 412, the embodiments of FIGS. 22, 32 and 33 are the same. Again, the embodiment is defined by the relationship between the interleaved buttons 164, the conventional buttons 120, and the button halves 412, which is the same in all three Figures.

Figure 34:
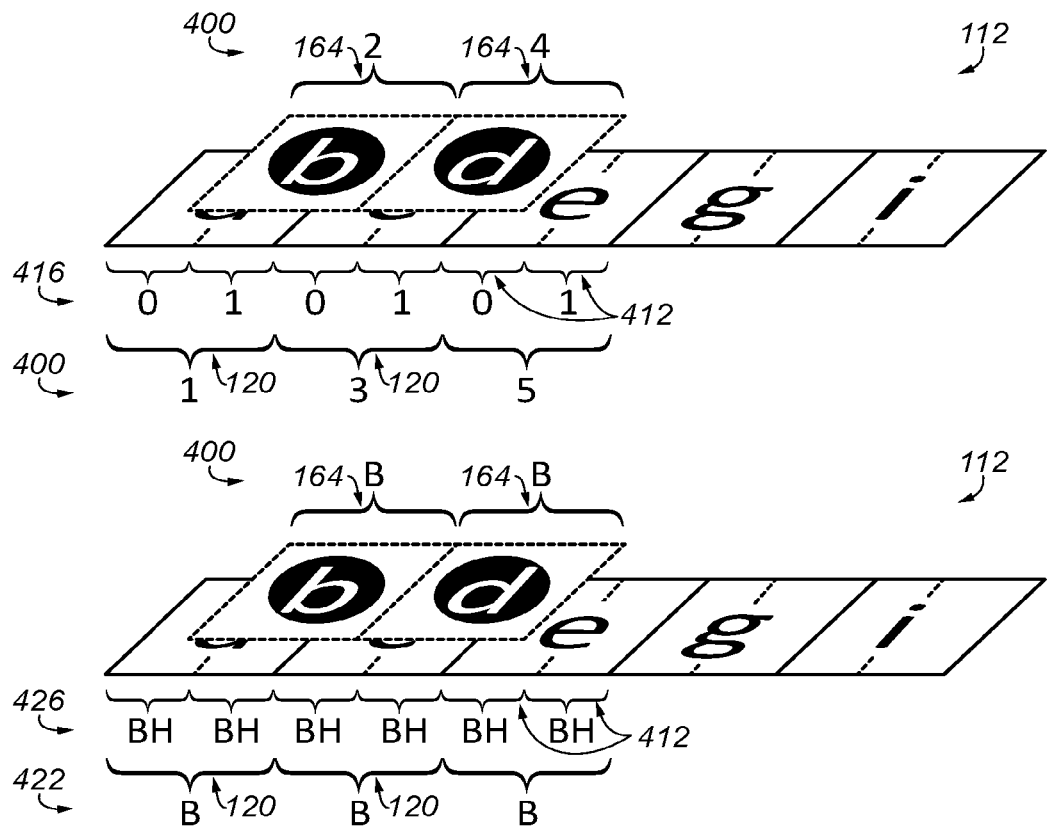
FIG. 34 is two perspective views of one embodiment of the interleaved character selection interface and a format for representing button actuations on the interface.

FIG. 34 discloses two exploded perspective views of the interface 112. The top view shows the same embodiment of FIG. 33. The bottom view shows a generic embodiment that uses a variable B 422 to represent the button numbers 400 and a variable BH 426 to represent the button-half numbers 416.

FIG. 34 also discloses a unit string 420, which is a variable that simultaneously represents a particular button 120, 164 and button-half 412. Generically, the unit string 420 has the format 'button:button-half', alternately represented 'B:BH'. The variable B in the first position of the unit string holds a value for the button number 400. The variable BH in the second position of the unit string holds a value for the button-half number 416.

In one example of the embodiment, according to the letter assignments of the embodiment of FIG. 34, the unit string '51' represents the letter 'e'. In another example from the same embodiment, the unit string '40' represents the letter 'd'.

Note that because the intervening buttons 164 do not have button halves nor button-half numbers, the value occupying the variable BH is meaningless and therefore could be anything. In the embodiment of FIG. 34, BH=0 for intervening buttons.

FIG. 35 discloses the button number (B) 400, the button-half number (BH) 416, the unit string (B:BH) 420, and the letter assignment 404 for each button of the embodiment of the interface 112 of FIG. 34.

In an example from the embodiment, according to the letter assignments of the embodiment of FIG. 34, the unit string '10' represents the letter assignment 'a'. In another example from the embodiment, the unit string '71' represents the letter assignment 'g'. In another example from the embodiment, the unit string '60' represents the letter assignment T.

Figure 36:
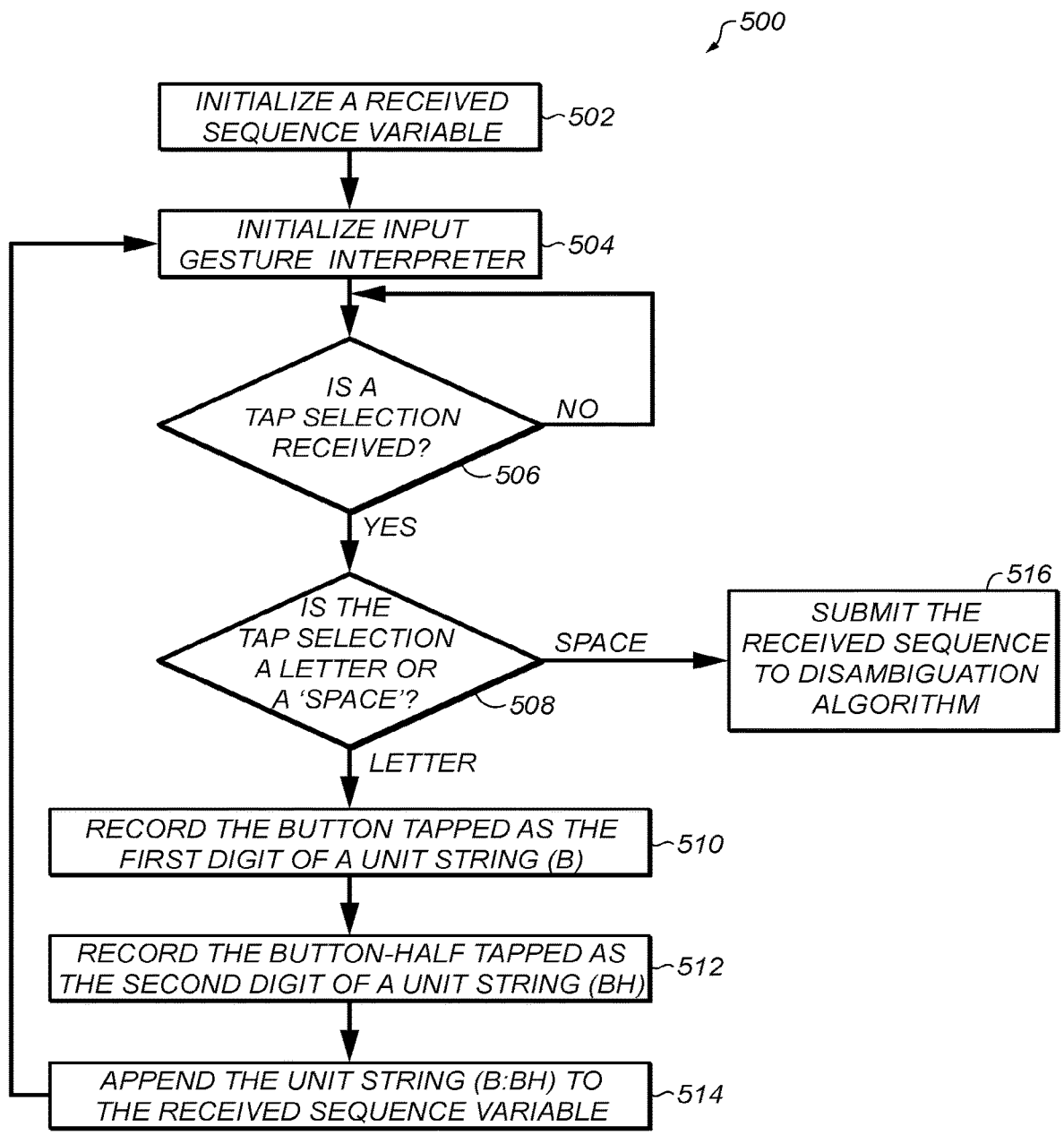
FIG. 36 is a flowchart of an embodiment of a method for a processor of the electronic device to interpret button actuations.
Figure 37:
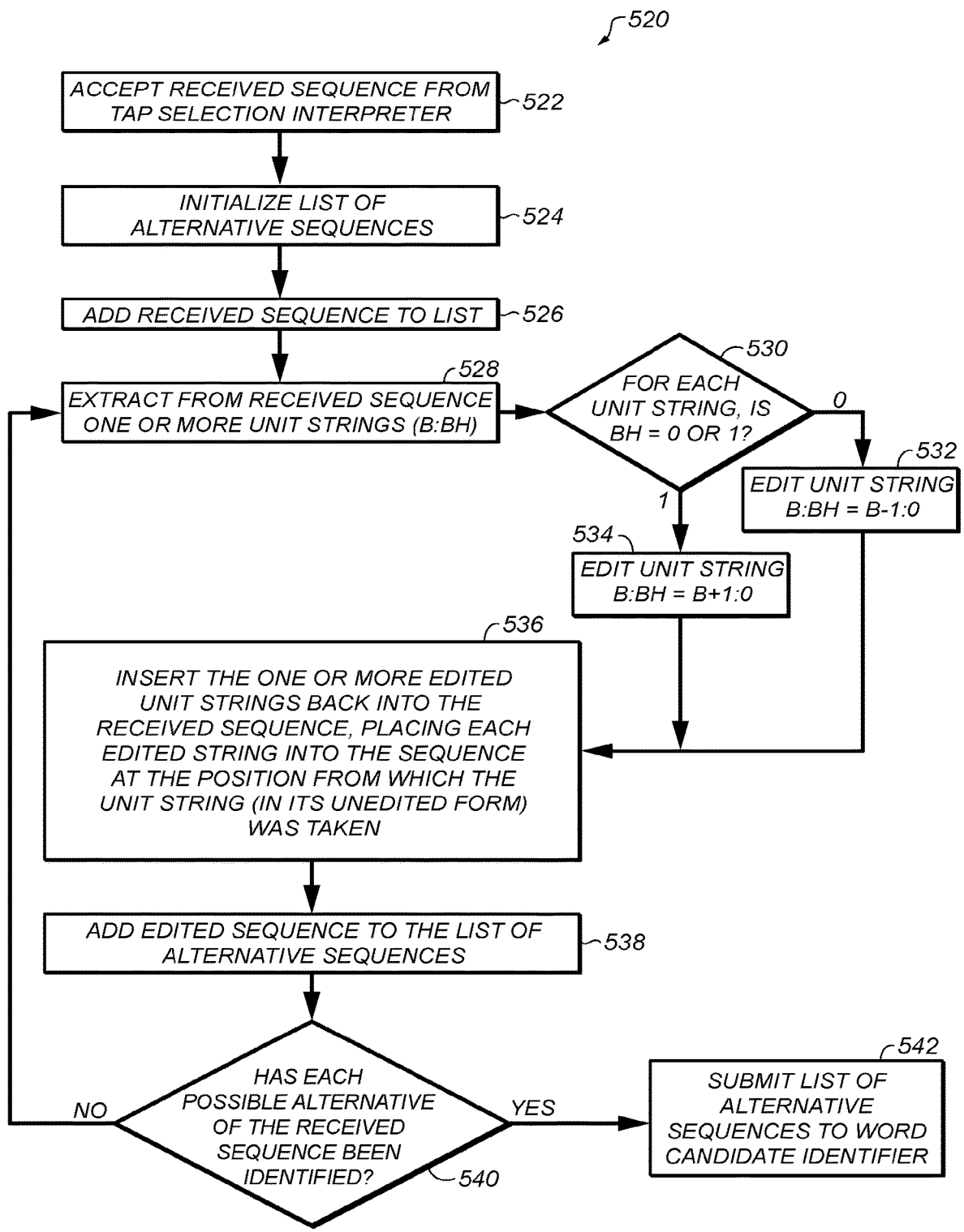
FIG. 37 is a flowchart of an embodiment of a method for a processor of the electronic device to interpret button actuations.
Figure 38:
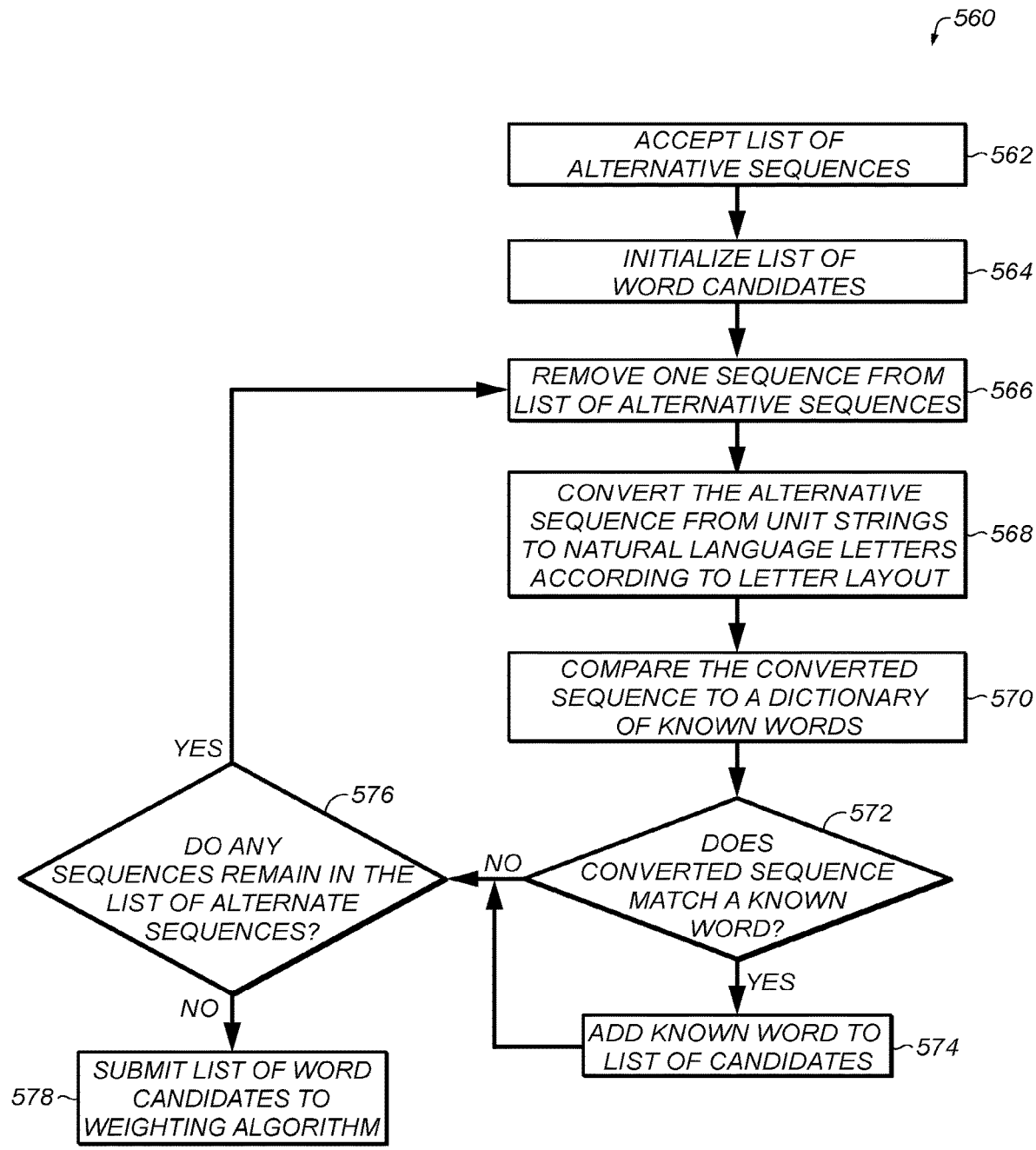
FIG. 38 is a flowchart of an embodiment of a method for a processor of the electronic device to identify word candidates.

FIGS. 36-38 disclose a series of three methods for the processor 144 of the electronic device 100 to determine an intended word from button selections on the interface 112 using the unit string and sequence notation disclosed in FIGS. 30-35.

FIG. 36 shows a received sequence variable 424 and a flowchart of an embodiment of a method 500 for the processor 144 of the electronic device 100 to encode a series of button taps as a sequence of unit strings.

The received sequence variable 424 holds a sequence of unit strings, where each unit string represents a letter assigned to a button and button-half according to one embodiment of the interface 112. In one embodiment, the received sequence represents a sequence of button selections executed by a user on the interface 112 of the electronic device 100.

In a first step 502 of the method 500, the processor 144 initializes the received sequence variable 424. In another step 504, the processor 144 initializes the input gesture interpreter 242. In a step 506 of method, the input gesture interpreter 242 monitors the text input interface 112 for a tap selection gesture. Once a first selection gesture occurs, in step 508, the input gesture interpreter determines if the tap selection is a letter or a spacebar selection. If in step 508 the input gesture interpreter 242 determines the selection gesture is a letter selection, in a subsequent step 510 the input gesture interpreter records the button number (B) 400 in the first position of the unit string 420. In a subsequent step 512 the input gesture interpreter records the button-half number (BH) 416 in the second position of the unit string 420. In a subsequent step 514, the input gesture interpreter appends the unit string (B:BH) 420 to the received sequence variable 424.

If in step 508 the input gesture interpreter 242 determines the selection gesture is a spacebar selection, in a step 516 the interpreter submits the received sequence to a subsequent algorithmic procedure.

According to a further embodiment of the invention, the CPU executes the method 500 iteratively, interpreting one character selection with each iteration.

Although the method 500 of FIG. 36 is one embodiment of a method for interpreting a series of letter selections, the scope of the method is not limited by this particular embodiment, but rather by the scope of the claims. FIG. 37 shows a flowchart of an embodiment of a method 520 for the processor 144 of the electronic device 100 to identify alternative sequences that a user may have intended while executing letter selections on the interface 112 of the electronic device 100. An alternative sequence is a sequence that has the same number of unit strings as the received sequence 424, but where one or more unit strings of the sequence has a button value (B) that is one less or one greater than the received button number.

In some applications of the method 520, the motivation for the edit to the button value (B) is to correct an input intended as an intervening button tap but, due to an inaccurate tap, lands on the conventional button next to the intervening button. In other applications of the method 520, the motivation for the edit is to enable selection of letters on intervening buttons that are not tap-selectable at all. In that application, a tap selection that lands on an intervening button becomes interpreted as a tap on the conventional button that visually underlies the intervening button at the location of the tap. (See the steps 314, 318 and 320 of the method 300 in FIG. 14 for an example of a method that accommodates an interface in which some buttons have letters that are not tap-selectable) The edit enables the intended letter to become selected via a letter edit, as follows.

In one step 522 of the method 520, the processor 144 accepts the received sequence 424 from the input gesture interpreter 242. In another step 524, the processor 144 initializes a list of alternative sequences. In a step 526 of the method, the processor adds the received sequence 424 to the list of alternative sequences. In another step 528 of the method, the processor extracts from the received sequence 424 one or more unit strings (B:BH).

In another step 530 of the method, the processor evaluates each extracted unit string to determine if the variable BH=0 or 1. If in the step 530, the processor determines one or more unit strings have BH=0 then, for those unit strings, in a step 532 the processor edits each particular string B:BH to B−1:0. If in the step 530, the processor determines one or more unit strings have BH=1 then, for those unit strings, in a step 534 the processor edits each particular string from B:BH to B+1:0.

In another step 536, the processor inserts the one or more edited unit strings back into the received sequence 424, placing each edited string into the sequence at the position from which the unit string—in its unedited form—was taken. In a subsequent step 538, the processor 144 adds the edited sequence to the list of alternative sequences.

In a subsequent step 540, the processor determines if each possible alternative of unit string edits (according to the edits in Steps 532 and 534) of the received sequence have been identified. If not, the method 520 returns to the step 528 to extract one or more different unit strings from the received sequence. If so, in a step 542 the processor 144 submits the list of alternative sequences to a subsequent algorithmic procedure.

FIG. 38 shows a flowchart of an embodiment of a method 560 for the processor 144 of the electronic device 100 to identify word candidates from the list of alternative sequences. Word candidates are natural language words that that a user may have intended as a result of the button selections accepted by the interface 112 of the electronic device 100.

In one step 562 of the method 560, the processor 144 accepts the list of alternative sequence from output of the method 520. In another step 564, the processor 144 initializes a list of word candidates. In a step 566, the processor removes one sequence from the list of alternative sequences. In another step 568 of the method, the processor converts the removed alternative sequence from unit strings to natural language letters according to the letter layout of the interface 112. In a subsequent step 570, the processor compares the converted sequence to a stored dictionary of known words.

In a further step 572, the processor determines if the converted word matches any know words. If in the step 572 the processor finds a match, the processor in a step 574 adds the known word to the list of word candidates. If in the step 572 the processor finds no match, then the processor bypasses the step 574. Then, in a step 576, the processor determines if the list of alternative sequences has remaining entries. If the processor determines the list still contains entries, the process re-executes the step 566. If the processor determines that the list of alternative sequences has no remaining entries, then in a step 578 the processor submits the list of word candidates to a subsequent algorithm procedure.

In yet a further step, the processor transmits a word from the list of word candidates to the display. In a further step, the display displays the word in a text output region of the display.

Although the method 560 of FIG. 38 is one embodiment of a method for identifying alternative sequences to the one actually received, the scope of the method is not limited by this particular embodiment, but rather by the scope of the claims.

FIG. 39 shows an example of the output for one embodiment of the methods 500, 520, 560. In the example of FIG. 39, the method 500 encodes a series of button taps as a sequence of unit strings and yields the received sequence '31-50-11-70' 424. From this received sequence, the method 520 identifies sixteen alternative sequences 426. From these alternative sequences, the method 560 identifies sixteen corresponding converted sequences 428. From these converted sequences, the method 560 identifies one word candidate 430, which is the word 'deaf'. In another example, for a different series of button taps on the interface 112, the methods 500, 520, 560 yield a different received sequence, set of alternative sequences, set of converted sequences, and set of word candidates.

Figure 40:
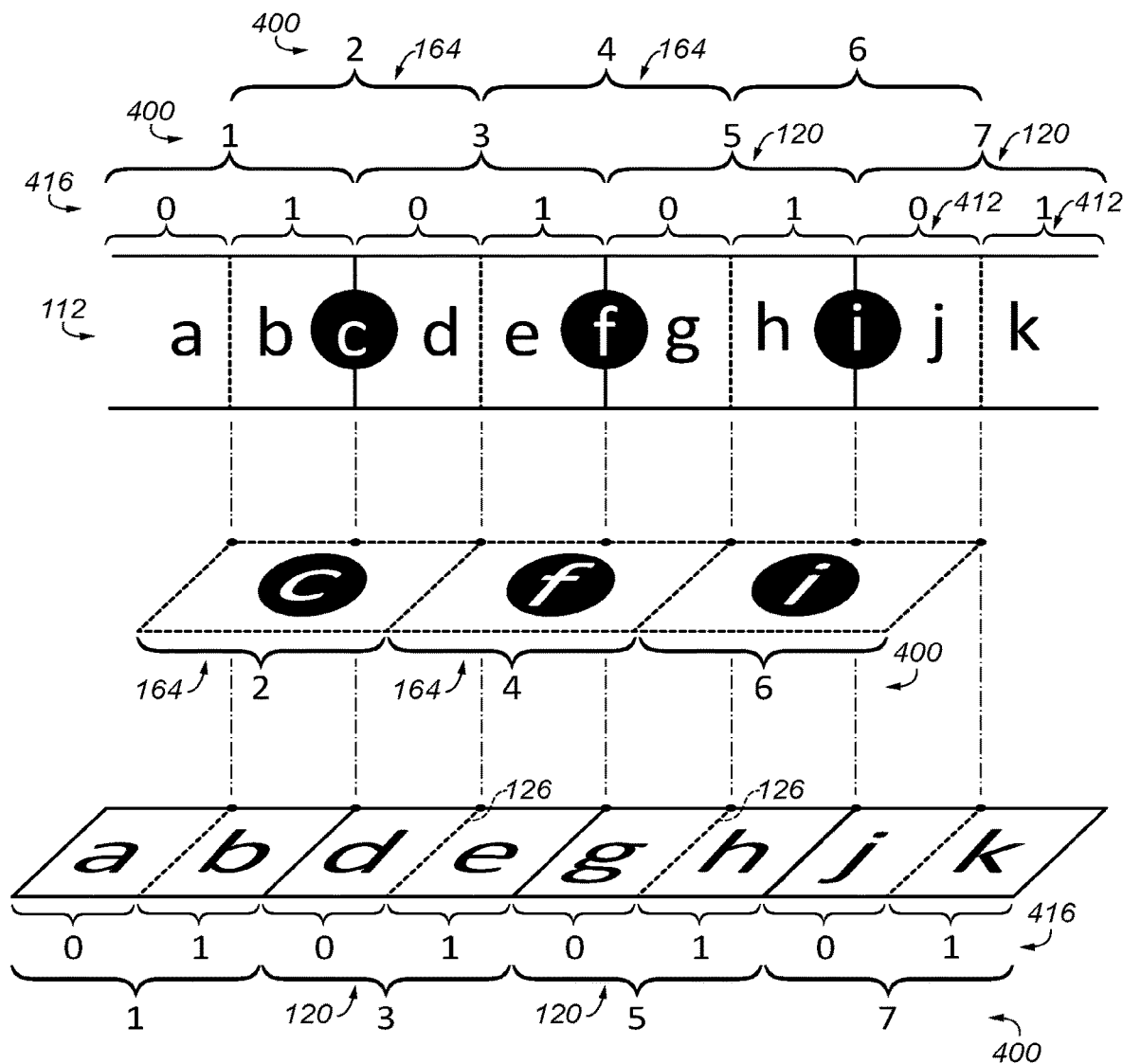
FIG. 40 is a plan view and a perspective view of one embodiment of the interleaved character selection interface.

FIG. 40 shows the embodiment of FIG. 22, albeit with different letter assignments, and that additionally discloses the button numbers 400, the button halves 412, and the button-half numbers 416. As described in FIG. 32, the button numbers 400 identify individual buttons within the text input interface 112. In the embodiment of FIG. 40, the conventional buttons 120 have odd button numbers and the intervening buttons 164 have even button numbers.

As described in FIG. 40, the button half 412 is the portion of the conventional button 120 that lies on one side of the conventional button dividing boundary 126. The button-half numbers 416 identify individual button halves 412 of the conventional buttons 120. In the embodiment of FIG. 40, the two button halves 412 of a given button are identified by the button-half numbers 0 and 1.

Figure 41:
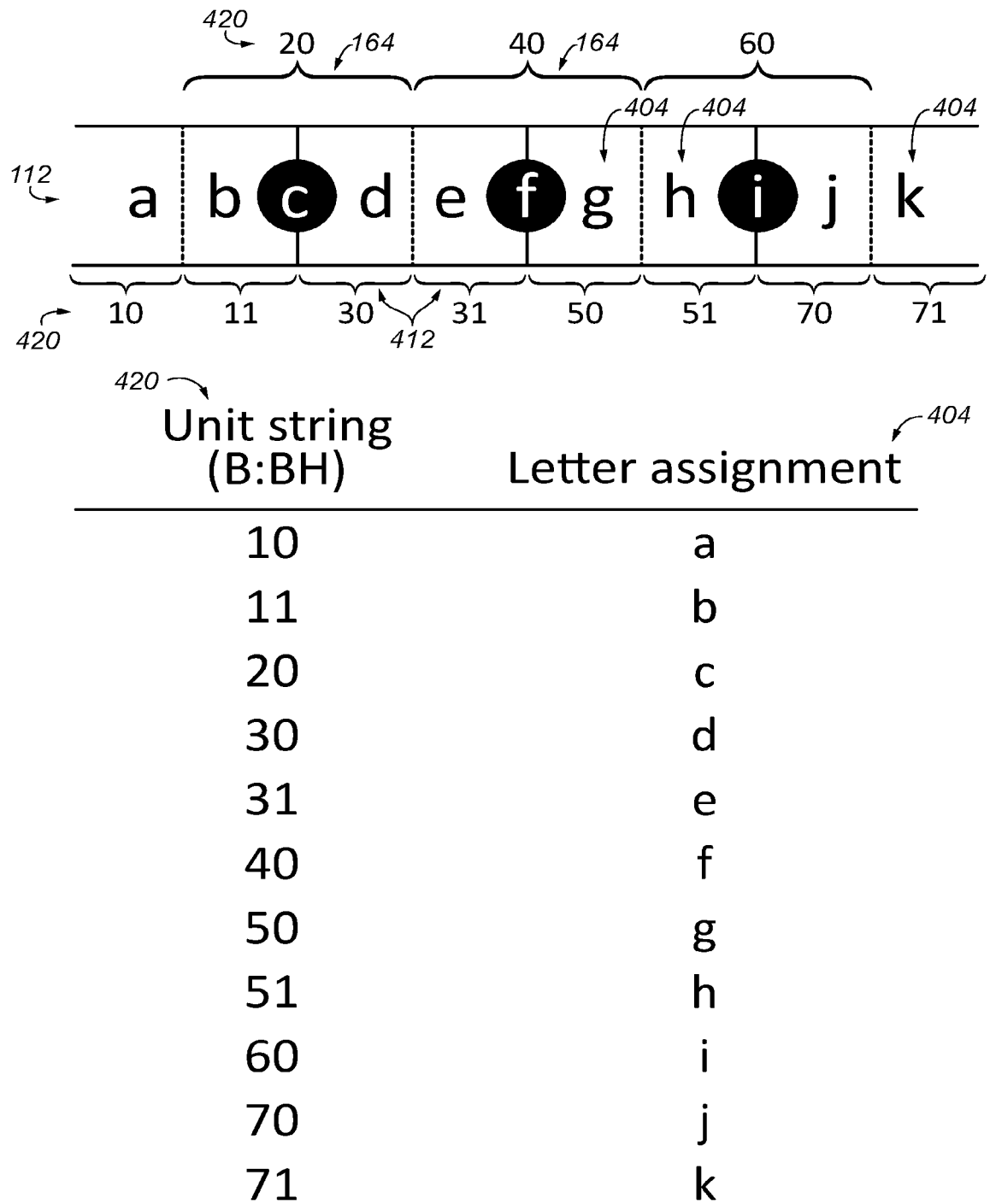
FIG. 41 is a plan view of one embodiment of the interleaved character selection interface, along with a table of one embodiment of letter assignments.

FIG. 41 shows a plan view of the embodiment of FIG. 40, where each interleaved button 164 and each button-half 412 is labeled by its unit string 420. FIG. 41 also shows in a table the correspondence between each unit string (B:BH) 420 and the specific letter assignments 404. For the embodiment shown in FIGS. 22, 40 and 41, each button half 412 has a unique letter assignment.

Figure 42:
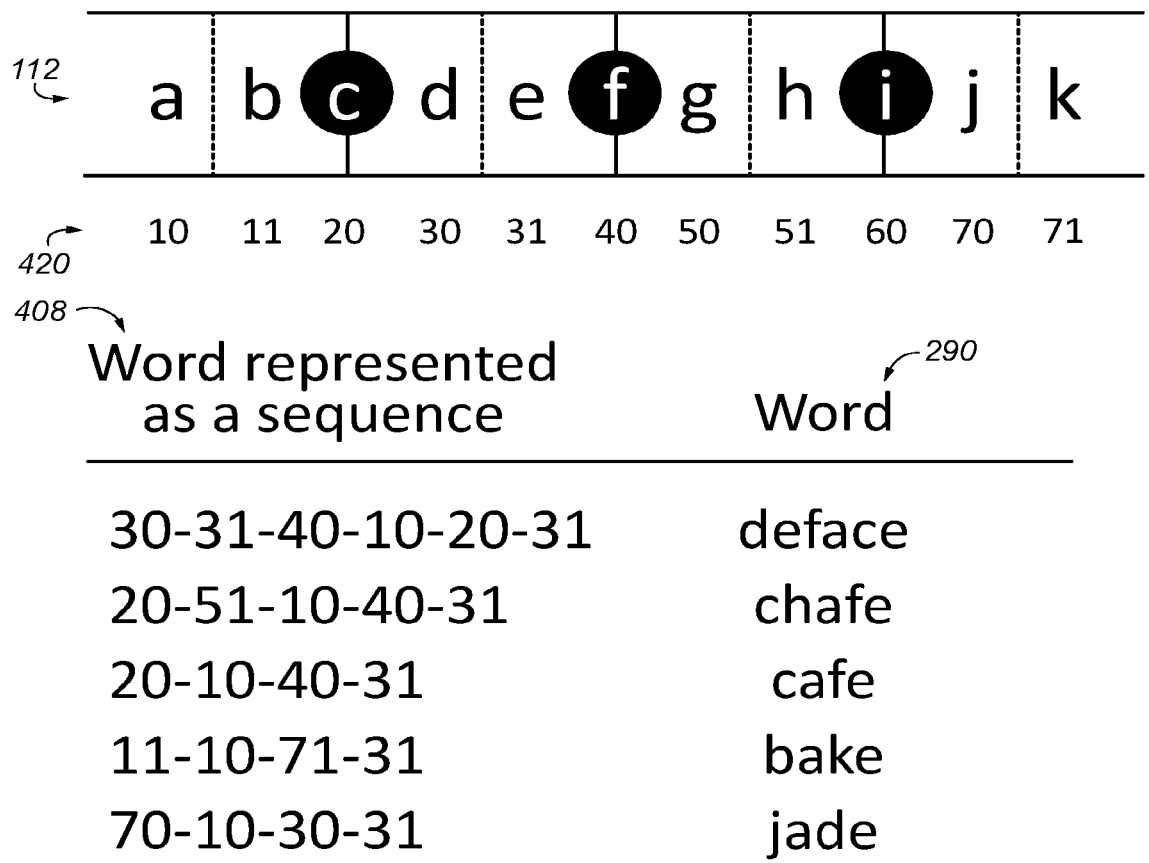
FIG. 42 is a plan view of one embodiment of the interleaved character selection interface, along with a table of words represented according to the embodiment of the interleaved character selection interface.

FIG. 42 shows again the plan view of the embodiment of FIG. 40 with each interleaved and each button half labeled by its unit string. FIG. 42 further discloses how unit strings appended together to form a sequence 408 represent a word 290.

In one example, according to the unit strings and letter assignments for the embodiment of FIG. 42, unit strings appended together to form the sequence 20-51-10-40-31 represent the word 'chafe'. In another example, according to the unit strings and letter assignments for the embodiment of FIG. 42, unit strings appended together to form the sequence 11-10-71-31 represent the word 'bake'.

Figure 43A:
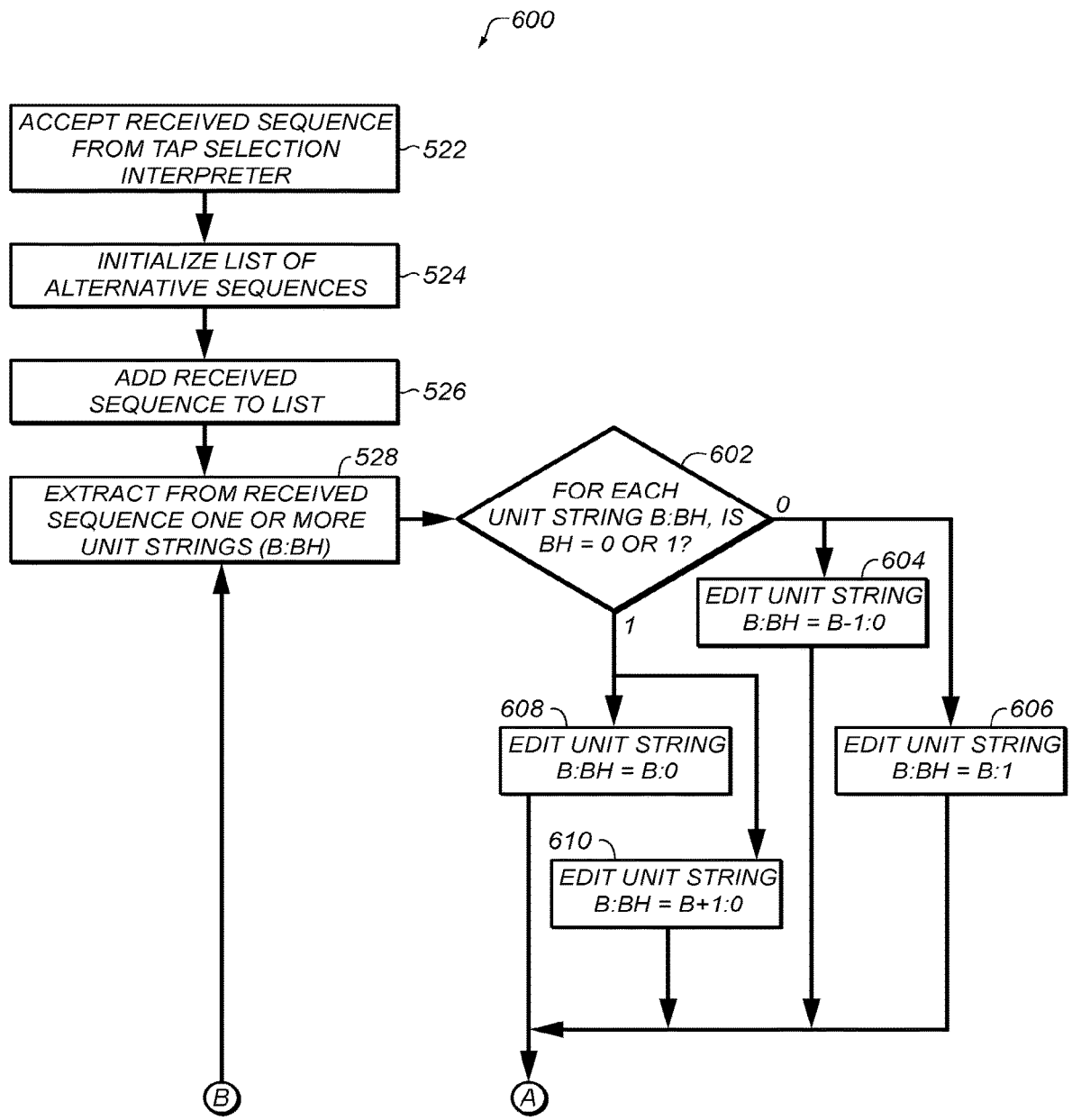
FIGS. 43A and B are flowcharts of an embodiment of a method for a processor of the electronic device to interpret button actuations.
Figure 43B:
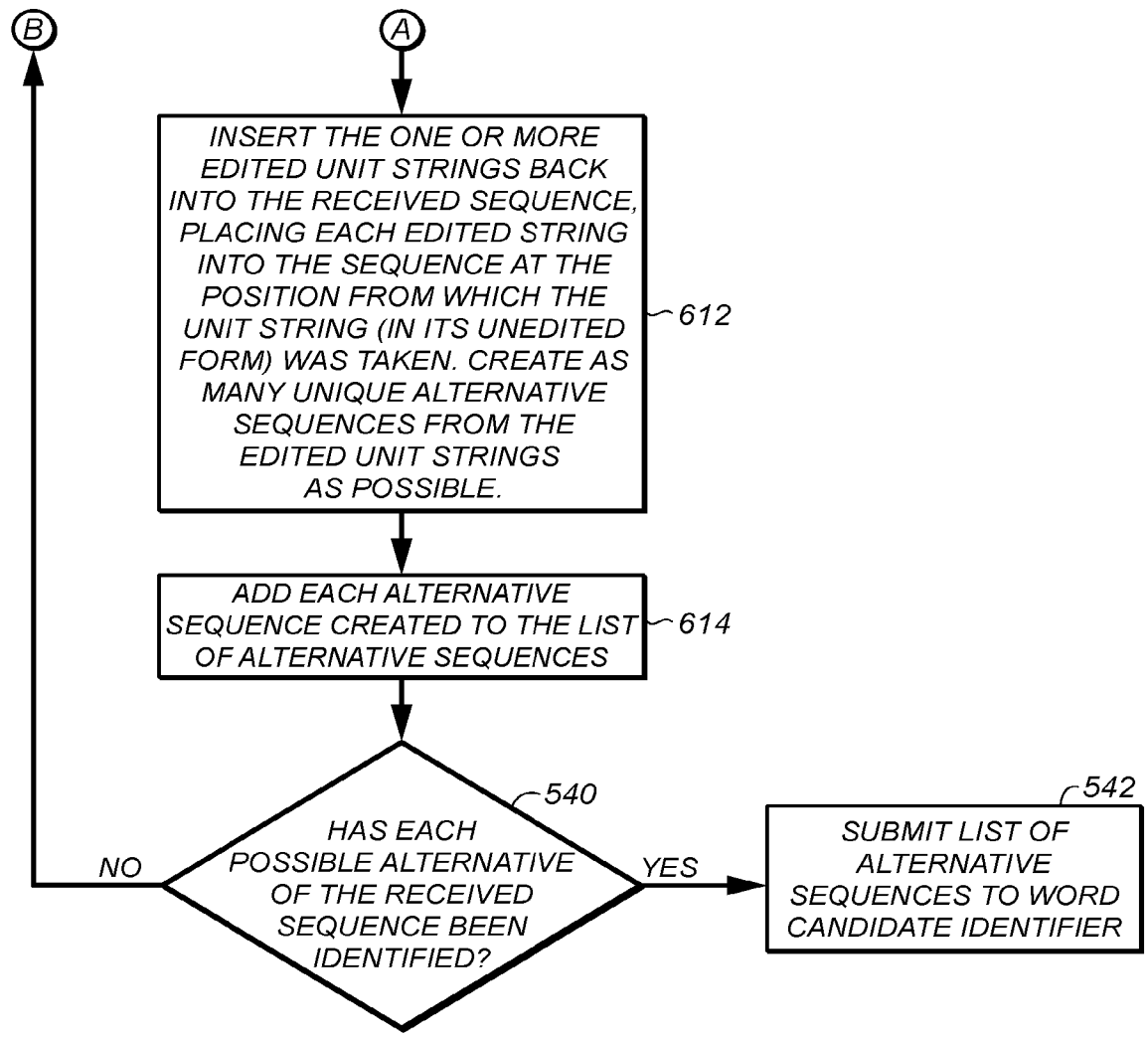

FIG. 43 shows a flowchart of an embodiment of a method 600 for the processor 144 of the electronic device 100 to identify alternative sequences that a user may have intended while executing letter selections on the interface 112 of the electronic device 100. The method 600 accommodates the embodiment of the interface 112 disclosed in FIG. 22 and FIGS. 40-43, in which the button halves of a conventional button have unique letter assignments.

The motivation for the edits that the method 600 enables is the same as those described for the method 520 of FIG. 37. In summary, the edits could be made to correct an inaccurately placed tap or because the method 600 is applied to an interface in which intervening buttons are not tap-selectable, so edits enable the selection letters of intervening buttons that are otherwise not selectable.

In one embodiment, the input for the method 600 is the output of the method 500 described in FIG. 36.

In one step 522 of the method 520, the processor 144 accepts the received sequence 424 from the input gesture interpreter 242. In another step 524, the processor 144 initializes a list of alternative sequences. In a step 526 of the method, the processor adds the received sequence 424 to the list of alternative sequences. In another step 528 of the method, the processor extracts from the received sequence 424 one or more unit strings (B:BH).

In another step 602 of the method, the processor evaluates each extracted unit string B:BH to determine if the variable BH=0 or 1. If in the step 602, the processor determines one or more unit strings have BH=0 then, for those unit strings, in a step 604 the processor edits each particular string B:BH to B−1:0. Furthermore, for those unit strings, in a step 606 the processor edits each particular string B:BH to B:1. If in the step 602, the processor determines one or more unit strings have BH=1 then, for those unit strings, in a step 608 the processor edits each particular string from B:BH to B:0.

Furthermore, for those unit strings, in a step 610 the processor edits each particular string B:BH to B+1:0.

In another step 612, the processor inserts the one or more edited unit strings back into the received sequence 424, replacing one or more of the unit strings extracted in step 528 with its corresponding edited unit string. From the plurality of edited unit strings created in the steps 604, 606, 608, 610, the processor creates as many unique alternative sequences as possible, while complying with restriction that an edited unit string replace only the unit string from which it was edited. In a subsequent step 614, the processor 144 adds each alternative sequence created to the list of alternative sequences.

In a subsequent step 540, the processor determines if each possible alternative of unit string edits (according to the edits of steps 604, 606, 608, 610) of the received sequence have been identified. If not, the method 600 returns to the step 528 to extract one or more different unit strings from the received sequence. If so, in a step 542 the processor 144 submits the list of alternative sequences to a subsequent algorithmic procedure.

In a further embodiment, the method 560 of FIG. 38 receives the output of the method 600 and converts the list of alternative sequences into a list of word candidates.

Figure 46:
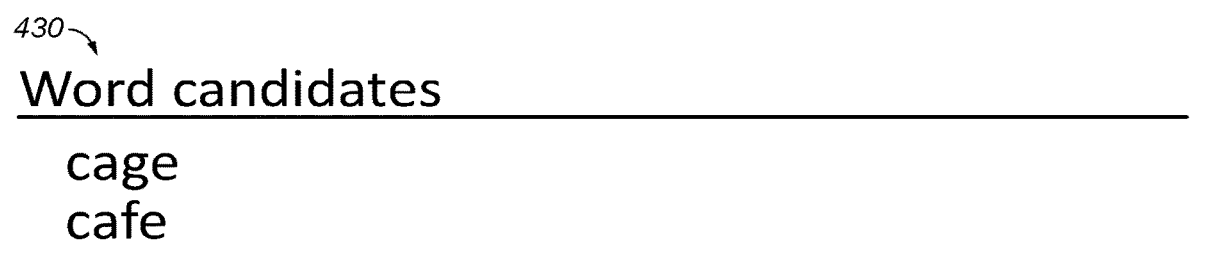

FIGS. 44-46 show an example of the output for one embodiment of the methods 500, 600, 560. In the example of FIGS. 44-46, the method 500 encodes a series of button taps as a sequence of unit strings and yields the received sequence '30-11-50-31' 424. From this received sequence, the method 600 identifies eighty-one alternative sequences 426. From these alternative sequences, the method 560 identifies eighty-one corresponding converted sequences 428. From these converted sequences, the method 560 identifies two word candidates 430, which are the words 'cage' and 'cafe'. In another example, for a different series of button taps on the interface 112, the methods 500, 600, 560 yield a different received sequence, set of alternative sequences, set of converted sequences, and set of word candidates.

Figure 47:
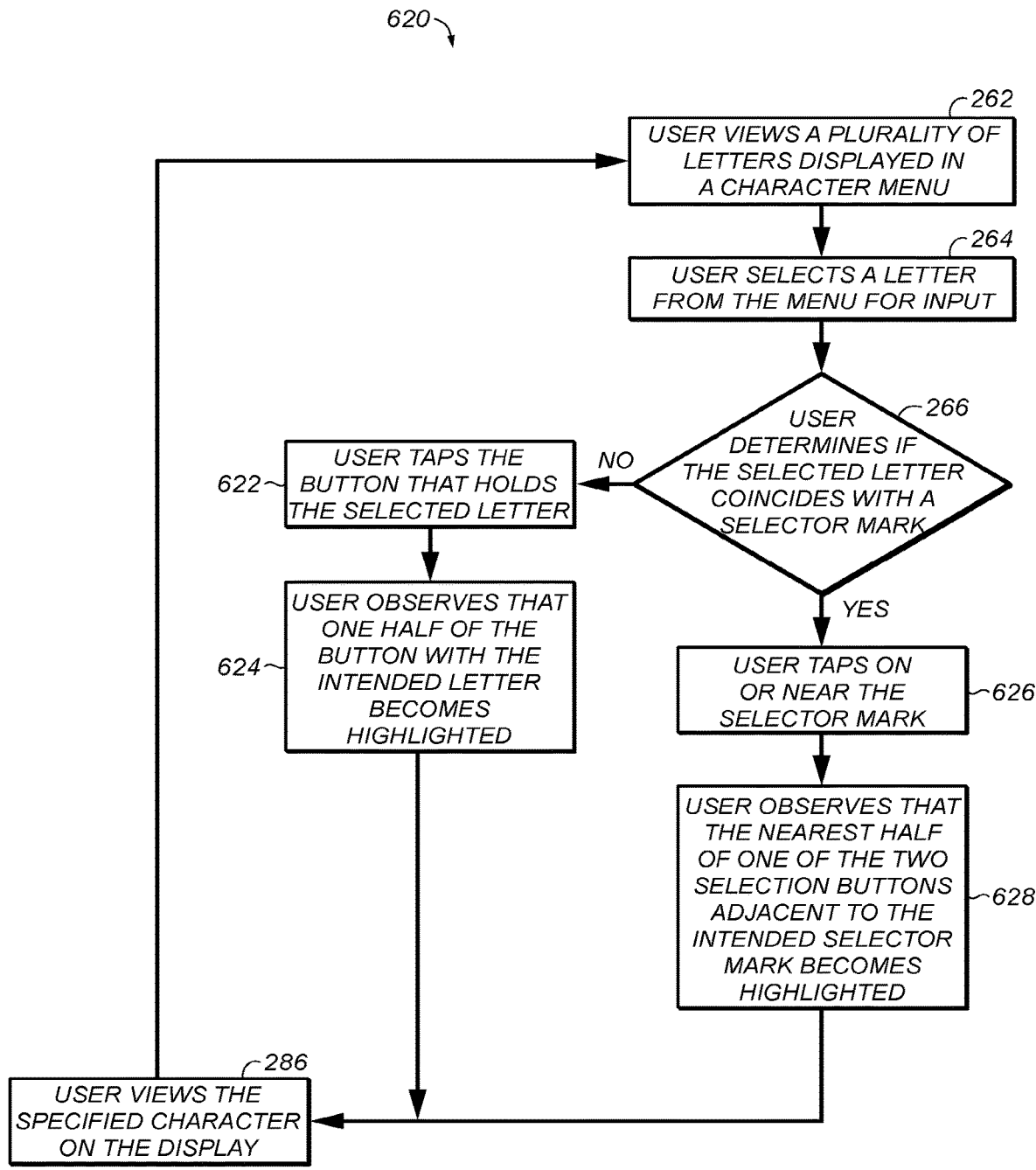
FIG. 47 is a flowchart of an embodiment of a method for a user to specify a character from among a plurality of characters.

FIG. 47 shows a flowchart of an embodiment of a method 620 for a user to specify a character from among a plurality of characters. In step 262 of method 260, a user views the characters of the text input interface 112. In step 264, the user selects a character from the interface 112 for input to the electronic device 100.

In step 266, the user determines if the selected letter coincides with the selection mark 178.

If the user determines the selected letter does not coincide with the selection mark 178, then in a step 622 the user taps the conventional button 120 that holds the selected letter. In a subsequent step 624, the user observes that one half of the button 120 that holds the intended letter becomes highlighted. In a further embodiment, the half of the button that becomes highlighted does not need to be the same half that displays the intended letter in order for the intended letter to eventually become selected.

If the user determines the selected letter coincides with the selection mark 178, then in a step 626 the user taps on or near the selector mark displaying the intended letter. In a subsequent step 628, the user observes that the nearest half of one of the two conventional buttons 120 adjacent to the selector mark that displays the intended letter becomes highlighted.

Then in an optional step 286, the user views the specified character on the display 104. In an alternative embodiment, step 286 is bypassed.

According to another embodiment of the invention, the character specification method 620 described above is used iteratively to specify series of characters from the text input interface 112. In one embodiment, words and sentences are formed on the display 104 by iteratively specifying characters according to the method above, and a spacebar is used in the plurality of function buttons 116 to input spaces between words on the display.

Figure 48:
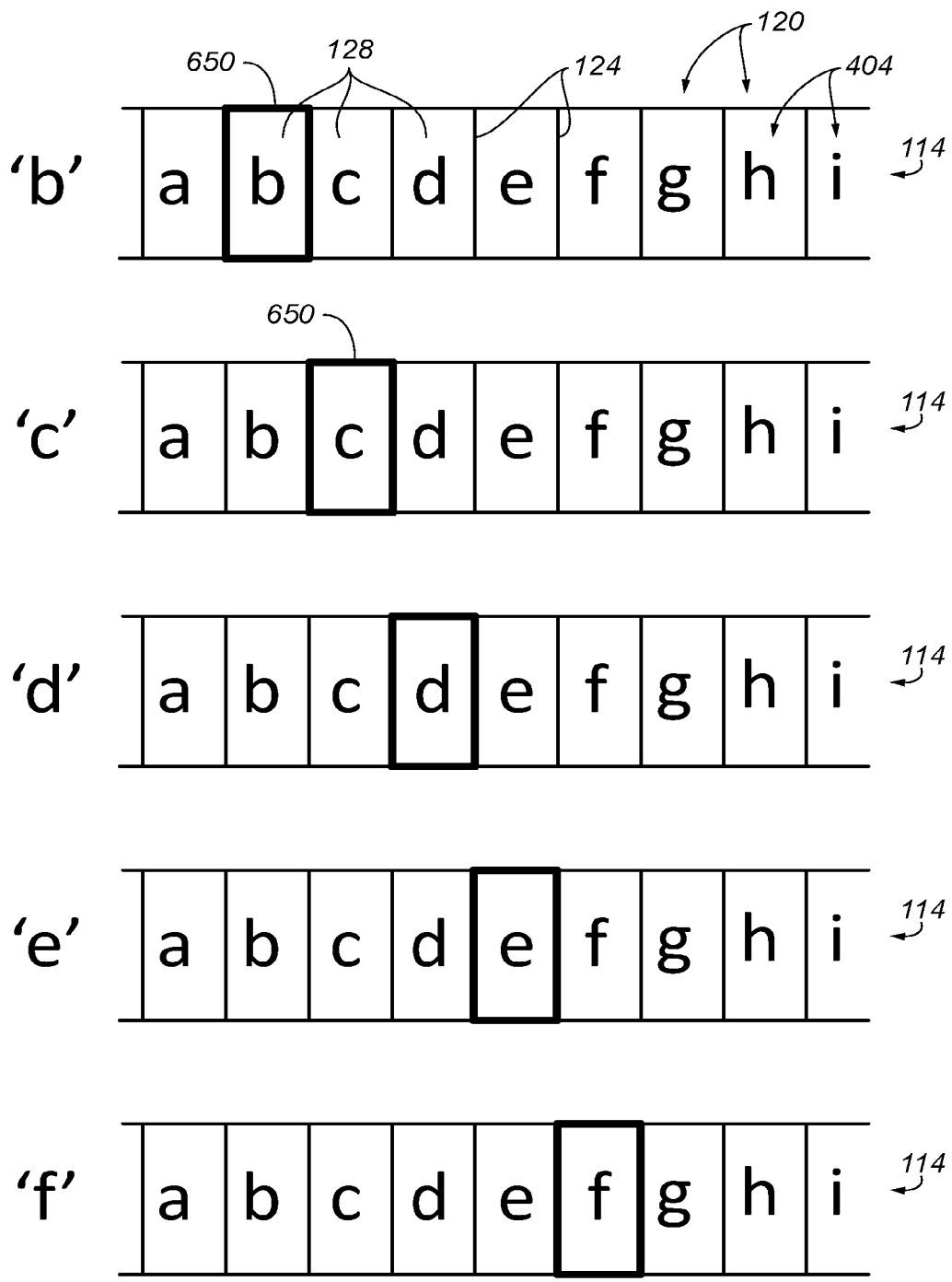
FIGS. 48-50 each show multiple plan views of one kind of letter selection interface.
Figure 49:
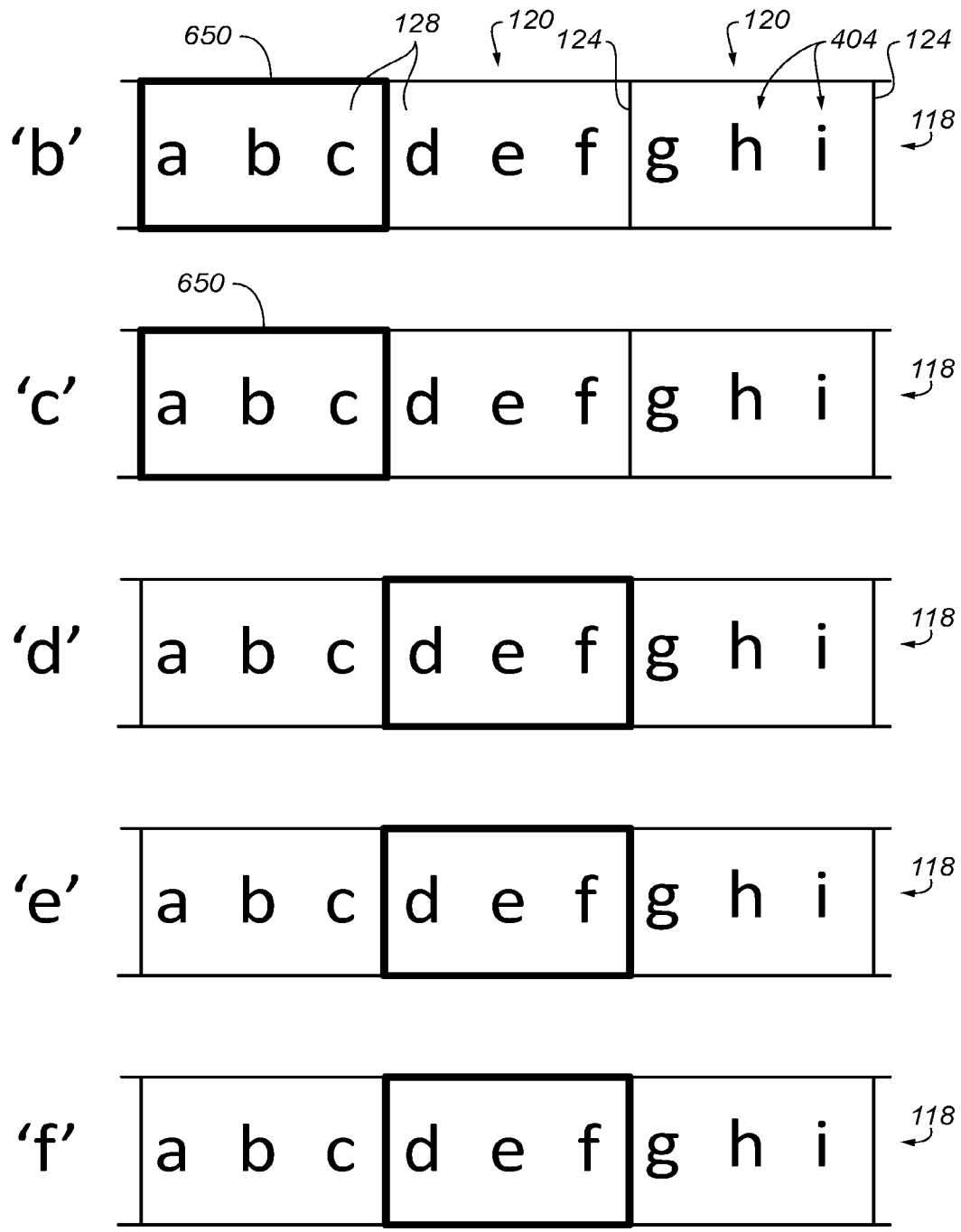
Figure 50:
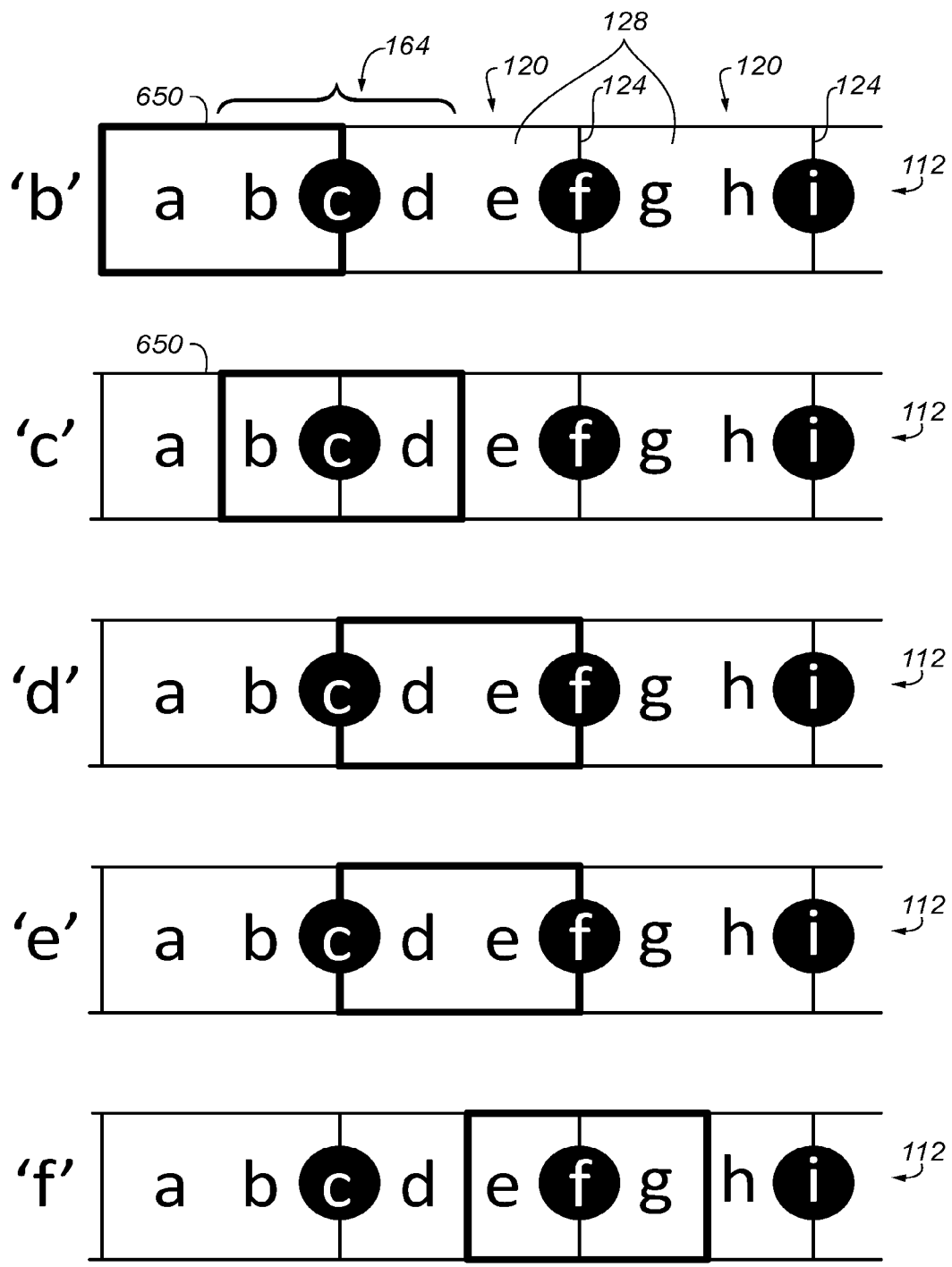

FIGS. 48-50 compare the boundaries of selection buttons for three different kinds of letter selection interfaces. Each Figure shows five views of an embodiment of one kind of interface. Each view highlights in a frame 650 the actual button boundary 124 and selection area 128 for a particular letter. Comparison of the views within a Figure illustrates how, for a particular interface, the conventional buttons 120 correspond with one another and with the intervening buttons 164 of the interface, if any. Comparison of the Figures illustrates differences between the three letter selection interfaces.

FIG. 48 shows an embodiment of a first alterative letter selection interface 114 having conventional selection buttons 120 and one letter assignment 404 per button. FIG. 49 shows an embodiment of a second alternative letter selection interface 118 having conventional selection buttons 120 and three letter assignments 404 per button. FIG. 50 shows an embodiment of the letter interface 112 of FIG. 22 having conventional buttons 120 and intervening buttons 164. The conventional buttons have two letter assignments per button and the intervening buttons have one letter assignment per button.

In some (but not all) respects, the arrangement of the conventional selection buttons 120 is the same for the embodiments of FIGS. 48-50. The ways in which the arrangement of the conventional buttons is the same for the three interfaces includes: the conventional selection buttons lie in a row, each button is adjacent to two other buttons along the row, and adjacent buttons share a common boundary 124.

A commercial embodiment of the interface 114 of FIG. 48 is 'QWERTY', although the particular letter assignments for each button are different. A commercial embodiment of the interface 118 of FIG. 49 is 'T9'. A commercial embodiment of the interface 112 of FIG. 50 is 'Kloa'.

One measure of the quality of a letter selection interface is how well the interface mitigates inaccurate selection taps. In particular, does a small difference in tap location have a proportionally small effect on the results of word prediction? How intensely is word prediction affected by a tap that inadvertently lands on a letter adjacent to the one intended?

Since the word disambiguation algorithm 244 doesn't know a user's intended letter, the algorithm must treat every input as a potentially inaccurate selection. A measure of an interface's ability to accommodate tap inaccuracy is ambiguity. Ambiguity is defined as the maximum number of letters that the input gesture interpreter 242 must consider as potentially intended in order to accommodate a tap inaccuracy of up to one letter from the intended letter.

For the interface of FIG. 48, if a tap intended for a particular letter lands on an adjacent letter, then that adjacent letter becomes selected. So, for the interface of FIG. 48, selection ambiguity is 3 because for any selection, there are three candidate intended letter selections within one letter of a received letter selection—the selected letter and the two letters adjacent to the selected letter. An ambiguity of 3 is manageable for the word disambiguation algorithm 244. But a tradeoff of the interface of FIG. 48 is that button size is small.

For the interface of FIG. 49, if a tap intended for a letter such as 'c' lands on an adjacent letter such as 'd', then three letters become additional candidates for the intended selection. But because buttons are three letters wide, for a given letter selection, only up to one adjacent button is possible per selection. So, for the interface of FIG. 49, selection ambiguity is 6 because for any selection, there are up to six candidate intended letter selections within one letter of a received selection—all the letters of two adjacent buttons. An ambiguity of 6 is difficult for the word disambiguation algorithm 244 to manage because many candidate letters create many possible candidate letter combinations that could be words.

For the interface of FIG. 50, if a tap intended for the letter of an intervening button such as 'c' lands on an adjacent letter such as 'd', then no boundary 124 is crossed. So, in that case, the selection is interpreted as intended.

For the interface of FIG. 50, if a tap intended for the letter of a conventional selection button such as 'e' lands on an adjacent letter such as T, then the boundary 124 may or may not have been crossed depending on the degree of inaccuracy. If the degree of inaccuracy is such that the tap does not extend beyond the midpoint of the letter adjacent to the intended letter (in this example, beyond the midpoint of T), then no boundary is crossed so the selection is interpreted as intended. So, if a user types with sufficient accuracy that taps land no further from the intended letter than the midpoint of the adjacent letter, then the ambiguity of the interface of FIG. 50 is 3.

The ambiguity that exists is the result of letter ambiguity within a tap selection. According to the method 600 of FIG. 43 (in particular the steps 604, 606, 608, 610), for any received tap selection the letter candidates are the two letters of the selected conventional button plus the letter of the intervening button that is closer to the half of the conventional button selected (i.e. B:BH). For the example where the selection is the letter 'e' (i.e. the right half of the button 'd e'), the letter candidates are 'd', 'e' and T. For an example where the selection is the letter 'd' (i.e. the left half of the button 'd e'), the letter candidates are 'c', 'd' and 'e'.

The interface of FIG. 50 is an attractive compromise between low ambiguity (=3) and large selection buttons.

Another way to describe the interface 112 of FIG. 50 is that the letters of intervening buttons visually separate letters that: (1) would otherwise be adjacent, and (2) are not on the same button. For example, letters 'b' and 'd' would be adjacent (if not for the letter 'c') and are not on the same button. 'c' is a letter of an intervening button and visually separates 'b' and 'd'. In another example, letters 'd' and 'e' are adjacent, but are on the same button. No letter of an intervening button separates them. In another example, letters 'c' and 'd' are adjacent, but are not on the same button because letter 'c' is on an intervening button and letter 'd' is on a conventional button. No letter of an intervening button separates them.

Another way to describe the interface 112 of FIG. 50 is that it's an interface where the letters of intervening buttons visually separate letters that are each selectable from just one button, but not the same button.

According to the method 500, 600, 560, the letters of intervening buttons 164 are selectable—via correction—by a tap on either of the two conventional buttons adjacent to the intended letter of the intervening button. Because the letters of the intervening buttons are selectable from more than one button, they are not themselves separated from one another.

According to the method 500, 600, 560, the letters of conventional buttons 120 are selectable via a tap on the button where the intended letter is displayed, or via a correction from a tap on the other letter of the same button. So the letters of conventional buttons are selectable from just one button.

In some cases, letters of conventional buttons are selectable from different buttons. In other cases, the letters of conventional buttons are selectable from the same button. As FIG. 50 shows, letters of intervening buttons visually separate letters of conventional buttons for the cases where the adjacent letters of the conventional buttons are not selectable from the same button. For example, the letters 'b' and 'd' are each selectable from just one button and are also not on the same button. Letter 'c' visually separates the letters 'b' and 'd'. In another example, the letters 'd' and 'e' are each selectable from just one button but are selectable from the same button. No letter of an intervening button visually separates 'd' and 'e'.

Note that non-adjacent letters of conventional buttons still satisfy the condition of being selectable from just one button, but not the same button. In those cases, the letters of the conventional buttons are separated by a letter of an intervening button, plus other letters.

Yet another way to describe the interface of FIG. 50 is that the interface 112 eliminates the condition where visually adjacent letters have mutually exclusive selection areas. The selection area 122 is simply the selectable region within the button 120, 164. The interfaces of FIGS. 48 and 49 disclose examples of visually adjacent letters with mutually exclusive selection areas. For example, in FIG. 49 the letters 'c' and 'd' are visually adjacent and have mutually exclusive selection areas 128. However, for the interface of FIG. 50, visually adjacent letters are assigned to buttons that either partially or totally overlap. For example, in FIG. 50 the letters 'c' and 'd' are visually adjacent and assigned to buttons with selection areas 128 that overlap.

In one embodiment of the interface of FIG. 50, each button 120, 164 overlaps the buttons that are its adjacent neighbors on each side. In a further embodiment, each conventional button 120 overlaps half of two intervening buttons 164. In yet a further embodiment, each intervening button 164 overlaps half of two conventional buttons 120.

In still a further embodiment, a conventional button 120 having two assigned letters 404 is view as two conventional buttons, each button having one assigned letter, and each button overlapping the other by 100%. FIG. 51 discloses a method for interpreting time- and distance-dependent input selection gestures executed on the display screen 104 of the device 100.

Input selection gestures simultaneously incorporate information about position, duration and distance of displacement. A two-dimensional plot 456 disclosed in FIG. 51 graphically represents the duration and displacement information.

A selection gesture becomes initiated via a tap at some position on the display screen 104. The position of the tap on the screen corresponds with one or more buttons of the interface 112. For the embodiment of the interface 112 in FIG. 40, the position corresponds with two overlapping buttons of the interface.

The tap has duration of some length typically measured in units of milliseconds. The tap also incorporates a lateral displacement (between zero and some finite number) along the touch sensitive screen during the course of a button tap. The laterally displaced tap (also called a swipe) has a displacement (or distance) of some length typically measured in units of pixels, millimeters, or thousandths of an inch.

The plot 456 of FIG. 51 represents the input selection gesture graphically. Any point on the plot represents values for the variables duration and swipe distance at a given moment. Each curve 220 represents a possible progression of the two variables over the course of a selection gesture.

In the plot, button tap duration is plotted on the x-axis 208. Swipe distance is plotted on the y-axis 212. In one embodiment, the swipe distance can have both positive and negative values, where the polarity of the value represents the direction of the swipe. For example a positive swipe could be a swipe to the right along the button row and a negative swipe a swipe to the left. In the embodiment of FIG. 5, the input gesture interpreter 242 ignores the swipe direction and records purely the magnitude of the swipe distance.

The onset of an input gesture occurs at the plot's origin 216. The onset marks the point in time and distance where the onset of an input gesture occurs. The release of a button tap—and thereby the end of the selection gesture—is represented by a terminus 218 at the end of each curve. The path that the curve 220 follows from the origin to the terminus reflects the duration and swipe distance of the input selection gesture over the course of the gesture.

The response of an input gesture is converted to a binary value by comparing the response with threshold values for duration and swipe distance. The thresholds enable the analog values of each measured response to be recast as a binary output, i.e., a high or low value. A response that exceeds a threshold value is a high value; one that falls below the threshold value is a low value.

In the plot 456, an elapsed time threshold 206 splits the duration axis 208 into two segments, in this example at 200 msec. In the embodiment of FIG. 51, the duration threshold determines whether a letter (designated the candidate intended letter and determined as a result of the tap's location) becomes classified as editable or uneditable by the word disambiguation algorithm 244. In one embodiment, a tap <200 msec is classified as an editable letter selection and a tap >200 msec is classified as an uneditable letter selection.

A swipe distance threshold 208 splits the swipe distance axis 212 into two segments, in this example at 25 pixels. The swipe distance threshold determines whether a positional displacement becomes classified as a tap or a swipe. In one embodiment, the swipe distance threshold also determines whether the input selection gesture becomes classified as a conventional or an interleaved button selection. In a further embodiment, the swipe distance threshold determines whether the input selection gesture becomes classified as editable or uneditable by the word disambiguation algorithm 244. In one embodiment, a swipe >25 pixels becomes classified as an uneditable letter selection.

The distinction between taps and swipes, and resulting classification of the input gesture as either a conventional or interleaved button selection, enables the input gesture interpreter 242 to unambiguously determine the user's intended letter in regions of the interface 112 where the conventional and interleaved buttons overlap. In the embodiment of FIG. 40, the conventional and interleaved buttons overlap throughout the interface. Applying the threshold values 206, 208 to the plot 456 divides the plot into three regions 450, 452, 454. Each region represents a unique combination of the two binary output values from the input gestures. In other words, for the gesture responses 'swipe distance' and 'button press duration' (the y- and x-axes, respectively), each region represents one possible combination of high and low values ('swipe distane':'duration') as follows—low:low, low:high, and swipe.

During the course of an input selection gesture, the classification at any moment reflects the current values for duration and swipe distance. Because the path that a curve 220 takes through the plot may intersect more than one region of the plot, the classification may evolve during the course of the selection. The terminus 218 marks the moment that the user lifts their finger from the touch sensitive display screen 104. The particular region where the terminus lies determines the final classification of the selection gesture. For the embodiment of FIG. 51, one possible set of classifications for an input selection gesture is 'editable letter of a conventional button' 450, 'uneditable letter of a conventional button' 452, and 'uneditable letter of an intervening button' 454. For the embodiment of FIG. 51, another possible set of classifications is 'unlocked conventional button selection' 450, 'locked conventional button selection' 452, and 'intervening button selection' 454. Yet another possible set of classifications is 'conventional button selection (L=0)' 450, 'conventional button selection (L=1)' 452, and 'intervening button selection (L=1)' 454.

The selection gestures are designed specifically to satisfy a couple of conditions: (1) every possible selection gesture falls within one of the three possible classifications, and (2) classification of a gesture as either an intervening letter selection or an uneditable conventional button letter selection can be generalized to an editable conventional button letter selection by disregarding one or both thresholds.

The two conditions satisfy the requirement that every input gesture selects a letter no matter where on the interface the gesture occurs. In particular, in an embodiment of the interface where there is an area with only one button (i.e., non-overlapping), the swipe threshold can be disregarded so that a gesture with a swipe of any length becomes interpreted as a button tap.

In a further embodiment, the terms 'unlocked' and 'editable' mean the same in the context of letter selection. Furthermore, the terms 'locked' and 'uneditable' mean the same in the context of letter selection. In still a further embodiment, the variable L in association with a letter selection indicates whether a letter selection is locked or not. In one embodiment, when L=0 a letter selection is unlocked and when L=1 a letter selection is locked.

Figure 52:
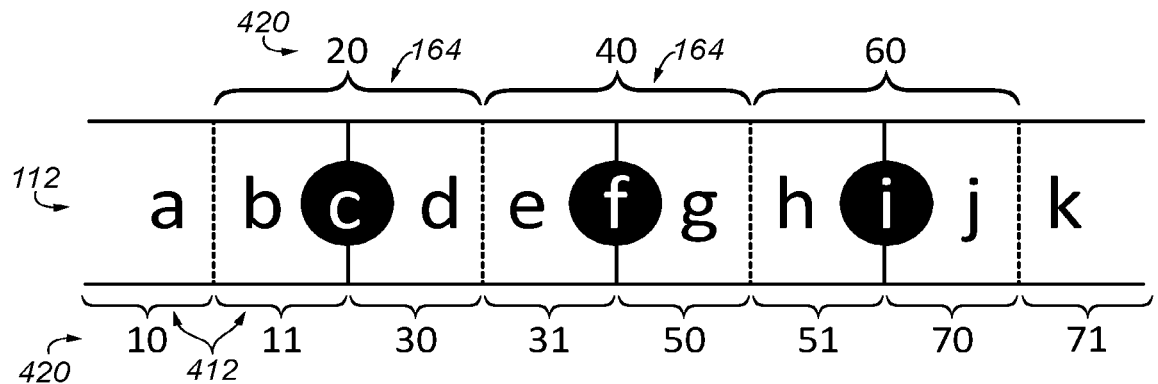
FIG. 52 is a plan view of one embodiment of the interleaved character selection interface, a format for representing button actuations on the interface, and examples of represented button actuations.

FIG. 52 shows a plan view of the embodiment of FIG. 40. Each interleaved button 164 and each button-half 412 is identified by its unit string 420. FIG. 52 further discloses a 3-position unit string 460 that includes a locked letter indicator 464.

The 3-position unit string 460 is a variable that simultaneously represents a particular button 120, 164, button-half 412 and locked letter indicator 464. Generically, the 3-position unit string 460 has the format 'button:button-half:lock', alternately represented 'B:BH:L'. The variable B in the first position of the unit string holds a value for the button number 400. The variable BH in the second position of the unit string holds a value for the button-half number 416. The variable L in the third position holds a value for the locked letter indicator 464.

In one example of the embodiment, according to the letter assignments of the embodiment of FIG. 52, the unit string '510' represents an editable selection of the letter 'h'. In another example from the same embodiment, the unit string '301' represents an uneditable selection of the letter 'd'. In another example from the same embodiment, the unit string '601' represents an uneditable selection of the letter T.

In its three values, the 3-position unit string 460 captures the position that a user initiates an input selection gesture on the display screen according to the interface of FIG. 40, plus the duration and swipe distance incorporated in that selection gesture according to the method graphically represented in FIG. 51.

Figure 53A:
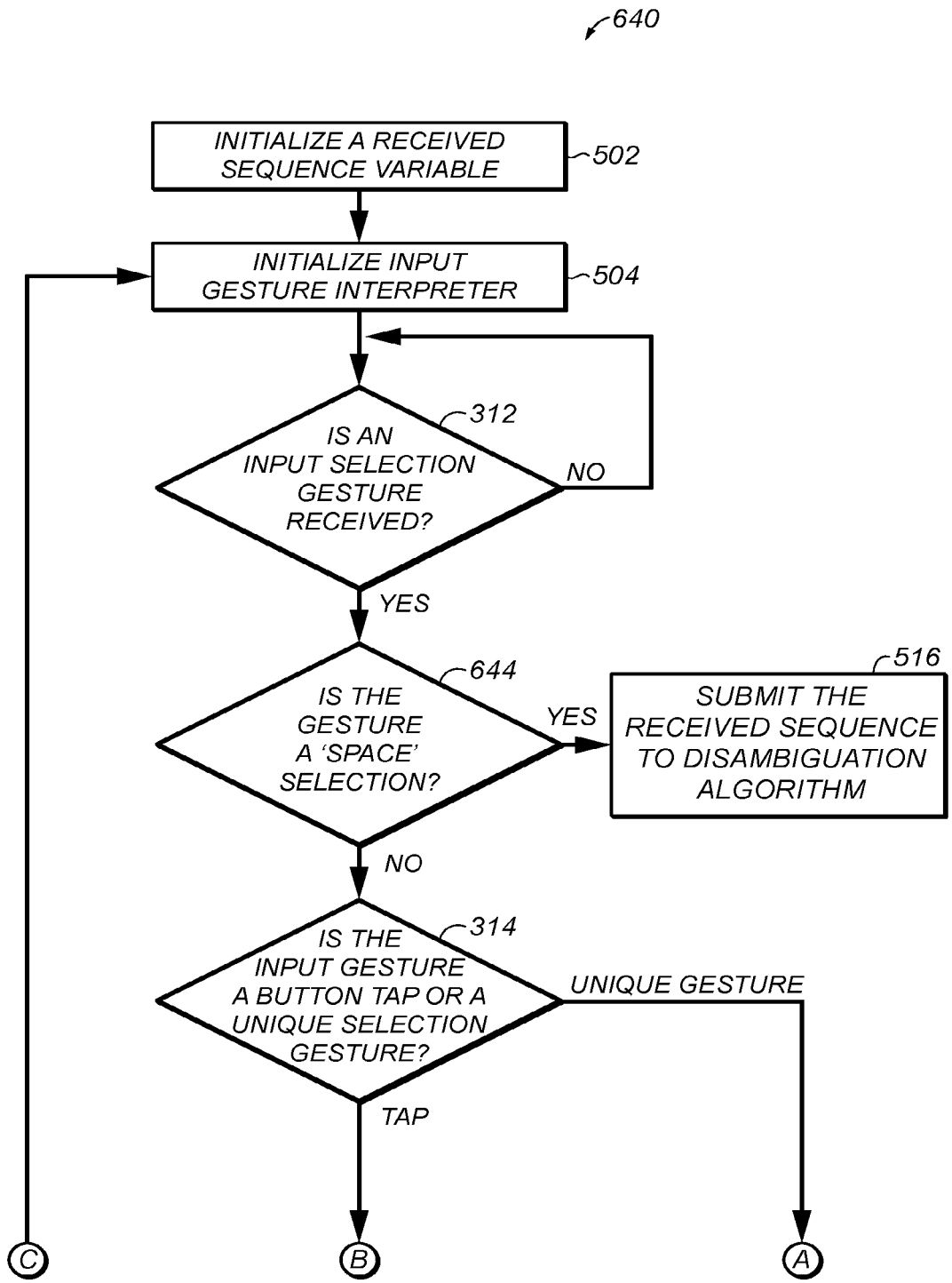
FIGS. 53A and B and 54A and B are flowcharts of an embodiment of a method for a processor of the electronic device to interpret button actuations.
Figure 53B:
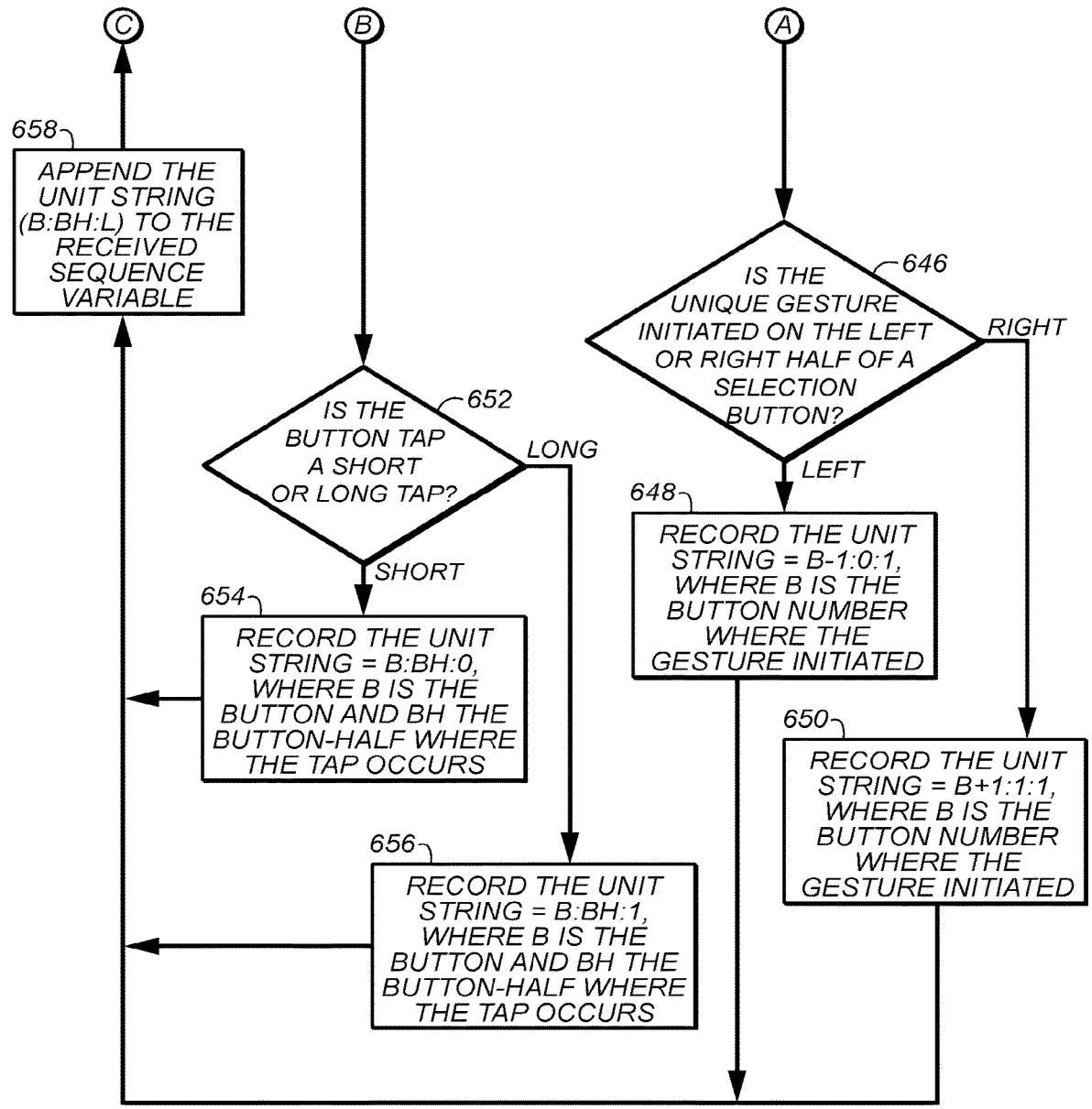
Figure 54A:
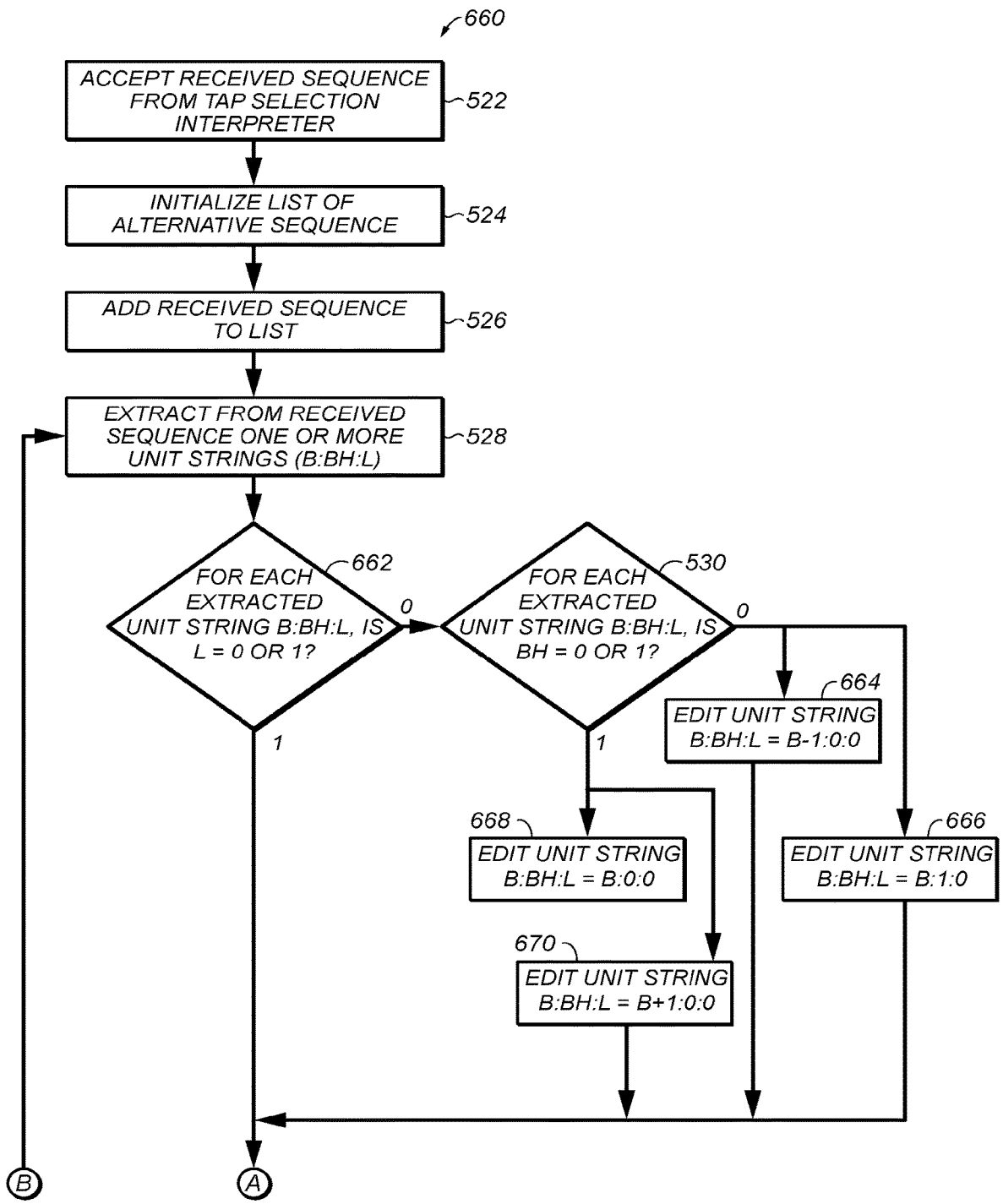
Figure 54B:
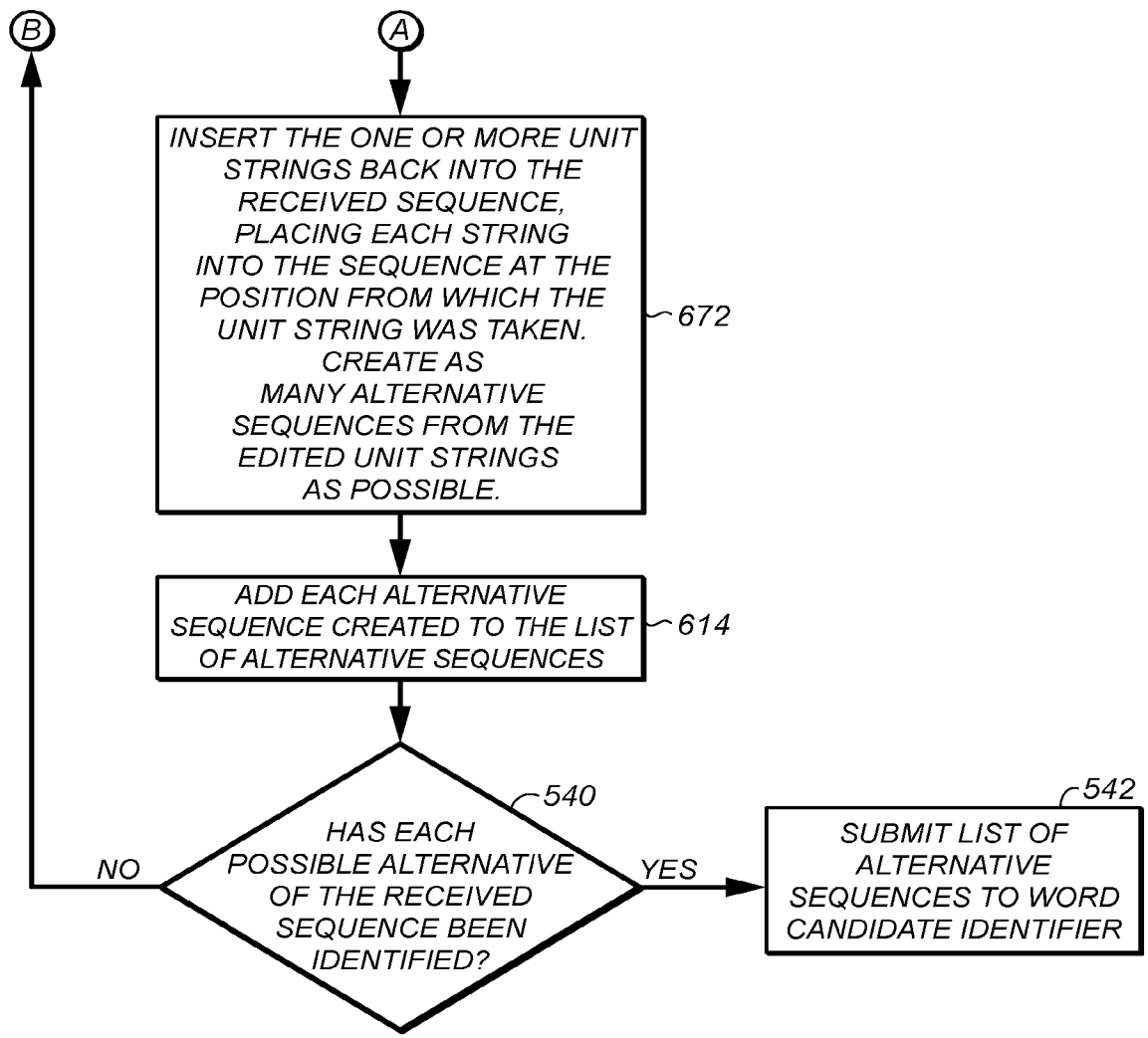

FIGS. 53, 54 and 38 together disclose a series of three methods for the processor 144 of the electronic device 100 to determine an intended word from input selection gestures on the interface 112 using the unit string notation disclosed in FIGS. 40 and 52.

FIG. 53 shows a flowchart of an embodiment of a method 640 for the processor 144 of the electronic device 100 to encode a series of input selection gestures as a sequence of 3-position unit strings. FIG. 54 shows a flowchart of an embodiment of a method 660 for the processor 144 of the electronic device 100 to identify alternative sequences that a user may have intended while executing letter selections on the interface 112 of the electronic device 100. FIG. 38 shows a flowchart of an embodiment of a method 560 for the processor 144 of the electronic device 100 to identify word candidates from the list of alternative sequences.

FIG. 53 shows a flowchart of an embodiment of a method 640 for the processor 144 of the electronic device 100 to encode a series of input selection gestures as a sequence of 3-position unit strings in response to input selection gestures executed by a user on the interface 112.

In a first step 502 of the method 640, the processor 144 initializes the received sequence variable 424. In another step 504, the processor 144 initializes the input gesture interpreter 242. In another step 312 of the method, the input gesture interpreter 242 monitors the text input interface 112 for an input selection gesture. Once a first selection gesture occurs, in step 644, the input gesture interpreter determines if the input gesture is a spacebar selection.

If in the step 644 the input gesture interpreter 242 determines the selection gesture is a spacebar selection, in the step 516 the interpreter submits the received sequence to a subsequent algorithmic procedure.

If in the step 644 the input gesture interpreter 242 determines the selection gesture is not a spacebar selection, in the step 314 the input gesture interpreter determines if the input selection gesture is a button tap or a unique selection gesture.

If in the step 314 the input gesture interpreter 242 determines the selection gesture is a button tap, in a subsequent step 652 the input gesture interpreter determines which conventional button 120 and which button half 412 receives the button tap, and if the button tap is a short or long tap. If in the step 652 the input gesture interpreter 242 determines the selection gesture is a short tap, in a subsequent step 654 the input gesture interpreter records the button number (B) 400 of the tapped button in the first position of the 3-position unit string 460, the button-half number (BH) 416 of the tapped button in the second position of the unit string, and the value 0 in the third position of the unit string indicating the selection is editable.

If in the step 652 the input gesture interpreter 242 determines the selection gesture is a long tap, in a subsequent step 656 the input gesture interpreter records the button number (B) 400 of the tapped button in the first position of the 3-position unit string 460, the button-half number (BH) 416 of the tapped button in the second position of the unit string, and the value 1 in the third position of the unit string indicating the selection is uneditable.

If in the step 314 the input gesture interpreter 242 determines the selection gesture is a unique selection gesture, in a subsequent step 646 the input gesture interpreter determines in which conventional button 120 and in which button half 412 the unique selection gesture is initiated.

If in the step 646 the input gesture interpreter 242 determines the unique selection gesture is initiated in the left half of a conventional button, in a subsequent step 648 the input gesture interpreter records B−1 in the first position of the 3-position unit string 460—where B is the button number 400 where the unique selection gesture is initiated, the value 0 in the second position of the unit string indicating a left-half selection, and the value 1 in the third position of the unit string indicating the selection is uneditable.

If in the step 646 the input gesture interpreter 242 determines the unique selection gesture is initiated in the right half of a conventional button, in a subsequent step 650 the input gesture interpreter records B+1 in the first position of the 3-position unit string 460—where B is the button number 400 where the unique selection gesture is initiated, the value 1 in the second position of the unit string indicating a right-half selection, and the value 1 in the third position of the unit string indicating the selection is uneditable.

In a step 658 subsequent to steps 648, 650, 652 and 654, the input gesture interpreter appends the unit string (B:BH:L) 460 to the received sequence variable 424.

According to a further embodiment of the invention, the processor 144 executes the method 640 iteratively, interpreting one character selection with each iteration.

Although the method 640 of FIG. 53 is one embodiment of a method for encoding a series of input selection gestures, the scope of the method is not limited by this particular embodiment, but rather by the scope of the claims.

FIG. 54 shows a flowchart of an embodiment of a method 660 for the processor 144 of the electronic device 100 to identify alternative sequences that a user may have intended while executing letter selections on the interface 112 of the electronic device 100. An alternative sequence is a sequence that has the same number of unit strings as the received sequence 424, but where one or more unit strings of the sequence has a button value (B) that is one less or one greater than the received button number.

In some applications of the method 660, the motivation for the edit to the button value (B) is to correct an input intended as an intervening button tap but, due to an inaccurate tap, lands on the conventional button next to the intervening button. In other applications of the method 660, the motivation for the edit is to enable selection of letters on intervening buttons that are not tap-selectable at all. In that application, a tap selection that lands on an intervening button becomes interpreted as a tap on the conventional button that visually underlies the intervening button at the location of the tap. (See the steps 314, 318 and 320 of the method 300 in FIG. 14 for an example of a method that accommodates an interface in which some buttons have letters that are not tap-selectable.) The edit enables the intended letter to become selected via a letter edit, as follows.

In one step 522 of the method 660, the processor 144 accepts the received sequence 424 from the input gesture interpreter 242. In another step 524, the processor 144 initializes a list of alternative sequences. In a step 526 of the method, the processor adds the received sequence 424 to the list of alternative sequences. In another step 528 of the method, the processor extracts from the received sequence 424 one or more unit strings (B:BH). In another step 662 of the method, the processor evaluates each extracted unit string to determine if the variable L=0 or 1.

If in the step 662, the processor determines one or more unit strings have L=0 then, for those unit strings, in another step 530, the processor evaluates each extracted unit string to determine if the variable BH=0 or 1. If in the step 530, the processor determines one or more unit strings have BH=0 then, for those unit strings, in parallel steps 664, 666 the processor edits each string B:BH:L into subsequent unit strings B−1:0:0 and B:1:0. If in the step 530, the processor determines one or more unit strings have BH=1 then, for those unit strings, in parallel steps 668, 670 the processor edits each string B:BH:L into subsequent unit strings B:0:0 and B+1:0:0.

In another step 672, the processor inserts the one or more edited unit strings back into the received sequence 424, placing each edited string into the sequence at the position from which the unit string—in its unedited form—was taken. In doing so, the processor creates as many alternative sequences as possible while maintaining the restriction of the previous sentence. In a subsequent step 614, the processor 144 adds each alternative sequence created to the list of alternative sequences.

In the subsequent step 540, the processor determines if each possible alternative of unit string edits (according to the edits in Steps 664, 666, 668 and 670) of the received sequence have been identified. If not, the method 660 returns to the step 528 to extract one or more different unit strings from the received sequence. If so, in the step 542 the processor 144 submits the list of alternative sequences to a subsequent algorithmic procedure.

In a further embodiment, the methods 640 and 660 are used together with the method 560 of FIG. 38 by the processor 144 of the electronic device 100 to identify natural language word candidates from input selection gestures executed by a user on the interface 112 of the device.

FIGS. 55-58 each show an example of the output for one embodiment of the methods 640, 660, 560.

In the example of FIG. 55, the method 640 encodes a series of button taps as a sequence of 3-position unit strings and yields the received sequence '500-110-300-310' 424. From this received sequence, the method 660 identifies eighty-one alternative sequences 426. From these alternative sequences, the method 560 identifies eighty-one corresponding converted sequences 428. From these converted sequences, the method 560 identifies two word candidates 430, which are the words 'fade' and 'face'.

In the example of FIG. 56, the method 640 encodes a series of button taps as a sequence of 3-position unit strings and yields the received sequence '500-110-201-310' 424. From this received sequence, the method 660 identifies twenty-seven alternative sequences 426. From these alternative sequences, the method 560 identifies twenty-seven corresponding converted sequences 428 and one word candidate 430, which is the word 'face'.

In the example of FIG. 57, the method 640 encodes a series of button taps as a sequence of 3-position unit strings and yields the received sequence '110-310-310' 424. From this received sequence, the method 660 identifies twenty-seven alternative sequences 426. From these alternative sequences, the method 560 identifies twenty-seven corresponding converted sequences 428 and three word candidates 430, which are the words 'bee', 'bed' and 'add'.

In the example of FIG. 58, the method 640 encodes a series of button taps as a sequence of 3-position unit strings and yields the received sequence '110-310-311' 424. From this received sequence, the method 660 identifies nine alternative sequences 426. From these alternative sequences, the method 560 identifies nine corresponding converted sequences 428 and one word candidate 430, which is the word 'bee'.

Figure 59:
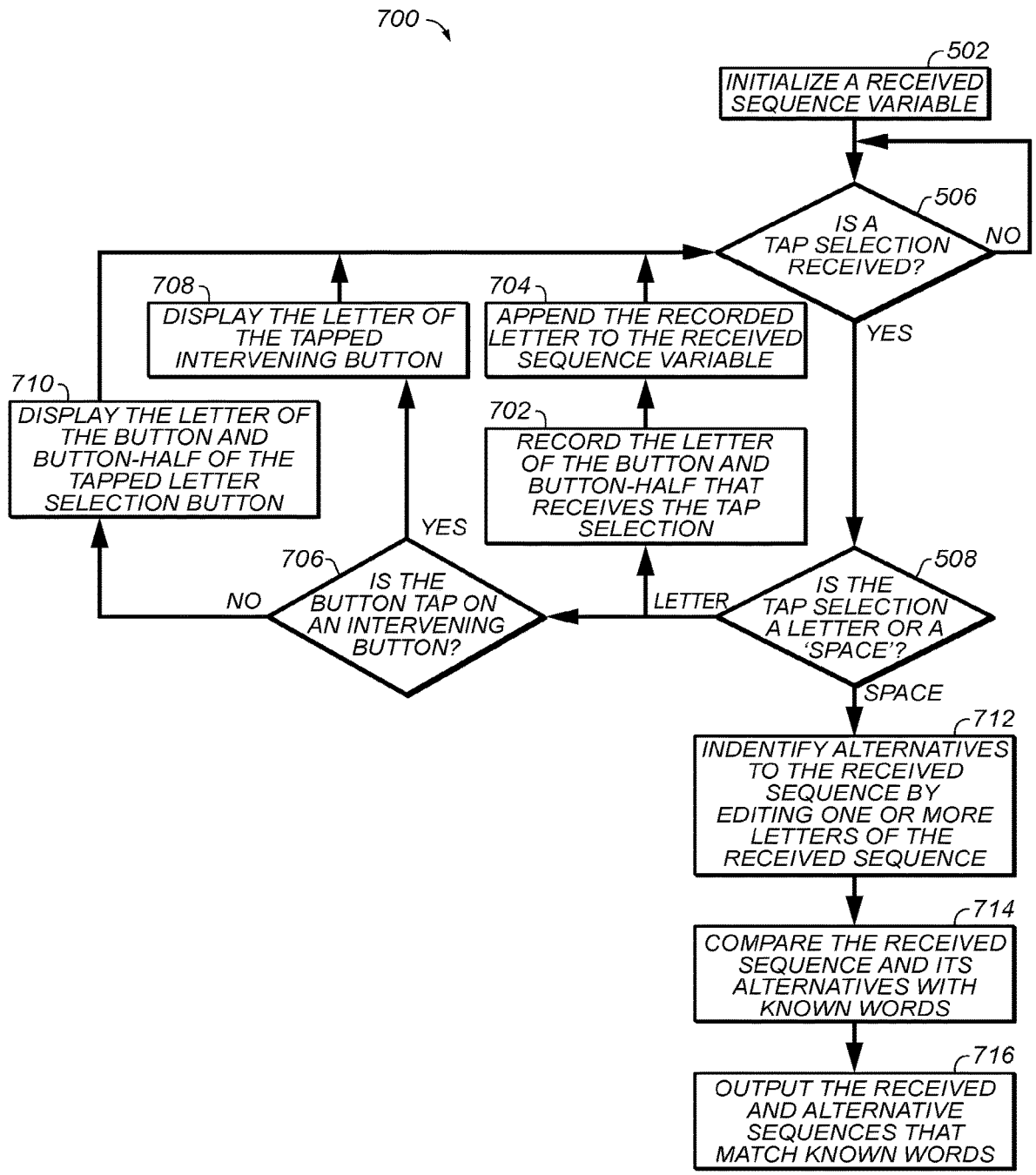
FIG. 59 is a flowchart of an embodiment of a method for a processor of the electronic device to interpret button actuations.

FIG. 59 discloses a flowchart of an embodiment of a method 700 for the processor 144 of the electronic device 100 to determine word candidates from tap selections on the interface 112.

In a first step 502 of the method 640, the processor 144 initializes the received sequence variable 424. In another step 506 of the method, the input gesture interpreter 242 monitors the text input interface 112 for a tap selection. Once a first tap selection occurs, in step 508, the input gesture interpreter determines if the tap is a letter or a spacebar selection.

If in the step 508 the input gesture interpreter 242 determines the selection gesture is a letter selection, in a step 702 the processor records the letter that corresponds to the button number 400 and button-half number 416 that receives the tap selection.

In one embodiment, the text input interface 112 includes letters assigned to both conventional letter selection buttons 120 (also called conventional buttons; also called letter selection buttons) and overlapping intervening buttons 162. In a further embodiment, in the step 702, the input gesture interpreter records the letter of the selected conventional button even for taps that land on the overlapping intervening button. Therefore, with regard to recording letter selections, in one embodiment the letters of intervening buttons are unrecordable.

Furthermore, in a step 704 the processor appends the recorded letter to the received sequence variable 424.

Furthermore, in a step 706 the input gesture interpreter determines if tap selection occurs on an intervening button 162 or a conventional letter selection button 120.

If in the step 706 the input gesture interpreter 242 determines the tap selection occurs on an intervening button, in a subsequent step 708 the device display 104 displays the letter assigned to the selected intervening button 162. If in the step 706 the input gesture interpreter 242 determines the tap selection occurs on a conventional letter selection button 120, in a subsequent step 710 the device display 104 displays the letter assigned to the button and button-half of the selected conventional letter selection button. Note that in one embodiment, for purposes of recording, the input gesture interpreter records letter selections according to the conventional letter selection button 120 that receives the tap (ignoring the intervening button 162) but, for purposes of display, the processor transmits to the display letter selections according to the intervening button that receives the tap, if an intervening button receives the tap, and according to the conventional letter selection button that receives the tap otherwise. In yet a further embodiment, the overlap between the intervening button 164 and the conventional button 120 is less than 50% of the conventional button's area, as shown in FIG. 7.

If in the step 508 the input gesture interpreter 242 determines the input gesture is a spacebar selection, in a step 712 the processor identifies alternatives to the received sequence by editing one or more letters of the received sequence. In one embodiment, the processor edits one or more letters to a different assigned letter of the conventional letter selection button. In a further embodiment, the processor edits one or more letters to the adjacent letter of an intervening button.

In a subsequent step 714, the processor compares the received sequence and the identified alternative sequences with a dictionary of known words. In a subsequent step 716, the processor outputs the known words that match the received sequence or one of the identified alternative sequences. In one embodiment, in a further step the processor replaces the displayed letters with one of the outputted known words.

According to a further embodiment of the invention, the processor 144 executes the method 700 iteratively, interpreting one word with each iteration. Although the method 700 of FIG. 59 is one embodiment of a method for identifying word candidates from input selection gestures, the scope of the method is not limited by this particular embodiment, but rather by the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments. This application also claims the benefit of U.S. Provisional Patent Application No. 62/508,910, filed May 19, 2017, and is incorporated herein by reference in its entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
   at least one computer processor; and
   at least one non-transitory computer memory coupled to the at least one computer processor, the at least one non-transitory computer memory having computer-executable instructions stored thereon that, when executed by the at least one computer processor, cause the at least one computer processor to:
   generate an interactive graphical user interface including:
      at least three selection buttons arranged contiguously in a first row on the interactive graphical user interface, each selection button composed of two halves with each halve of the at least three selection buttons assigned a letter;
      at least three interleaved buttons collinear with the first row of selection buttons, each interleaved button overlapping one of the halves of each of two selection buttons of the row and assigned a different letter than the halves of each of the two selection buttons of the row that are overlapped by the interleaved button; and
      a letter output field on the graphical user interface.

2. The apparatus of claim 1 wherein the at least one computer processor further records, for each selection button actuation, the identities of the actuated selection button and selection button halve.

3. The apparatus of claim 2 wherein the at least one computer processor further displays in the letter output field, for each selection button actuation, a letter from among the letters assigned to:
   the identified selection button; and
   the interleaved button that overlaps the identified selection button halve.

4. The apparatus of claim 1 wherein the interactive graphical user interface further includes:
   an additional at least three selection buttons arranged contiguously in a second row on the interface; and
   an additional at least three interleaved buttons collinear with the second row of the at least three selection buttons, wherein the first row and the second row lie parallel to one another on the graphical user interface.

5. A computer processor-implemented method comprising recording, by at least one computer processor,
   a first data value in response to actuation of a selection button; and
   a second data value in response to the selection button actuation, wherein:
      the first data value uniquely identifies the actuated selection button from among at least three selection buttons arranged contiguously in a row on a graphical user interface;
      the second data value uniquely identifies a selection button halve from among two halves that compose the selection button identified by the first data value;
      each halve of the at least three selection buttons of the row is assigned a letter; and
      each interleaved button of at least three interleaved buttons that collinearly overlap the at least three selection buttons of the row on the graphical user interface is assigned a letter.

6. The method of claim 5 further comprising outputting for display, by the at least one computer processor, a letter assigned to the selection button halve identified by the recorded first and second data values.

7. The method of claim 5 further comprising:
   editing, by the at least one computer processor, the recorded second data value to a value that uniquely identifies the other halve of the two halves of the selection button identified by the recorded first data value; and
   outputting for display, by the at least one computer processor, a letter assigned to the selection button halve identified by the recorded first data value and the edited second data value.

8. The method of claim 5 further comprising:
   editing, by the at least one computer processor, the recorded first data value to a value that uniquely identifies an interleaved button of the at least three interleaved buttons that overlaps the selection button halve identified by the recorded first and second data values; and
   outputting for display, by the at least one computer processor, a letter assigned to the interleaved button identified by the edited first data value.

9. A non-transitory computer storage medium having computer-executable instructions stored thereon that, when executed by at least one processor, cause the at least one processor to:
   generate an interactive graphical user interface including:
      at least three selection buttons arranged contiguously in a first row on the interactive graphical user interface, each selection button composed of two halves with each halve of the at least three selection buttons assigned a letter;
      at least three interleaved buttons collinear with the first row of selection buttons, each interleaved button overlapping one of the halves of each of two selection buttons of the row and assigned a different letter than the halves of each of the two selection buttons of the row that are overlapped by the interleaved button; and a letter output field on the graphical user interface.

10. The non-transitory computer storage medium of claim 9 wherein the at least one computer processor further records, for each selection button actuation, the identities of the actuated selection button and selection button halve.

11. The non-transitory computer storage medium of claim 10 wherein the at least one computer processor further displays in the letter output field, for each selection button actuation, a letter from among the letters assigned to:

the identified selection button; and the interleaved button that overlaps the identified selection button halve.

12. The non-transitory computer storage medium of claim 9 wherein the generated interactive graphical user interface further includes:

an additional at least three selection buttons arranged contiguously in a second row on the interface; and an additional at least three interleaved buttons collinear with the second row of the at least three selection buttons, wherein the first row and the second row lie parallel to one another on the interface.

* * * * *